US012752573B2

(12) United States Patent
Carpenter

(10) Patent No.: US 12,752,573 B2
(45) Date of Patent: Oct. 6, 2026

(54) WHEEL ASSEMBLY

(71) Applicant: Michael Carpenter, Tyabb (AU)

(72) Inventor: Michael Carpenter, Tyabb (AU)

(*) Notice: Subject to any disclaimer, the term of this patent is extended or adjusted under 35 U.S.C. 154(b) by 289 days.

(21) Appl. No.: 18/698,637

(22) PCT Filed: Oct. 5, 2022

(86) PCT No.: PCT/AU2022/051184
§ 371 (c)(1),
(2) Date: Apr. 4, 2024

(87) PCT Pub. No.: WO2023/056508
PCT Pub. Date: Apr. 13, 2023

(65) Prior Publication Data

US 2024/0424831 A1 Dec. 26, 2024

(30) Foreign Application Priority Data

Oct. 5, 2021 (AU) ................................ 2021903179
Dec. 24, 2021 (AU) ................................ 2021904271

(51) Int. Cl.
*B60B 27/04* (2006.01)
*B60B 9/26* (2006.01)
*B60B 27/02* (2006.01)
*B60K 7/00* (2006.01)

(52) U.S. Cl.
CPC ................ *B60B 27/04* (2013.01); *B60B 9/26* (2013.01); *B60B 27/023* (2013.01); *B60K 7/0007* (2013.01); *B60B 2900/311* (2013.01)

(58) Field of Classification Search
CPC ......... B60B 27/04; B60B 27/023; B60B 9/26; B60B 2900/311; B60K 7/0007
See application file for complete search history.

(56) References Cited

U.S. PATENT DOCUMENTS 10,518,576 B1 * 12/2019 Ebrahimi Afrouzi ........................ B60B 19/003
10,625,594 B2 4/2020 Yamamoto et al.
11,565,552 B2 * 1/2023 Kemeny ................... B60B 9/24
(Continued)

FOREIGN PATENT DOCUMENTS

CN 105515227 B 5/2018
DE 202005017190 U1 1/2006
(Continued)

OTHER PUBLICATIONS

Evangelos, E. et al., "Spherical Trigonometry Constrained Kinematics for a Dexterous Robotic Hand with an Articlulated Palm", Robotica, Jun. 17, 2015, pp. 1-18.
(Continued)

*Primary Examiner* — Edwin A Young
(74) *Attorney, Agent, or Firm* — Howard & Howard Attorneys PLLC

(57) ABSTRACT

A wheel assembly comprising a wheel that is rotatable about a shaft. The wheel is supported by a plurality of connecting members to rotate about a plurality of motors that are arranged on the shaft. The plurality of motors are operable to control the connecting members so as to adjustably shift a central axis through the wheel relative to a central axis through the shaft. The wheel assembly may thus be used to dynamically adjust a position of the wheel axis relative to the central axis of the motors.

20 Claims, 53 Drawing Sheets

(56) References Cited

U.S. PATENT DOCUMENTS

| | | | | |
|---|---|---|---|---|
| 2014/0028081 | A1 | 1/2014 | Han | |
| 2017/0349003 | A1 | 12/2017 | Joso et al. | |
| 2018/0056774 | A1 * | 3/2018 | Chan | B62M 6/65 |
| 2021/0387499 | A1 * | 12/2021 | Ko | B62D 9/04 |

FOREIGN PATENT DOCUMENTS

| | | | |
|---|---|---|---|
| WO | 2014170745 | A1 | 10/2014 |
| WO | 2020047609 | A1 | 3/2020 |

OTHER PUBLICATIONS

International Search Report for Application No. PCT/AU2022/051184 dated Dec. 21, 2022, 6 pages.

Sun, J. et al., “Synthesis of Spherical Four-Bar Linkage for Open Path Generation Using Wavelet Feature Parameters”, Mechanism and Machine Theory, Jun. 4, 2018, pp. 33-46.

Youtube, “Spherical 4-Bar Linkage Mechanism 1”, https://www.youtube.com/watch?y=fO4-oGOmS0, May 26, 2011, 2 pages.

Youtube, “Spherical 4-Bar Linkage Mechanism 3”, https://www.youtube.com/watch?y=q0erDDuPO7w, May 26, 2011, 2 pages.

English language abstract and machine-assisted English translation for CN 105515227 B extracted from espacenet. com database on Apr. 5, 2024, 13 pages.

English language abstract and machine-assisted English translation for DE 20 2005 017 190 U1 extracted from espacenet.com database on Apr. 5, 2024, 5 pages.

* cited by examiner

WHEEL ASSEMBLY

CROSS-REFERENCE TO RELATED APPLICATIONS

The present application is the National Stage of International Patent Application No. PCT/AU2022/051184 filed on Oct. 5, 2022, which claims priority to and all the benefits of Australian Patent Application No. 2021904271, filed on Dec. 24, 2021, and Australian Patent Application No. 2021903179, filed on Oct. 5, 2021, all of which are hereby expressly incorporated herein by reference in their entirety.

TECHNICAL FIELD

This disclosure relates generally to a wheel assembly and a steering system for a vehicle, and in particular to a wheel assembly having an in-wheel motor.

BACKGROUND OF THE DISCLOSURE

Many vehicles used in the transportation industry release pollutants such as carbon dioxide into the atmosphere. The use of electric motors can help to reduce the harmful impact when operating a vehicle as they do not produce such pollutants. Electric motors can be relatively efficient, compact, reliable, lightweight, and quiet when compared with petrol, diesel or gas motors. Moreover, in some applications, the electricity required to operate the motor can advantageously be generated from a renewable supply.

Electric vehicles also provide the option of utilising in-wheel motors, where each wheel is configured with a complete drivetrain and braking system. In-wheel motors can precisely control the braking or motoring torque of a wheel on a millisecond timescale, and can therefore greatly improve traction and stability control whilst also reducing stopping distances and enhancing drivability and safety. In-wheel motors also allow for torque-vectoring. Torque-vectoring is when different torques are simultaneously applied to different wheels in order to improve traction and handling of the vehicle. This can be particularly advantageous when a vehicle is turning through a corner.

Despite advancement in the technical field, in-wheel motors face a number of technical challenges. For example, in-wheel motors require consideration of reducing the unsprung mass, protecting against road shocks, and protecting against heat from braking. These technical issues arise because the motor is carried inside each wheel, meaning that the motor operates in close proximity to the wheel itself, and the wheel must be configured to absorb the motors weight on its own.

In particular, in-wheel motors typically add unsprung weight, which is the mass of the components between the vehicle's suspension system and the road. This includes the in-wheel motor, the suspension, the wheels and all the other components that are directly connected to them such as wheel axles, wheel bearings, wheel hubs, tyres, as well as a portion of the weight of the drive shafts, springs, shock absorbers, and suspension links. The unsprung weight of a vehicle can adversely affect the handling of the vehicle due to the effects of inertia, causing the wheels to respond slower to changes in the road conditions. For example, in a fast moving vehicle travelling over a road bump, the greater the unsprung weight at each wheel, the more the inertia effects the accuracy and timeliness of the up and down movement of the wheel as it traverses the bump on the road surface. In vehicles where the unsprung weight is large, the suspension may be unable to fully absorb the impact force generated by the changing road conditions, instead transmitting the force into the vehicle chassis. In addition, the time of contact between the tyre and the ground can be reduced in some instances, which can reduce the efficiency with which the vehicle is able to accelerate, brake, or be steered.

Although careful tuning of the suspension can help to mitigate the effects of the large unsprung mass that are generally associated with in-wheel motors, there may remain a desire to minimise the unsprung mass where possible in order to improve the safety and performance of vehicle.

The applicant has determined that it would be advantageous to provide an improved wheel assembly and/or steering system that seeks to address or at least in part alleviate one or more problems identified above, or to provide the public with a useful choice.

SUMMARY OF THE DISCLOSURE

In a first aspect, embodiments are disclosed of a wheel assembly. The wheel assembly comprises a wheel that is rotatable about a shaft. The wheel is supported by a plurality of connecting members to rotate about a plurality of motors that are arranged on the shaft. The plurality of motors are operable to control the connecting members so as to adjustably shift a central axis through the wheel relative to a central axis through the shaft. The wheel assembly may thus be used to dynamically adjust a position of the wheel axis relative to the central axis of the motors.

In the context of this specification, a rim of the wheel may in some forms be interpreted to define an inwardly facing edge or surface of a hollow wheel frame. For example, the inwardly facing rim of a wheel frame that has a tyre engaged therearound on the outwardly facing surface of the wheel frame, and spokes extending towards the shaft from the inwardly facing rim of the wheel frame. In other forms, a rim of the wheel may be interpreted to define an outer edge around the circumference of the wheel. For example, where the wheel is configured in a substantially solid disc-like manner, with a rim adapted around the circumference, and spokes engaged to a side wall of the disc-like wheel.

The wheel assembly may be configured as a hub-style wheel assembly that may be used as an active in-wheel suspension system, without requiring the addition of conventional suspension systems and the associate components to connect the suspension system to the wheel. This may result in the wheel assembly having reduced weight when compared to prior in-wheel motors. In some embodiments this may resolve, or at least somewhat alleviate, the unsprung weight issues that have historically been associated with in-wheel hub motors. The wheel assembly may, in some embodiments, also help to reduce the overall weight of the vehicle, as well as the cost of manufacture, by using motors to both drive the wheel and provide the suspension for the wheel in a compact arrangement.

In some embodiments, the plurality of motors may locate within the boundaries of the wheel. In some embodiments, the wheel assembly may comprise a control system that is configured to simultaneously control an acceleration and/or deceleration of each of the plurality of motors whereby, in use, the plurality of motors are operative in a communicative manner to rotate the wheel about the shaft.

In some embodiments, each of the plurality of motors may be controlled to accelerate and/or decelerate independently of the other motors of the plurality of motors, whereby in use a velocity of each of the plurality of motors is simultaneously variable. In some embodiments, each of the plurality of motors may be controlled to sinusoidally accelerate and decelerate during a single revolution of the wheel. In some embodiments, a timing of the sinusoidal acceleration and deceleration of an individual motor may be offset relative to the sinusoidal acceleration and deceleration of the other motors of the plurality of motors.

In some embodiments, the plurality of connecting members may be spokes that extend between the plurality of motors and the wheel, each spoke defining a motor linkage where the spoke is coupled to one of the plurality of motors, and a wheel linkage where the spoke is coupled to the wheel. In some embodiments, the spokes may be pivotable about each of the motor linkage and the wheel linkage. In some embodiments, each wheel linkage may be spaced equidistantly around a circumference of the wheel. In some embodiments, in use, a relative spacing between each of the plurality of motor linkages may be adjustable. In some embodiments, a single spoke may extend between the wheel and each of the plurality of motors.

In some embodiments, each of the spokes may be rigid.

In some embodiments, in use, an acceleration of one of the plurality of motors relative to the other motors of the plurality of motors may controllably orientate a corresponding one of the spokes that is attached to said one of the plurality of motors, whereby a distance between a corresponding motor linkage and the wheel is decreased.

In some embodiments, in use, a deceleration of one of the plurality of motors relative to the other motors of the plurality of motors may controllably orientate a corresponding one of the spokes that is attached to said one of the plurality of motors, whereby a distance between a corresponding motor linkage and the wheel is increased.

In some embodiments, in use, each one of the plurality of motors may be controlled to reach a peak velocity, respectively, when a corresponding one of the spokes that is attached to said one of the plurality of motors is at a position during each revolution that substantially corresponds to 90 degrees of a unit circle, whereby the rim of the wheel is adjusted to move downwards relative to the shaft.

In some embodiments, in use, each one of the plurality of motors may be controlled to reach a peak velocity, respectively, when a corresponding one of the spokes that is attached to said one of the plurality of motors is at a position during each revolution that substantially corresponds to 270 degrees of a unit circle, whereby the rim of the wheel is adjusted to move upwards relative to the shaft.

In some embodiments, the rim of the wheel may be restricted to movement in the Y-axis relative to the shaft.

In some embodiments, the wheel assembly may further comprise a mechanism that detects a state of the ground surface that contacts the wheel assembly in use, and communicates said state of the ground surface to the control system. The mechanism may in some embodiments be a sensor.

In some embodiments, in response to the detected state of the ground surface, the control system may control the acceleration and/or deceleration of each of the plurality of motors to adjustably shift the rim of the wheel relative to the shaft to effect a force dampening on the shaft and/or the wheel. In some embodiments, the mechanism may be an accelerometer.

In some embodiments, the assembly may comprise three motors.

In some embodiments, each of the plurality of motors may define a rotor and a stator that are arranged along the shaft, the shaft being aligned centrally through a centre of mass of each of the rotors and stators, and each rotor being arranged to rotate about the shaft relative to a corresponding stator.

In some embodiments, the rotor may comprise a plurality of magnets that are arranged to define a ring of magnets on each of the opposing sides of the stator.

In some embodiments, the stator may comprise a plurality of segments, the number of segments corresponding to the number of the magnets of one of the rings of magnets.

In some embodiments, a first half of the segments of the stator may be excited by a current to form a magnetic field of a first polarity and second half of the segments of the stator are excited by a current to form a magnetic field of an opposing second polarity.

In some embodiments, the current of a leading segment of the first half of the segments and a trailing segment of the second half of the segments of the stator may be reversible, whereby the magnetic fields are rotated to effect a rotation of the ring of magnets of the rotor.

In some embodiments, the plurality of motors may be arranged proximal to one another on the shaft such that the polarity of the ring of magnets of a first of the plurality motors is engaged to oppose the adjacent motors the polarity of the ring of magnets of an adjacent second of the plurality of motors.

In some embodiments, each motor linkage may be spaced equidistantly around a circumference of the plurality of motors when the plurality of motors operate at a common velocity.

In a further aspect, a wheel assembly is disclosed. The wheel assembly comprises a wheel that is rotatable about a shaft. The wheel is supported by a plurality of connecting members to rotate about a plurality of motors that are arranged on the shaft. The plurality of motors are operable to control the connecting members so as to adjustably shift a central axis through the wheel relative to a central axis through the shaft.

In a further aspect, a steering assembly for a wheel is disclosed. The steering assembly comprises a plurality of nested shells that are pivotally engaged to one another, the nested shells comprising at least a fixed outer shell and an innermost shell, and the wheel being arranged to rotate about a shaft that projects from the innermost shell. At least one of the nested shells is controllable to pivot relative to the fixed outer shell such that the angular position of the innermost shell, the shaft and the wheel are adjusted relative to the outer shell.

In some embodiments of the steering assembly, when the at least one of the shells is controlled to pivot relative to the fixed outer shell, a bearing surface between each shell may remain unexposed in use.

In some embodiments, the fixed outer shell may be shaped as approximately one quarter of a sphere, having a hollow substantially spherical shaped interior. In some embodiments, a pivot neck may protrude downwardly from a zenith of the substantially spherical shaped interior of the fixed outer shell.

In some embodiments, the steering assembly may comprise a first rotating shell that has a spherical cap shape, the first rotating shell being concentrically coupled to a bearing that is mounted to the interior of the fixed outer shell. In some embodiments a gap may be provided in a surface of the first rotating shell, the gap being arranged to receive the pivot neck therein, such that the first rotating shell is able to rotate relative to the outer shell unimpeded. In some embodiments, the steering assembly may further comprise a second rotating shell that has a spherical cap shape, the second rotating shell being arranged to rotate eccentrically relative to the first rotating shell. In some embodiments, the innermost shell may be configured such that a bearing that is mounted to an outwardly facing surface of the innermost shell is concentrically coupled to the second rotating shell.

In yet a further aspect of the present invention, there is provided a steering assembly for a wheel, the steering assembly comprising four or more linkages, the four or more linkages being arranged such that: a first linkage is pivotally coupled to a second linkage, defining a first pivot; a third linkage is pivotally coupled to the first linkage at a distance spaced away from the first pivot, defining a second pivot; a fourth linkage is pivotally coupled to the second linkage at a distance spaced away from the first pivot, defining a third pivot; and the third linkage and the fourth linkage are pivotally coupled to each other at a distance spaced away from each of the second and third pivots, respectively, defining a fourth pivot; wherein each of the first, the second, the third and the fourth pivots are arranged such that an axis through each of the pivots converges at a single origin.

In some embodiments, the first linkage may remain stationary, in use. In some embodiments, each of the four or more linkages may be substantially linear therealong. In some embodiments, each of the four or more linkages may be curved therealong.

In some embodiments, at least one of the first, the second, the third and the fourth pivots may comprise a bearing thereat. In some embodiments, each of the second and the third pivots comprise a bearing thereat, the bearings having a diameter whereby the bearing paths overlap in use so as to act as a substantially continuous structure, rather than having one structure cantilever off the other, and thereby may assist in distributing the load at the pivots across the bearings, which may improve the overall structural strength and integrity of the steering assembly.

In some embodiments, each of the first and third linkages may comprise at least one gear, the at least one gear of the first and third linkages being meshed together, whereby a rotation of the at least one first linkage gear in a first direction causes a rotation of the at least one third linkage gear in an opposing second direction. In some embodiments, the third linkage gear may be fixed relative to the third linkage. In some embodiments, the third linkage may be arranged to rotate concentrically about the second pivot relative to the first linkage. In some embodiments, the fourth linkage may be arranged to rotate eccentrically about the fourth pivot relative to the third linkage. In some embodiments, the second linkage may be arranged to rotate concentrically about the third pivot relative to the fourth linkage. In some embodiments, an angular rotation of the third linkage relative to the first linkage may cause an eccentric angular rotation of the fourth linkage in an opposing direction. In some embodiments, an angular rotation of the fourth linkage relative to the second linkage may cause an eccentric angular rotation of the second linkage relative to the first linkage.

In some embodiments, the first linkage may be able to pivot at least 180 degrees relative to the second linkage about the first pivot.

Other aspects, features, and advantages will become apparent from the following detailed description when taken in conjunction with the accompanying drawings, which are a part of this disclosure and which illustrate, by way of example, principles of inventions disclosed.

While aspects of the present invention will be described below for use in combination with each other in the preferred embodiments of the present invention, it is to be understood by a skilled person that some aspects of the present invention are equally suitable for use as standalone inventions that can be individually incorporated into apparatuses and systems for use with other types of wheel assemblies and steering systems not specifically described herein.

DESCRIPTION OF THE FIGURES

The accompanying drawings facilitate an understanding of the various embodiments.

DETAILED DESCRIPTION

Figure 1A:
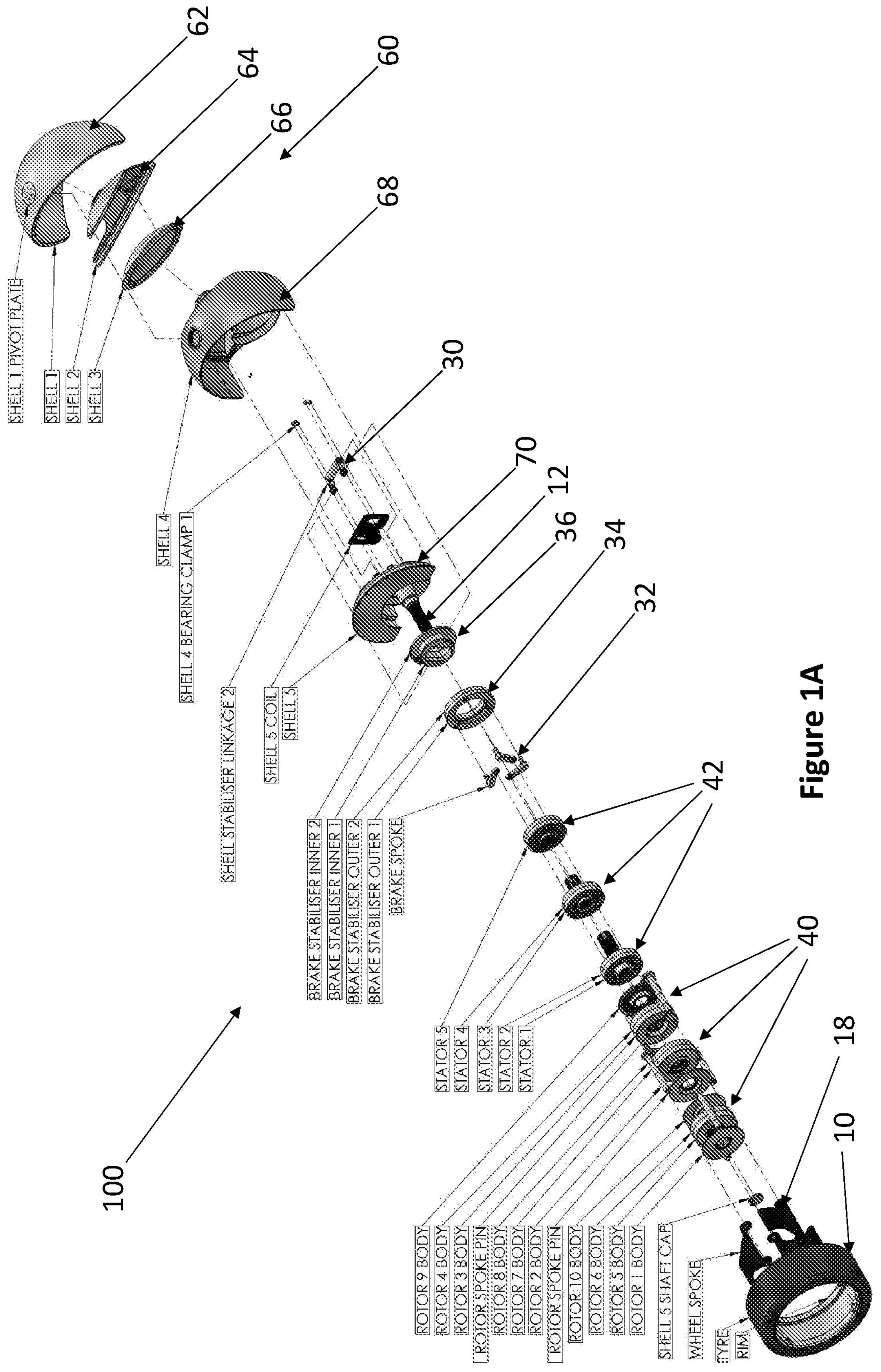
FIGS. 1A to 1D are an exploded anterior projection view, side section view through A-A, exploded anterior projection view from above, and exploded anterior projection view from below, respectively, of an embodiment of the wheel assembly.
Figure 1B:
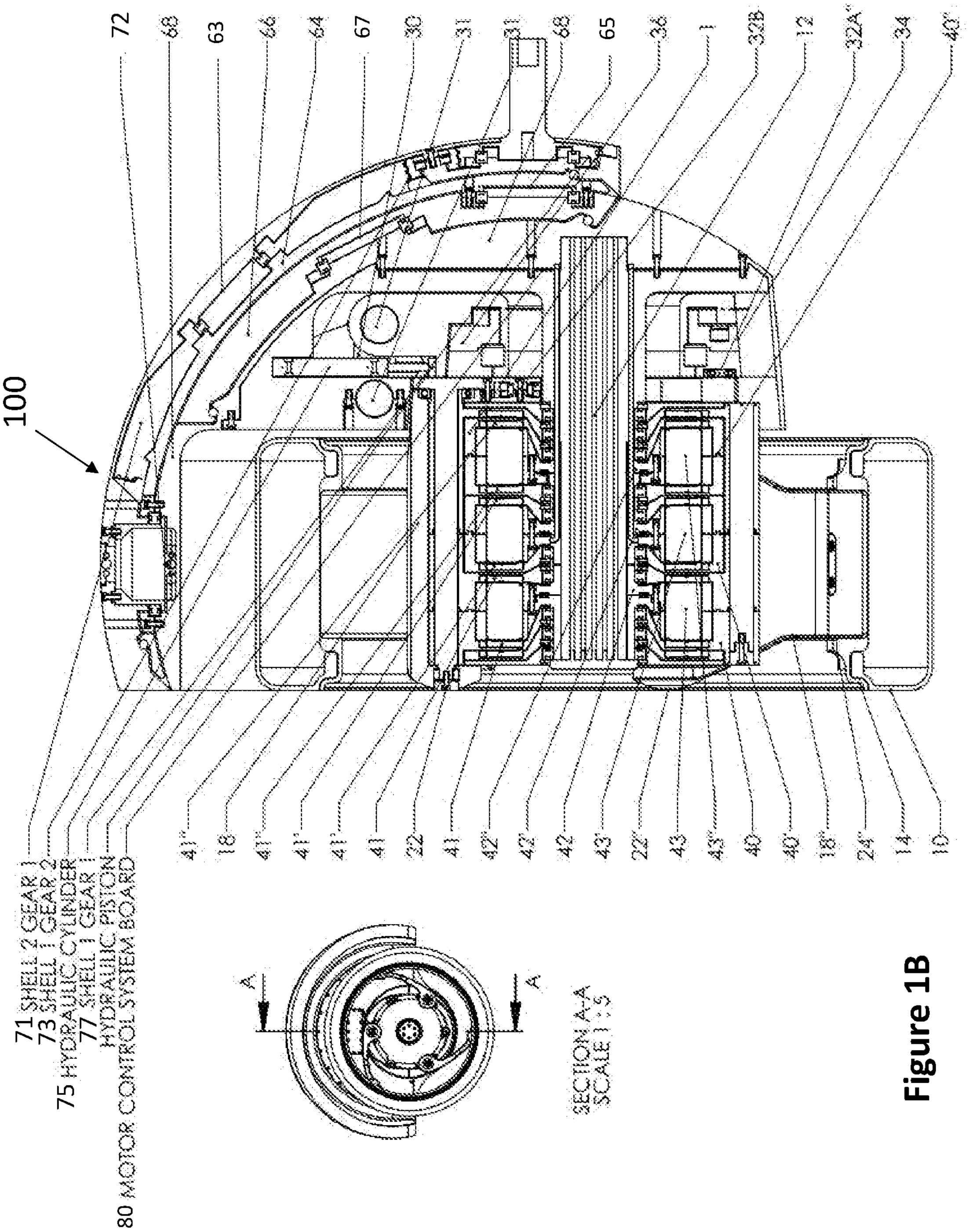
Figure 1C:
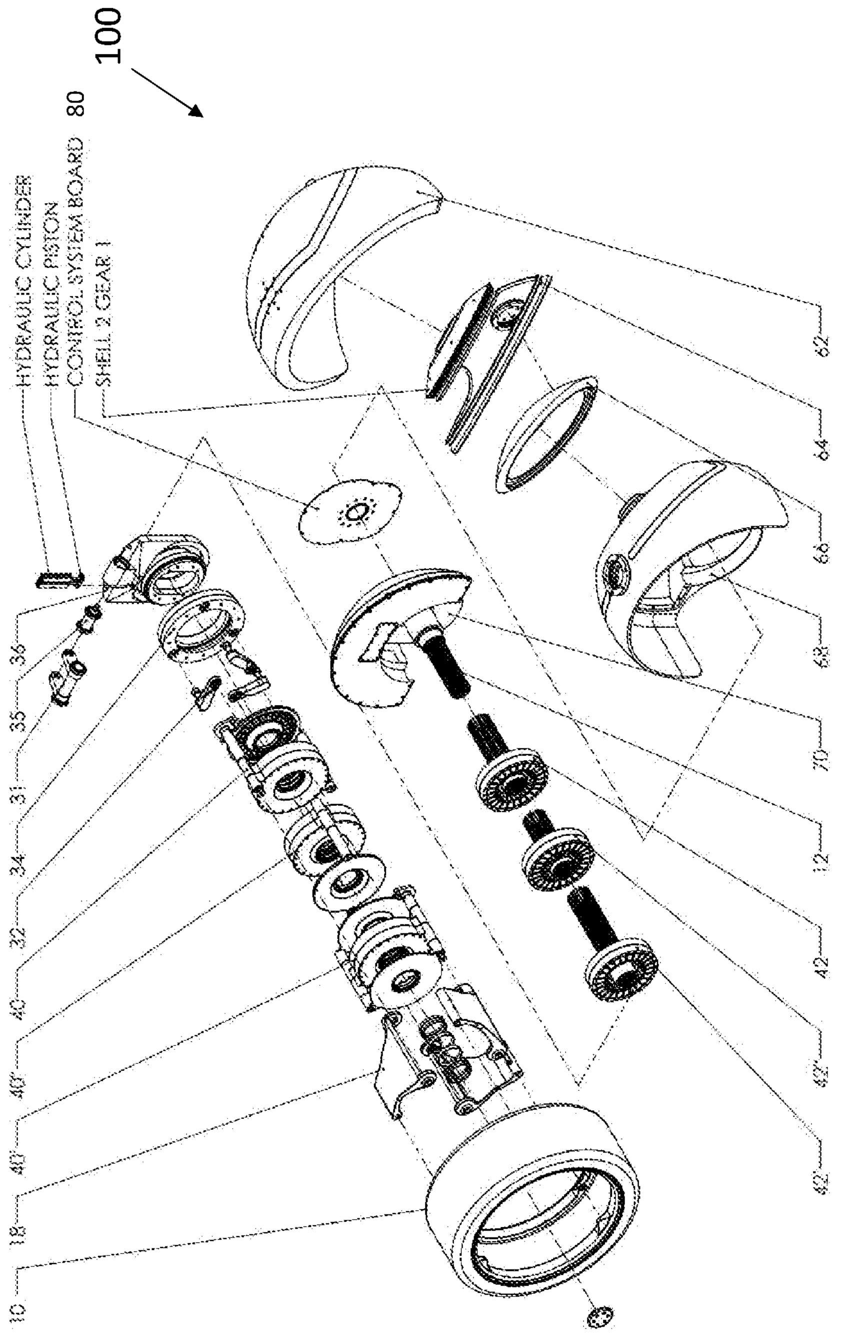
Figure 1D:
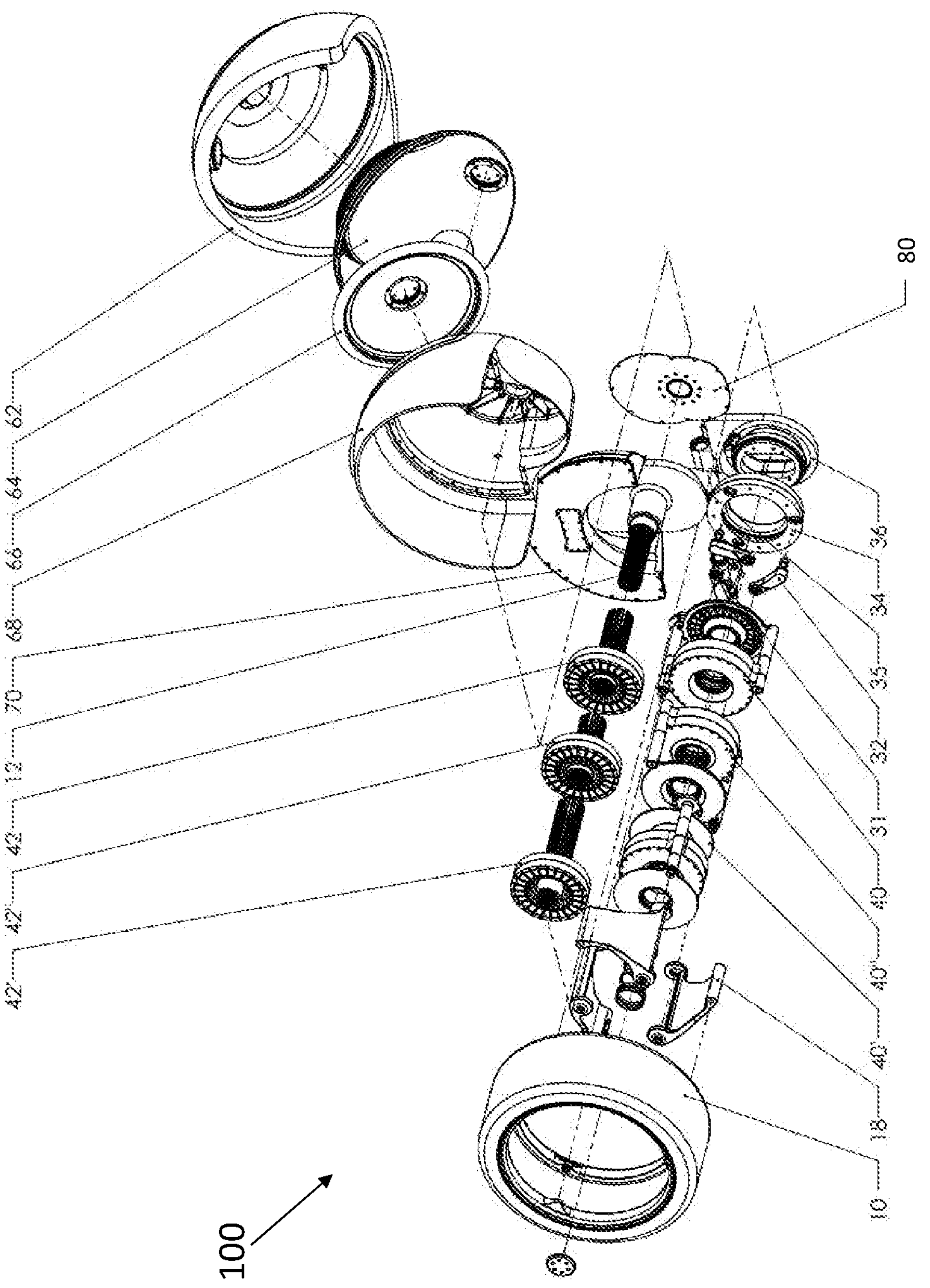
Figure 2:
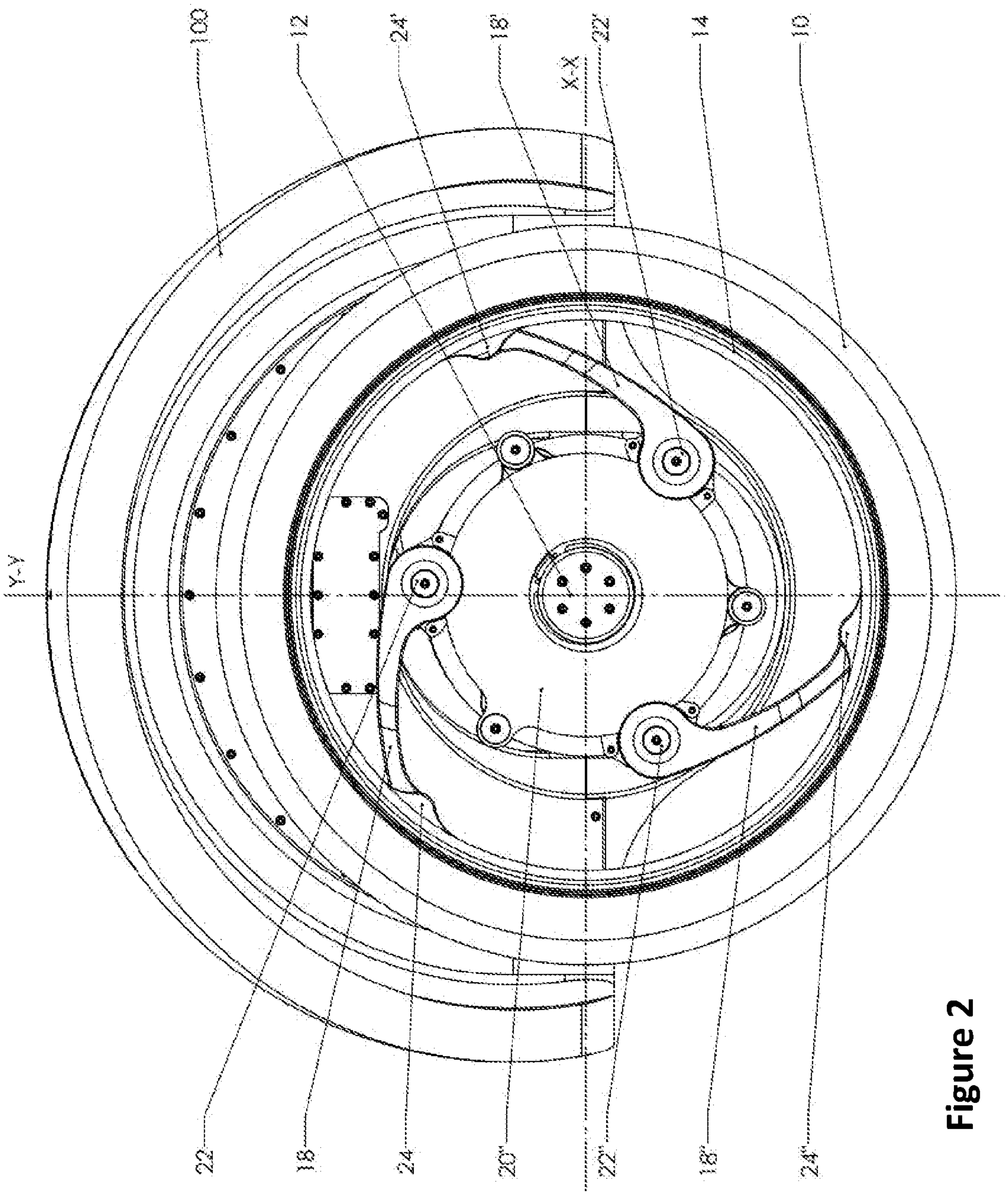
FIG. 2 is a front projection view of the wheel assembly of FIG. 1.
Figure 3:
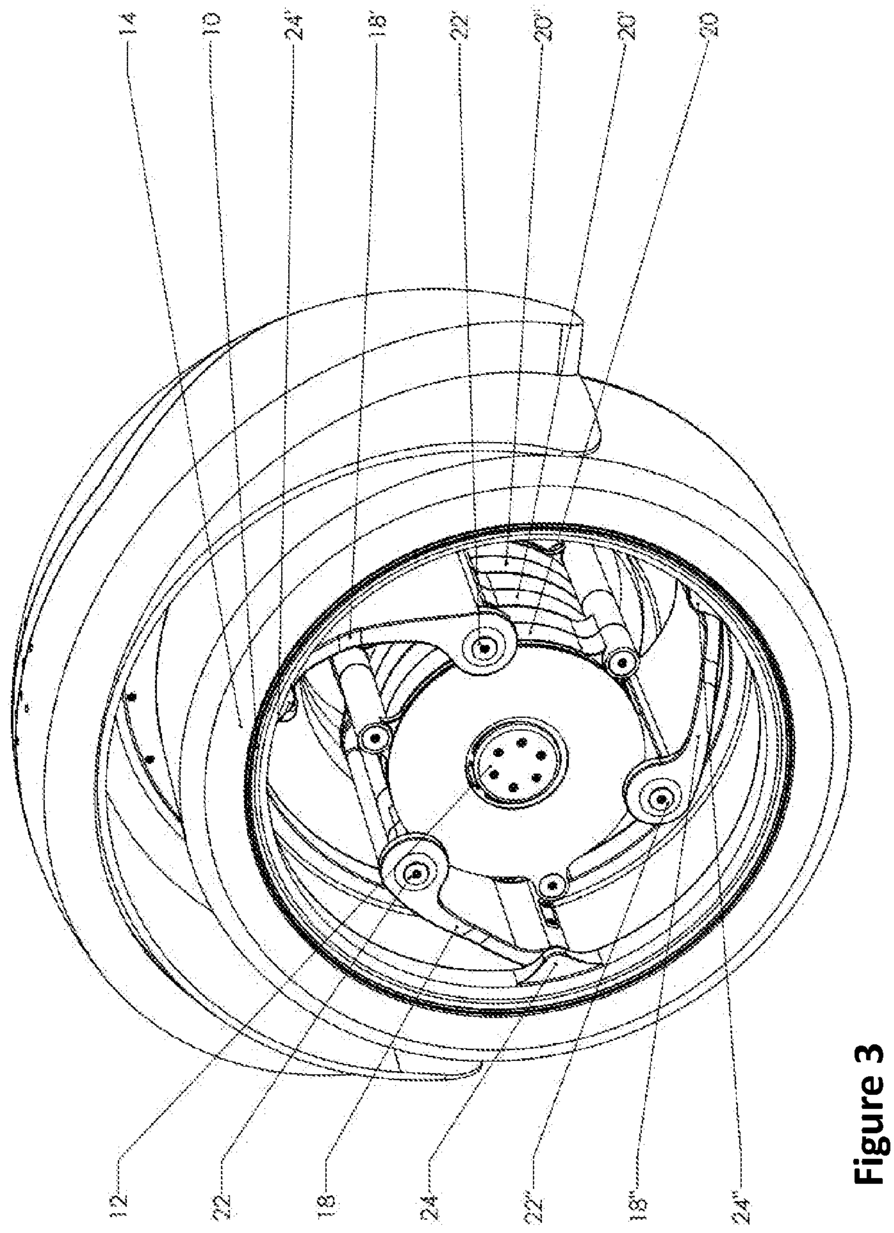
FIG. 3 is an anterior projection view of the wheel assembly of FIG. 1.
Figure 4:
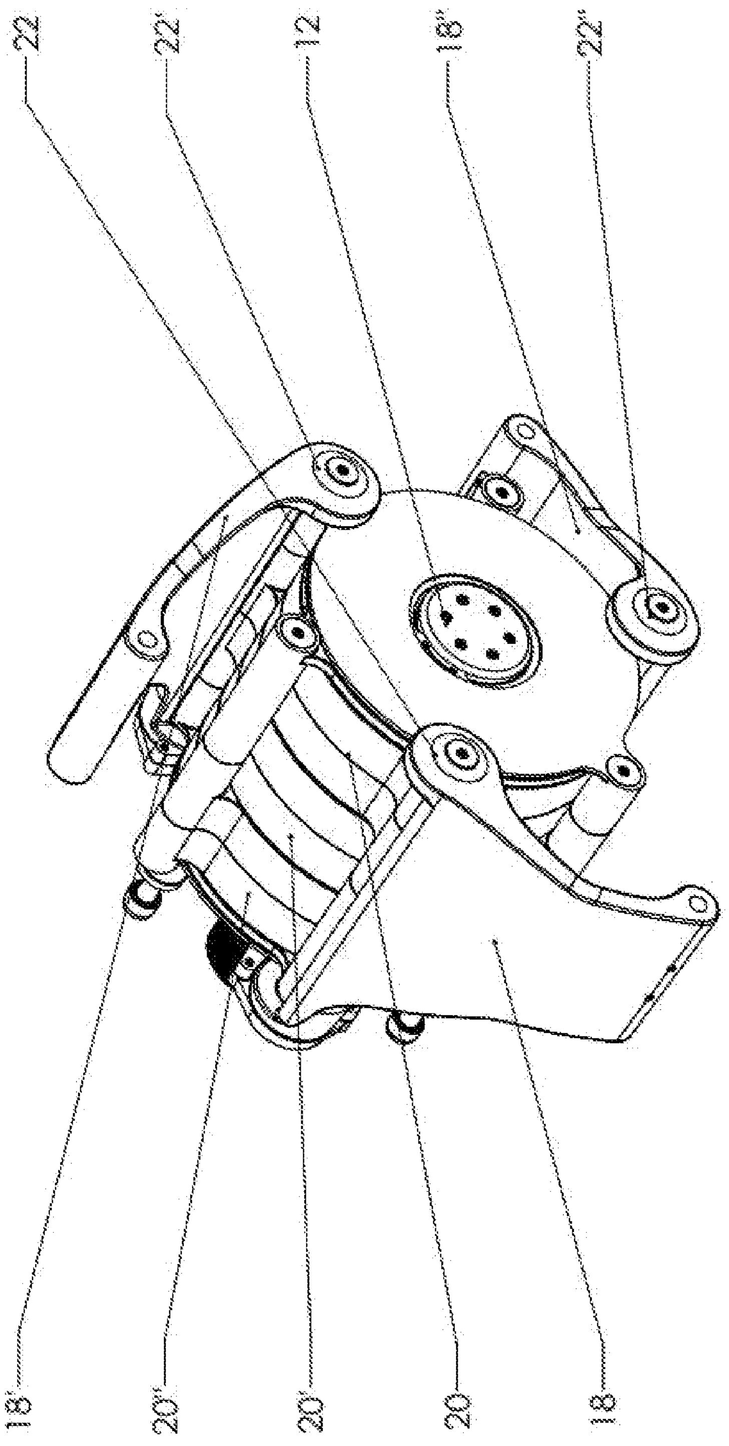
FIG. 4 is an anterior projection view of the wheel assembly of FIG. 1 without the steering assembly or wheel.

Referring to the drawings, there is illustrated an embodiment of a wheel assembly 100. As would be appreciated by one skilled in the technical field, the wheel assembly 100 can be incorporated into a vehicle or any power-driven wheeled device, such as a motorised wheelchair. Where like reference numerals are used in the following description, the features are considered to be the same unless specified as being otherwise.

Figures 5A, 5B:
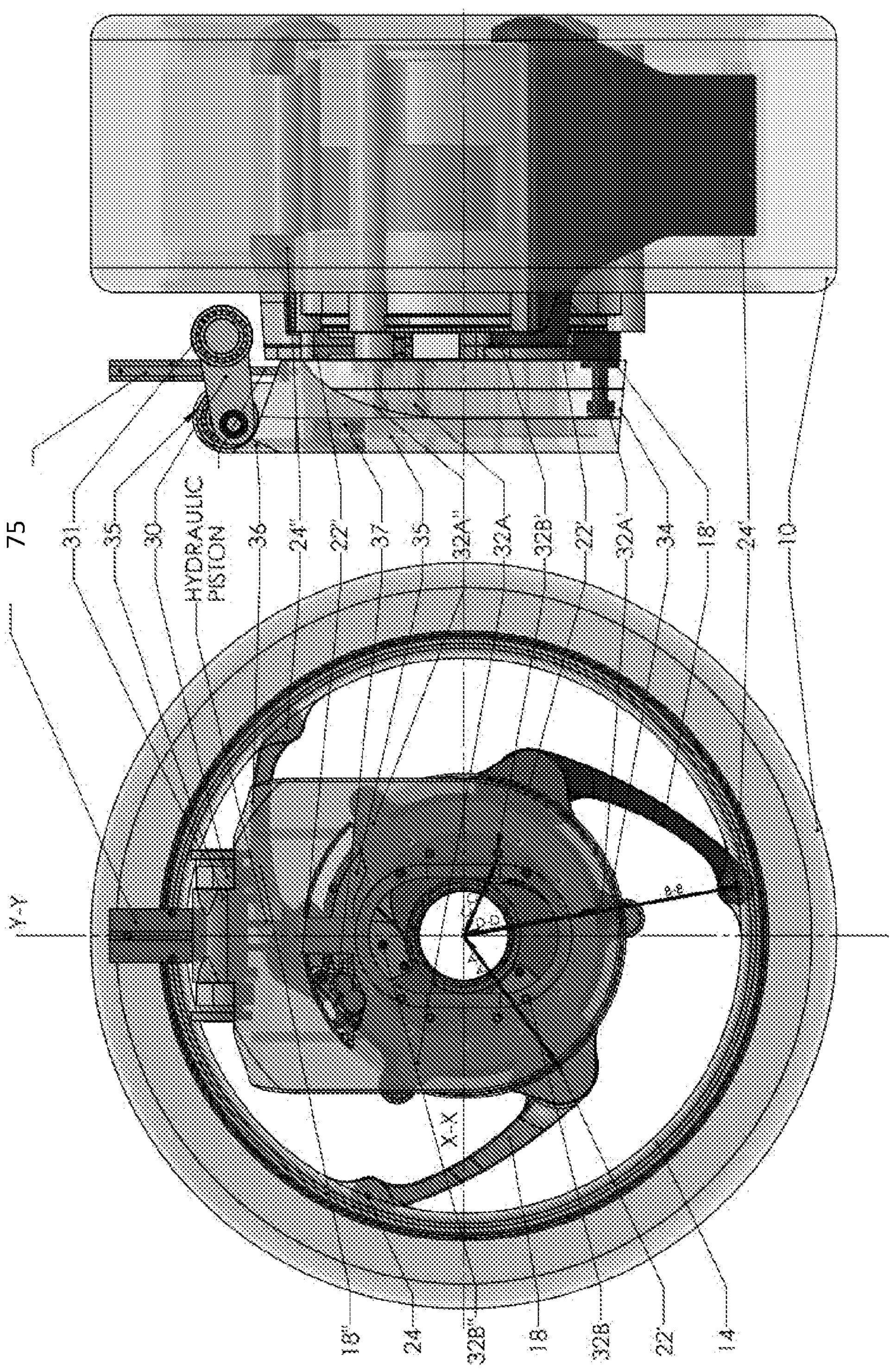
FIGS. 5A, 5B and 5C are rear, side, and rear projection views, respectively, of the y-axis limiter of the wheel assembly of FIG. 1 whilst in a neutral configuration.
Figure 5C:
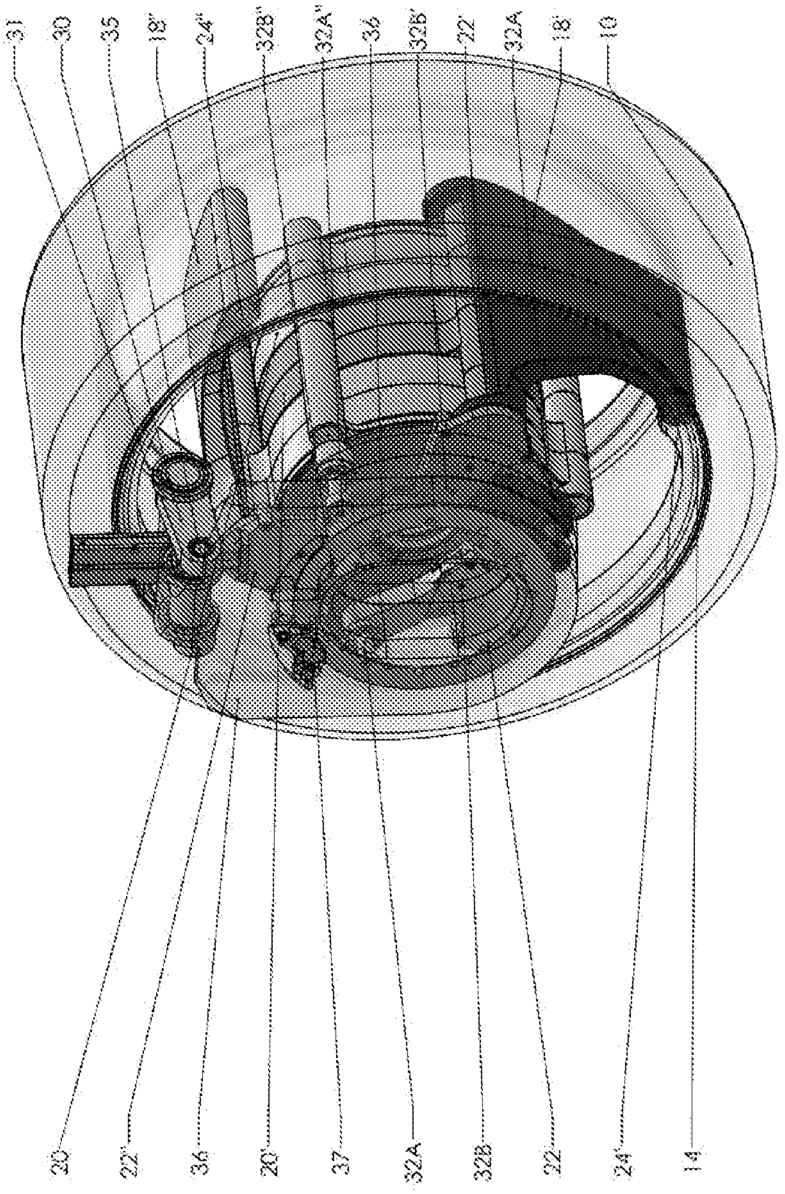
Figures 6A, 6B:
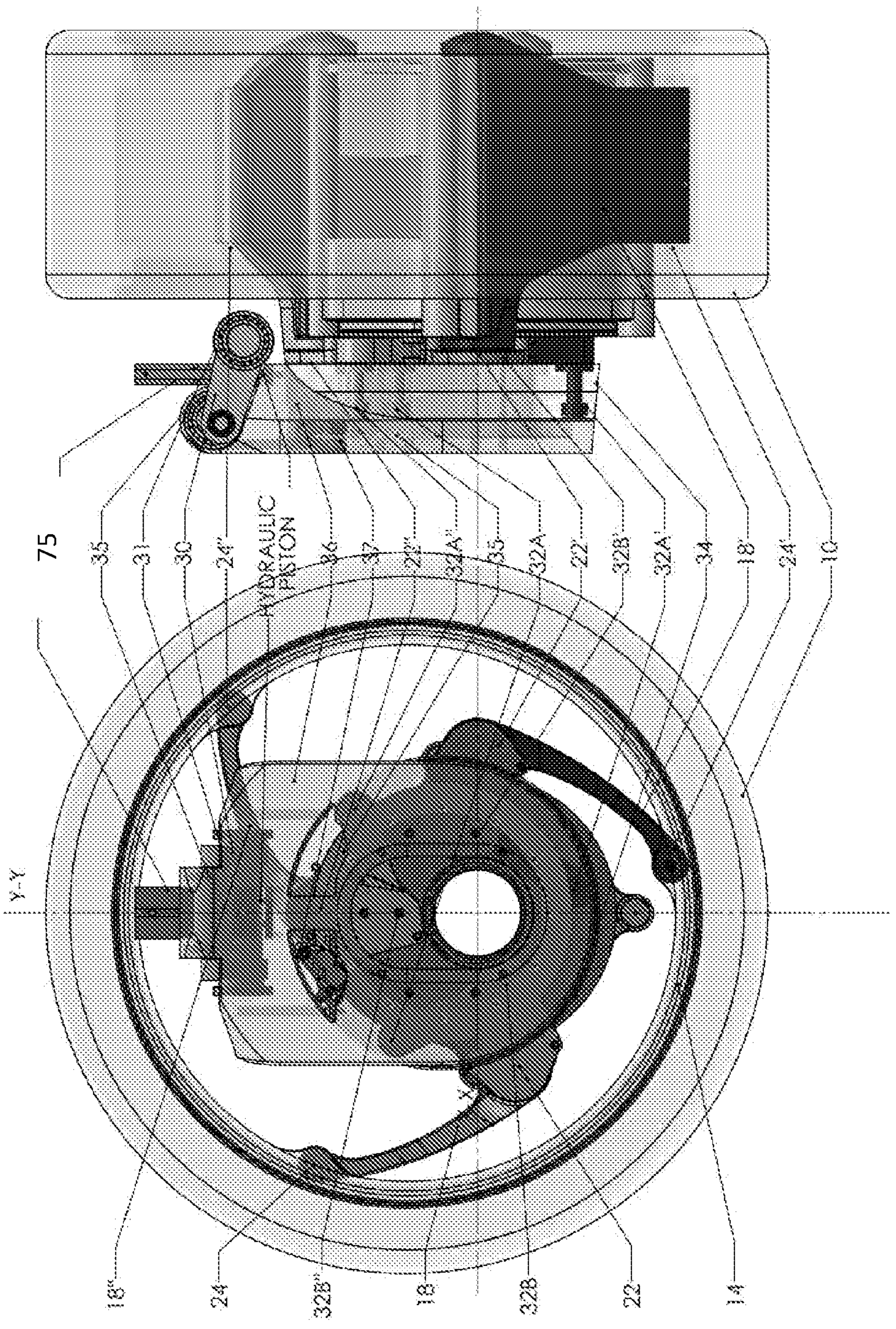
FIGS. 6A, 6B and 6C are rear, side, and rear projection views, respectively, of the y-axis limiter of the wheel assembly of FIG. 1 whilst in an elevated configuration.
Figure 6C:
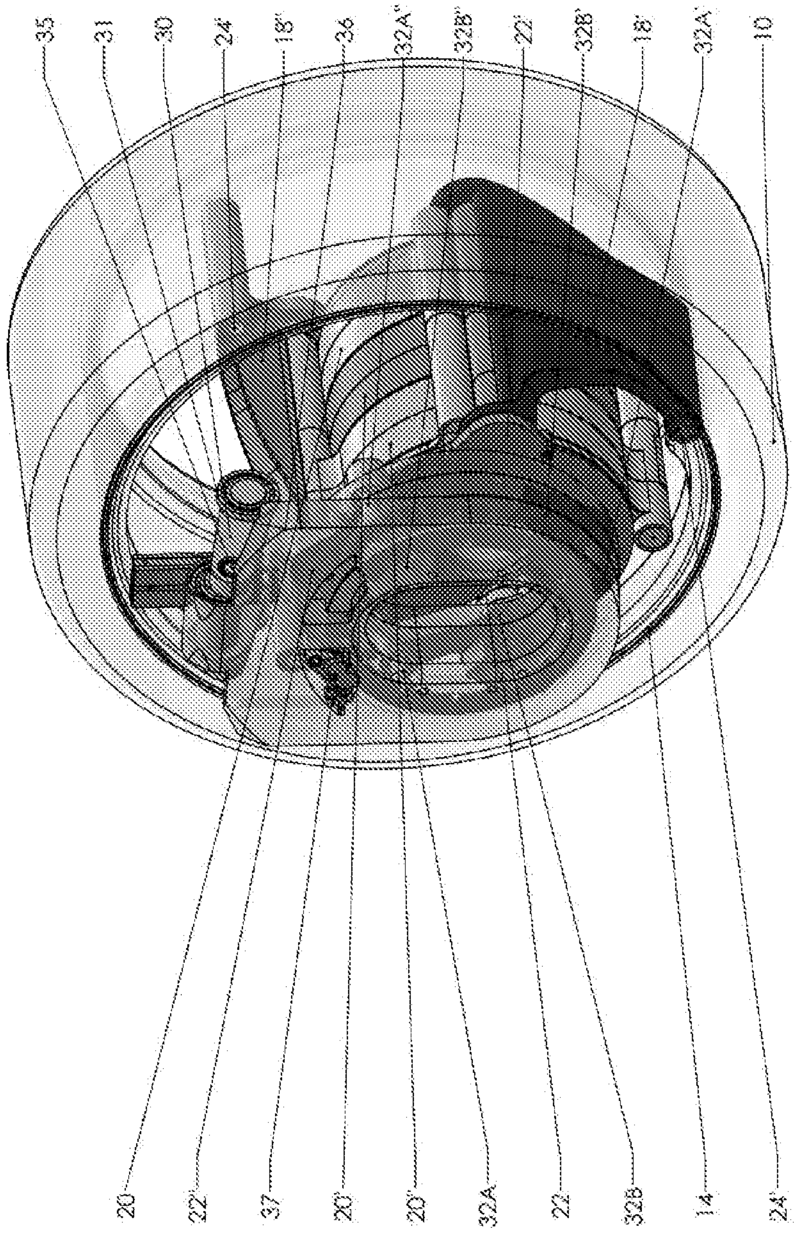
Figures 7A, 7B:
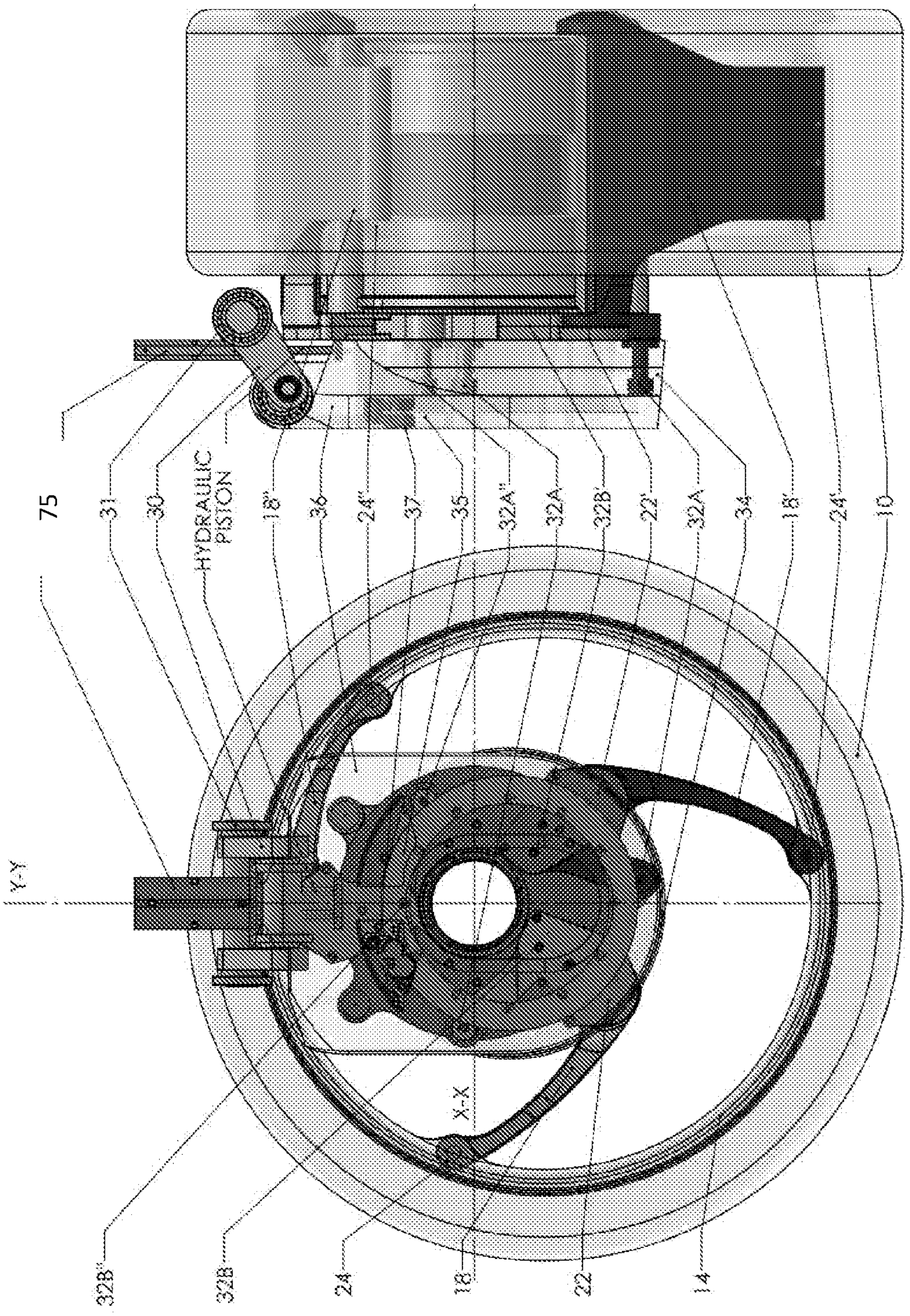
FIGS. 7A, 7B and 7C are rear, side, and rear projection views, respectively, of the y-axis limiter of the wheel assembly of FIG. 1 whilst in a lowered configuration.
Figure 7C:
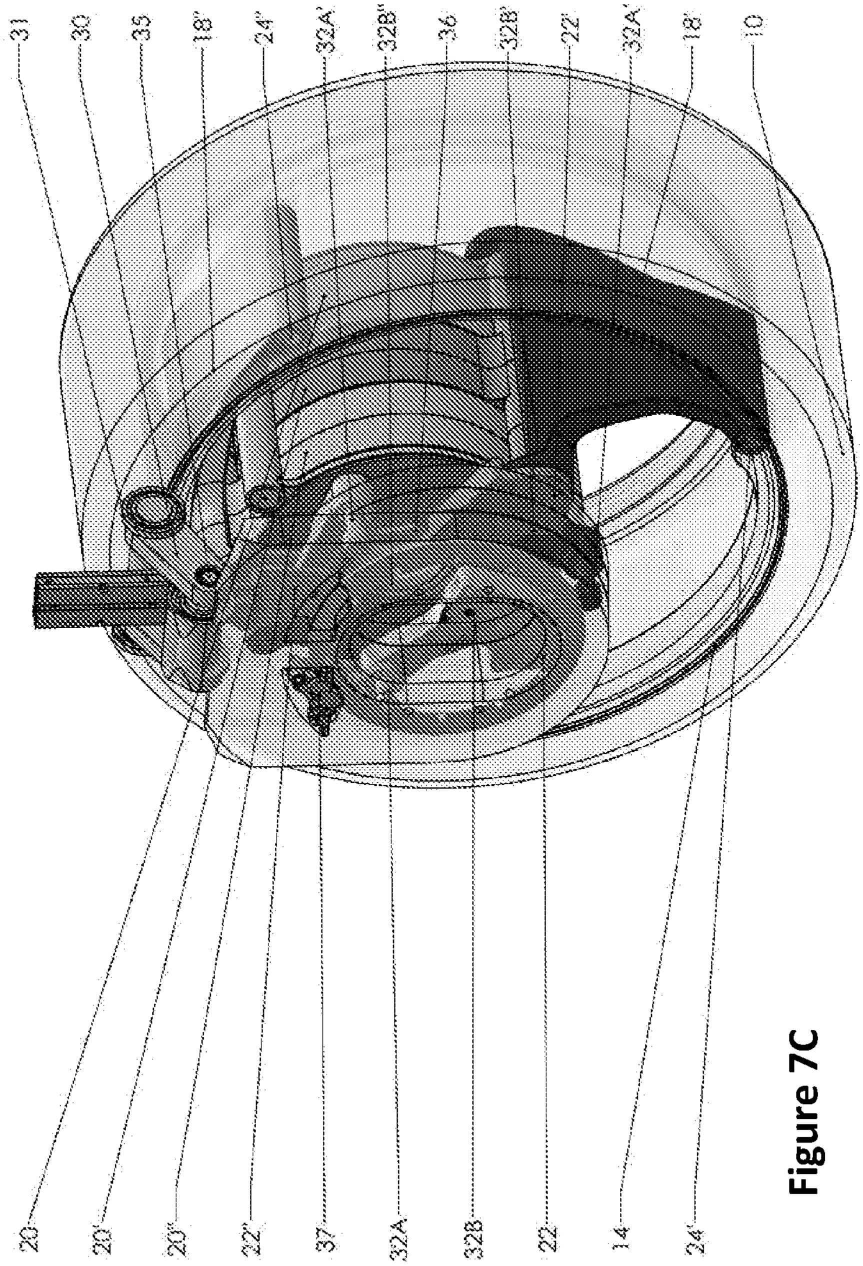
Figure 8:
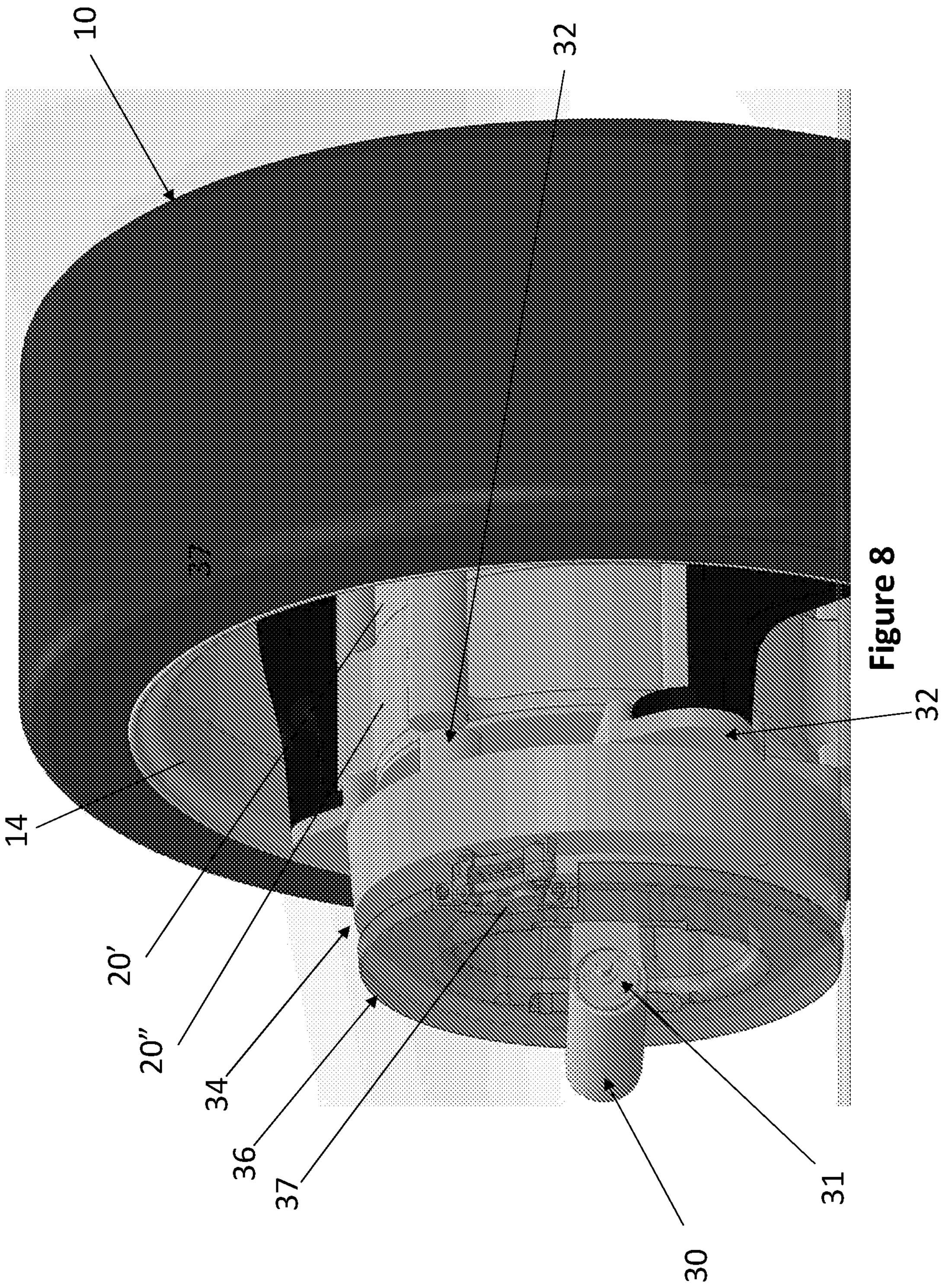
FIG. 8 is a partial posterior projection view of the wheel assembly of FIG. 1 without the steering assembly, showing the y-axis limiter.
Figure 9:
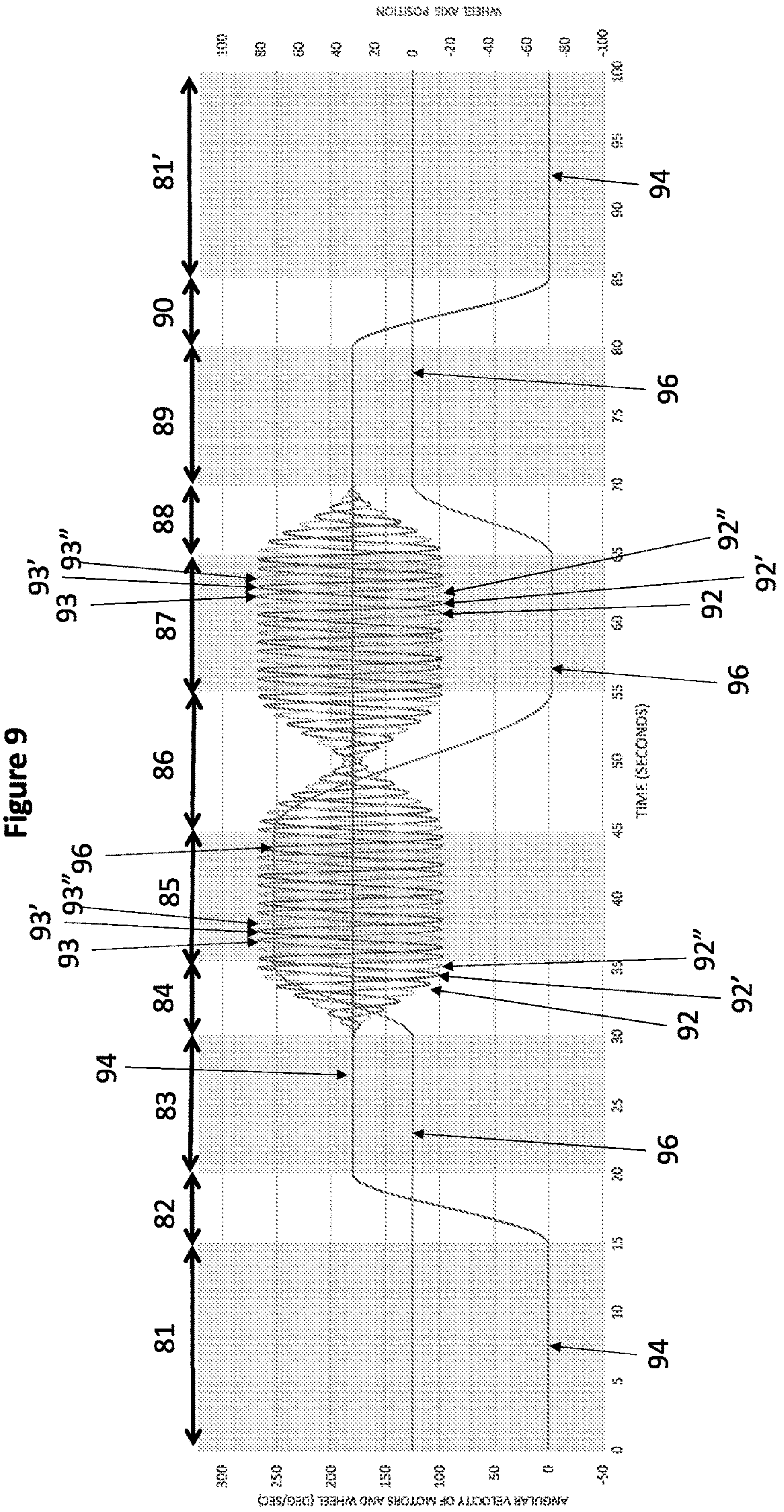
FIG. 9 is a graph showing an example of an angular velocity plot over time of a three motor wheel assembly, and the relative position of the central wheel axis over the same period of time.

Referring to FIGS. 1 to 4, the wheel assembly 100 is formed as a pivotable hub that comprises a wheel 10 that is rotatable about a wheel shaft 12. Being a hub, the wheel assembly 100 does not utilise components that are commonly associated with conventional vehicles including transmissions, constant velocity joints, differentials or a drive shaft which spans across the width of the vehicle. The wheel assembly 100 is instead driven by a plurality of motors 20,20',20" that are arranged concentrically on a shaft 12 that is itself a component of the individual wheel assembly 100. The plurality of motors 20,20',20" are arranged on the shaft 12 such that they locate within the boundaries of the wheel, thereby defining an in-wheel motor arrangement. In some forms, as best seen in FIGS. 5 to 7, the motors 20,20',20" can be wholly contained within the boundary defined by the diameter of the wheel 10 whilst being partially in-line with, and partially protruding beyond, the boundary defined by the width of the wheel 10. The wheel assembly 100 may thus simplify the drive chain of the vehicle. In addition, the vehicle may in some forms have a reduced total weight, may produce less noise, and may require less raw materials in order to be manufactured.

The wheel 10 is supported relative to the shaft 12 about which it rotates by a plurality of connecting members in the form of spokes 18, 18', 18" which extend between each of the motors 20,20',20" that are arranged on the shaft 12 and the inner rim of the wheel 14, thereby linking the wheel 10 to the shaft 12. Each spoke 18, 18', 18" is coupled at a first distal end to one of the plurality of motors 20,20',20" to define a motor linkage 22,22',22", and coupled at the opposing second distal end to the inner rim of the wheel 14 defining a wheel linkage 24. A single spoke 18, 18', 18" extends from each of the plurality of motors 20,20',20" to engage the inner rim of the wheel 14. For example, with reference to the Figures, an embodiment of the wheel assembly 100 is shown having three spokes 18,18', 18" and three motors 20,20',20", with a first spoke 18 extending from a first motor 20, a second spoke 18' extending from a second motor 20', and a third spoke 18" extending from a third motor 20", where each of the three motors 20,20',20" are configured side by side to rotate concentrically about a single shaft 12. In a variation, two or more spokes can be arranged to extend from each of the plurality of motors, with each of the two or more spokes being equidistantly spaced around the singular motor from which they stem towards the wheel rim.

A control system, mounted on a control system board 80, is integrated with the wheel assembly 100 to individually control the operation of each of the plurality of motors 20,20',20" in real-time such that they can be operated to drive the rotation of the wheel 10 thereabout simultaneously, yet independently from one another. Each of the motors 20,20',20" can be independently controlled by the control system to accelerate, decelerate and/or maintain a velocity, such that the velocities of each motor 20,20',20" can be controlled to simultaneously be the same, or simultaneously be different, from each other. The control system coordinates the velocity and direction of rotation of each of the motors 20,20',20" such that the motors 20,20',20" operate via the control system in a communicative manner to rotate the wheel 10 about the shaft 12.

Figure 10A:
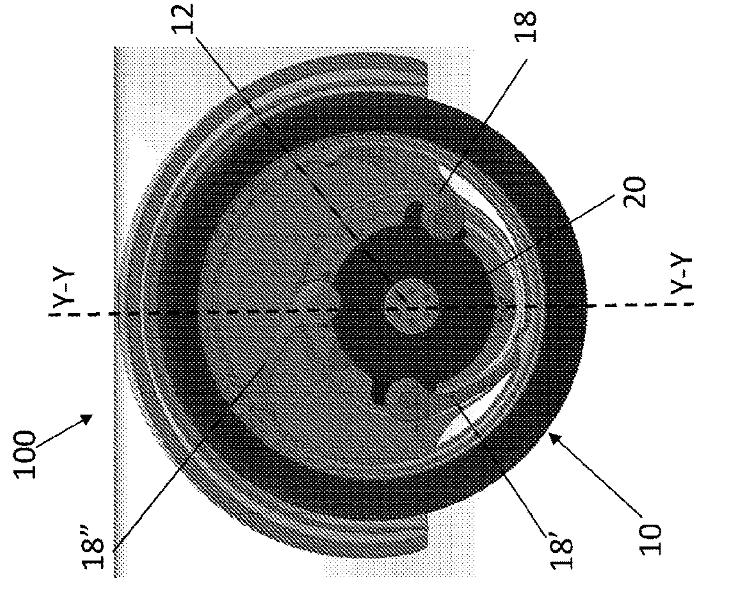
FIGS. 10A, 10B and 10C are front views of the wheel assembly of FIG. 1 in an elevated, neutral, and lowered configuration, respectively.
Figure 10B:
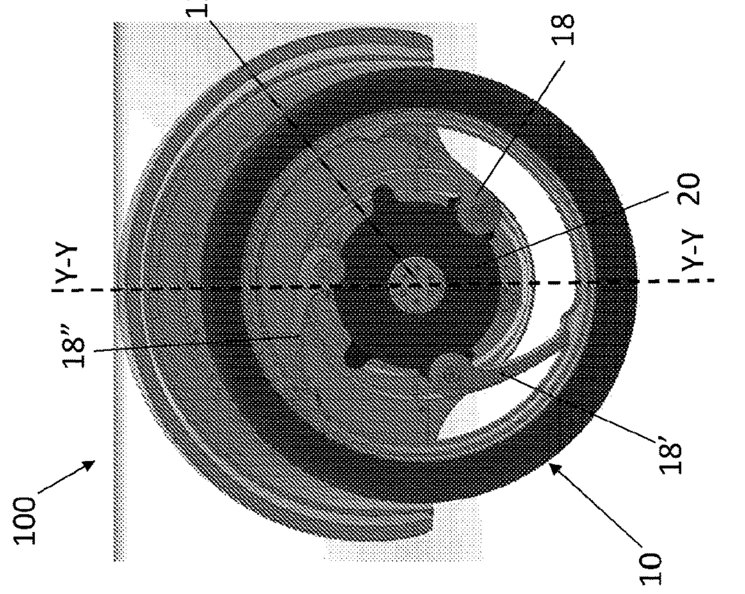
Figure 10C:
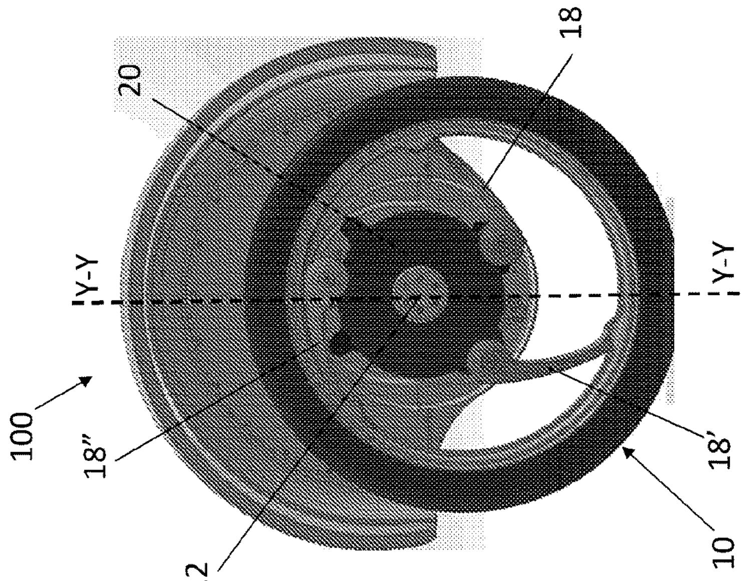
Figures 11A, 11B, 11C, 11D, 11E, 11F:
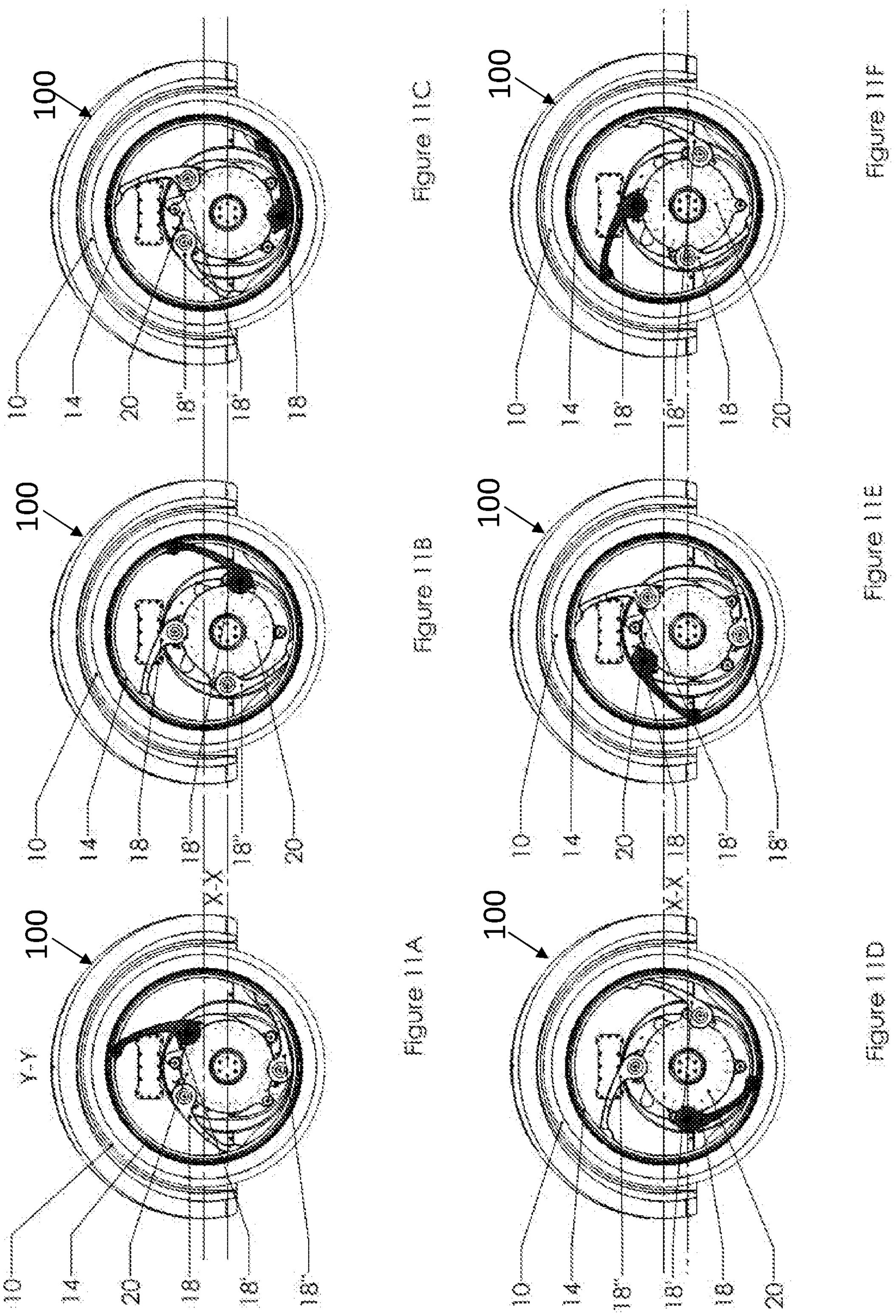
FIGS. 11A to 11F are front views of the wheel assembly of FIG. 1 rotating clockwise through a revolution of the wheel whilst in an elevated configuration, respectively.
Figure 12A:
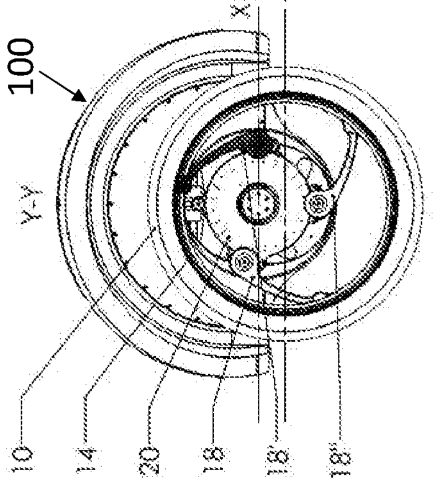
FIGS. 12A to 12F are front views of the wheel assembly of FIG. 1 rotating clockwise through a revolution of the wheel whilst in a lowered configuration, respectively.
Figure 12B:
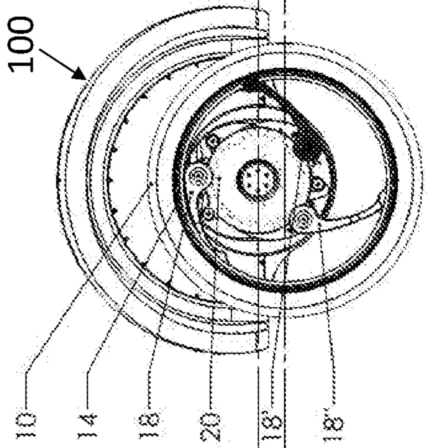
Figure 12C:
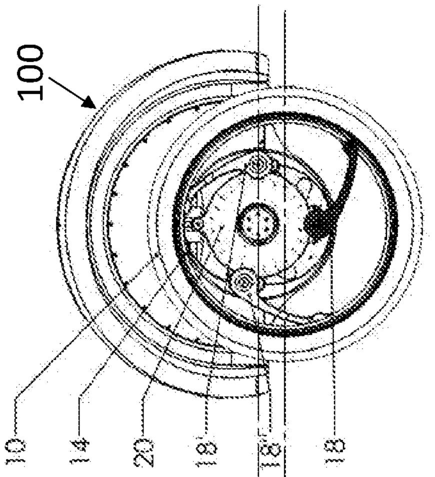
Figure 12D:
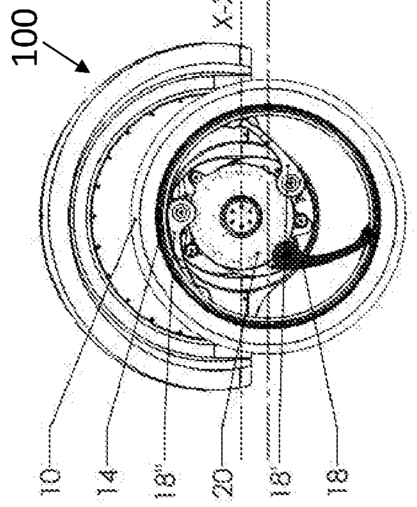
Figure 12E:
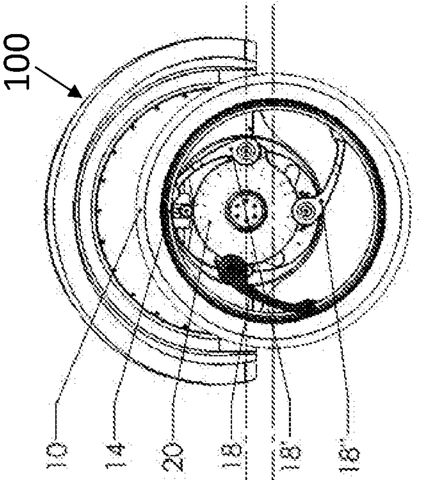
Figure 12F:
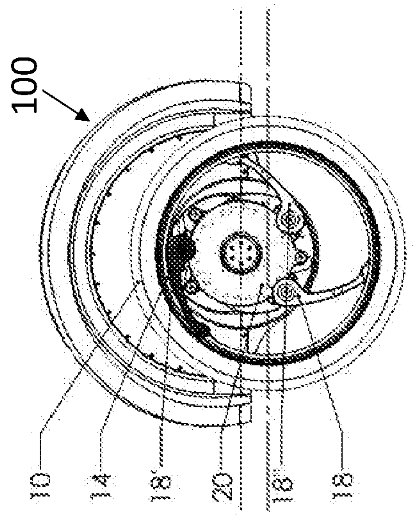

When each of the plurality of motors 20,20',20" are controlled to operate in unison at a substantially identical velocity, regardless of whether the wheel is accelerating, decelerating or maintaining a constant velocity, the central axis through the wheel 10 remains in a neutral configuration, where the central axis through the wheel 10 is concentric with the central axis through the shaft 12, and thus with each of the motors 20,20',20" (e.g. FIG. 10B).

The control system controls the motors 20,20',20" of the wheel assembly 100 independently of any other wheel assemblies 100 that are integrated with the vehicle. A centralised control system communicates with each wheel assembly 100 control system to direct each control system's individual operation, including, but not limited to, the acceleration and deceleration of the wheel 10, steering of the wheel assembly 100, brake control, traction control and stability control of the wheel assembly 100. In this manner, the wheel assembly 100 are operated as a collective in unison to drive the vehicle as a synchronised unit. In some forms, the independent control of the velocity of each wheel 10 of a vehicle can facilitate improved torque vectoring for the vehicle, where a unique torque force may be applied to each wheel 10 during cornering of the vehicle, whilst simultaneously increasing the velocity of any wheels 10 that locate on the outer side of the corner travelled. This may improve the predictability of the vehicle control.

The spokes 18, 18', 18" are rigid along their length, and are arranged to pivot relative to each of the motor 20,20',20" and the wheel 10 about each of the motor linkage 22,22',22" and wheel linkage 24, respectively. The relative location of the wheel linkages 24 are fixed relative to one another around the circumference of the wheel rim 14, with each wheel linkage 24 being spaced equidistantly therearound. However, the relative spacing between the motor linkages 22,22',22" of each of the different motors 20,20',20" around the circumference of the motors 20,20',20" is able to be adjustably lengthened or shortened when the velocity of an individual motor of the plurality of motors 20,20',20" differs from the velocity of one or more of the other motors of the plurality of motors 20,20',20" during a single revolution of the wheel 10. For example, if the first motor 20 accelerates whilst the second motor 20' either accelerates at a lesser rate, maintains its velocity, or decelerates, the relative distance between the first motor linkage 22 and the second motor linkage 22' will change accordingly whilst the relative instant velocities of rotation of each motor 20,20' remain different.

During operation of the wheel assembly 100, the control system can direct each of the plurality of motors 20,20',20" to sinusoidally accelerate and decelerate during a single revolution of the wheel 10, with the sinusoidal acceleration and deceleration of an individual motor of the plurality of motors 20,20',20" being at a different time to the other motors of the plurality of motors 20,20',20", whilst enabling each individual motor to achieve a peak and/or trough velocity at substantially the same angular position as the other motors of the plurality of motors 20,20',20" during a revolution of the wheel 10. The sinusoidal acceleration and deceleration of an individual motor of the plurality of motors 20,20',20" is thus offset relative to the sinusoidal acceleration and deceleration of the other motors of the plurality of motors 20,20',20", with the precise phase of the acceleration and deceleration being defined by the control system.

An acceleration of one of the motors 20,20',20" relative to the other motors 20,20',20" can cause the rigid spoke 18, 18', 18" attached to that motor 20,20',20" to pivot about both the corresponding motor linkage 22,22',22" and wheel linkage 24. As the wheel linkages 24 are fixed to remain equidistantly angularly spaced around the circumference of the wheel rim 14, as the motor linkage 22,22',22" of the accelerating motor 20,20',20" increases the relative angular distance between it and the motor linkage 22,22',22" of the trailing motor 20,20',20", the corresponding spoke 18, 18', 18" between the motor linkage 22,22',22" of the accelerating motor 20,20',20" and corresponding wheel linkage 24 is urged to orient to increase the relative angular distance between the motor linkage 22,22',22" of the accelerating motor 20,20',20" and corresponding wheel linkage 24 so as to compensate for the differential in relative velocities. The orientation of the pivoting spoke 18, 18', 18" acts to collapse the wheel linkage 24 towards the shaft 12, decreasing the distance between the wheel rim 14 and the motors 20,20',20" at that angular position during a single revolution of the wheel 10.

In a similar manner, as the motor linkage 22,22',22" of a decelerating motor 20,20',20" decreases the relative angular distance between it and the motor linkage 22,22',22" of the trailing motor 20,20',20", the corresponding spoke 18, 18', 18" between the motor linkage 22,22',22" of the accelerating motor 20,20',20" and corresponding wheel linkage 24 is urged to orient to decrease the relative angular distance between the motor linkage 22,22',22" of the accelerating motor 20,20',20" and corresponding wheel linkage 24 so as to compensate for the differential in relative velocities. In this instance, the orientation of the pivoting spoke 18, 18', 18" acts to pull the wheel linkage 24 in order to extend away from the shaft 12, increasing the distance between the wheel rim 14 and the motors 20,20',20" at that angular position during a single revolution of the wheel 10.

Thus, by controllably adjusting the phase of the sinusoidal cycles of each of the plurality of motors 20,20',20", the angular position where each of the motors 20,20',20" achieves a peak and/or a trough velocity during a revolution of the wheel 10 can be defined by the control system. The control system can thus operate the plurality of motors 20,20',20" to dynamically control and adjust the relative distance between wheel rim 14 and the shaft 12 by shifting the position of the central axis through the wheel 10 relative to a central axis through the shaft 12 and motors 20,20',20". The operation of the motors 20,20',20" at varying velocities simultaneously, can controllably adjust the orientation of the spokes 18, 18', 18" as they rotate about the shaft 12, thereby shifting the central axis through the wheel 10 relative to a central axis through the shaft 12 to the position determined by the control system. The magnitude of the shift in position of the central axis through the wheel 10 relative to a central axis through the shaft 12 can be controllably adjusted by the control system by driving each of the motors 20,20',20" to rotate through a sinusoidal cycle with a greater amplitude of acceleration and deceleration during a single revolution of the wheel 10.

In some forms, the control system can dynamically control the position of the central axis through the wheel 10 relative to a central axis through the shaft 12 in any of the 360 degrees around the shaft 12, providing a full range of relative motion along both the X-axis X-X and Y-axis Y-Y of the wheel assembly 100, and only limited by the relative diameters of the wheel rim 14 and motors 20,20',20".

The spokes 18, 18', 18" can define a curved body that can facilitate a close engagement of the spoke 18, 18', 18" with one or both of the inwardly facing surface of the wheel rim 14 and the outer surface of one or more of the plurality of motors 20,20',20" when the distance between the wheel rim 14 and the motors 20,20',20" is decreased in use. The curved body can help the spokes 18, 18', 18" to generally conform with the curvature of the wheel rim 14 whilst folding towards, and wrapping over, the motors 20,20',20".

In some forms, the spokes 18, 18', 18" can be formed to have a width at the motor linkage 22,22',22" end of the spokes 18, 18', 18" that is slightly wider than the cumulative width of the plurality of motors 20,20',20" as they are arranged side by side on the shaft 12. A supporting plate can be arranged to spin freely on the shaft 12, with a supporting plate being located adjacent to on one or both ends of the shaft 12 one either side of the plurality of motors 20,20',20". The motor linkage 22,22',22" can thus be linked to, and supported by, a respective one of the motors 20,20',20" in addition to the supporting plate/s, thereby strengthening the joint. In some forms, permanent magnets can be mounted within the supporting plate/s to assist with balancing the opposing forces of the various magnets within the plurality of motors 20,20',20", for example, such that the forces in each of motors 20 and 20" are balanced with that of motor 20'.

Referring now to FIGS. 5 to 8, in some forms of the wheel assembly 100, the relative movement of the central axis through the wheel 10 relative to a central axis through the shaft 12 can be restrained mechanically to a movement aligned with the Y-axis of the wheel assembly 100. In the event of a control system failure, the mechanical restraint 30, hydraulic cylinder 75 within the wheel assembly 100, and opposing magnetic fields of each motor 20,20',20" can combine to assist in the continued control of the position of the central axis through the shaft 12 relative to the wheel rim 14. In some forms, the mechanical restraint 30 may help reduce the energy consumption of the plurality of motors 20 by reducing the amount of active control required to restrict the central axis through the shaft 12 in the X-direction X-X, allowing only for relative movement along the Y-axis Y-Y.

Each motor 20,20',20" can be connected to a limiter rotor 34 via a respective one of a plurality of linkages 32,32',32" that are arranged behind the motors 20,20',20", on the vehicle facing inner side of the wheel assembly 100. The linkages 32,32',32" link the motors 20,20',20" to a disc-shaped limiter rotor 34 which is arranged to revolve around a limiter hub 36. The limiter hub 36 in turn is constrained by a mechanical limiter 30 to motion along the Y-axis Y-Y in line with a central axis through the shaft 12, with the mechanical limiter 30 being configured to pivot up and down about a pin 31 that lies parallel to the X-axis X-X and is fixed in alignment with the central axis through the shaft 12. The mechanical limiter 30 thus acts to restrict the central axis through the wheel 10 against movement along the X-axis X-X, allowing only movement along, and in alignment with, the Y-axis Y-Y that passes through the central longitudinal axis through the shaft 12.

In use, the control system of the wheel assembly 100 can thus operate the motors 20,20',20" to determine the position of the central axis through the wheel 10 relative to a central axis through the shaft 12 along, and in alignment with, the Y-axis Y-Y. When each of the plurality of motors 20,20',20" are operated simultaneously at the same velocity, the wheel assembly 100 maintains a neutral configuration where the central axis through the wheel 10 aligns concentrically with the central axis through the shaft 12 (e.g. FIGS. 5A, 5B and 10B). When each of the plurality of motors 20,20',20" are operated to oscillate sinusoidally between acceleration and deceleration during a single rotation of the wheel 10, with each motor 20,20',20" reaching a peak velocity in an offset manner as the corresponding spoke 18, 18', 18" rotates through the lowest point of the revolution (i.e. approximately 270 degrees on a unit circle), thereby causing the corresponding spoke 18, 18', 18" to be contracted towards the motors 20,20',20" as it nears that angular position. The central axis through the wheel 10 is thus shifted upwards relative to a central axis through the shaft 12, towards an elevated configuration, with the mechanical limiter 30 ensuring that the movement of the central axis through the shaft 12 remains in alignment with the Y-axis Y-Y (e.g. FIGS. 6A and 6B, 10A, and 11A to 11E). However, when each motor 20,20',20" reaches a peak velocity as the corresponding spoke 18, 18', 18" rotates through the highest point of the revolution (i.e. approximately 90 degrees on a unit circle), the corresponding spoke 18, 18', 18" is caused to be contracted towards the motors 20,20',20" as it nears that angular position, thereby shifting the central axis through the wheel 10 downwards relative to a central axis through the shaft 12, towards a lowered configuration, with the mechanical limiter 30 again ensuring that the movement of the central axis through the shaft 12 remains in alignment with the Y-axis Y-Y as the wheel 10 extends outwardly from the shell of the wheel assembly 100 (e.g. FIGS. 7A and 7B, 10C, and 12A to 12D.).

In some forms, each linkage 32,32',32" has a longitudinal length that equates to approximately half the longitudinal length of the spokes 18, 18', 18". A first distal end of each linkage 32,32',32" pivotably engages a respective one of the motors 20,20',20" via an extended portion of the respective motor linkages 22,22',22", with the pivot point of the extended portion of the respective motor linkages 22,22',22" being at a radial length C-C from the central axis of the motors 20,20',20" that equates to approximately half the radius D-D of the motors 20,20',20". An opposing second distal end of each linkage 32,32',32" pivotably engage the limiter rotor 34 at a radial length A-A from the central axis of the shaft 12 that equates to approximately half the radial distance B-B of the wheel linkage 24 from the central axis of the shaft 12.

In some forms, the limiter rotor 34 is configured to function as a disc brake, with a brake rotor 35 and calliper 37 assembly mounted thereto in order to provide smooth mechanical braking for the wheel assembly 100. Although in some forms the motors 20,20',20" can be configured to produce regenerative braking force, the addition of a mechanical braking assembly can be used to compliment the regenerative braking system and help improve the safety of the vehicle operation should the regenerative braking system fail. Similarly, the mechanical limiter 30 can act as an additional safety control in instances where the control system or motors 20,20',20" experience a failure whilst the vehicle is moving, as the limiter can retain the wheel 10 from movement along the X-axis X-X which could compromise vehicle control.

A regenerative braking system, when incorporated with the wheel assembly 100, may improve the range of distance with which the vehicle distance can travel. Any electrical power generated from the regenerative braking system can be supplied back to the main vehicle power supply, located external from the wheel assembly 100, for example to a battery and/or a super capacitor that are integrated with the vehicle chassis.

The wheel assembly 100 further comprises one or more sensors, not shown, that are configured to detect the state of the ground surface surrounding the vehicle, and in particular the ground surface forward of the wheel assembly 100 that is anticipated to imminently come into contact with the wheel 10. These sensors can be configured to detect a variety of inputs including, but not limited to, the relative distance between each corner of the vehicle chassis and the ground surface beneath the vehicle chassis, the topology of the ground surface forward of the moving vehicle and each wheel assembly 100, the acceleration and g-forces experienced by an occupant of the vehicle cabin, and when an impact with an external object is imminent. The sensor/s can communicate the detected state of the ground surface directly and in-real time to the control system of the relevant wheel assembly 100. In some forms, the sensed data can be communicated by the one or more sensors in-real time to the centralised control system. The centralised control system can centrally collate all of the sensor data, and then process the data in order to compute and determine if any corrective actions are required in-real time by one or more wheel assembly 100 in order to improve the operation of the vehicle.

For example, in some forms the one or more sensors can include an accelerometer that is configured to measures the acceleration forces acting on the wheel assembly 100, in order to detect the roll, yaw and position in space of the wheel 10 in real time. The data detected by the accelerometer can be processed in real time by the control system, or centralised control system. In turn, the control system, or centralised control system, can controllably direct the motors 20,20',20" to instantaneously, and in real-time, begin to oscillate sinusoidally between acceleration and deceleration during a single rotation of the wheel 10. The control system, or centralised control system, can controllably time the peak and/or a trough velocity of each motor in an offset manner, whilst positioning the peak and/or a trough velocity at an angular position of the revolution of the motors 20,20',20" whereby the phase of the sinusoidal oscillations determines whether the position of the central axis through the wheel 10 relative to the central axis through the shaft 12 is adjustably shifted upwards towards an elevated configuration of the wheel assembly 100 (e.g. FIG. 10A) where the wheel 10 is contracted within the shells of the steering assembly 60, and/or extended downwards towards a lowered configuration of the wheel assembly 100 (e.g. FIG. 10C) to effect a real-time force dampening for the wheel assembly 100 which can compensate for the detected state of the ground surface. In this manner, the wheel assembly 100 can be provided with active suspension in real-time within the wheel 10 in response to the detected state of the ground surface, in order to maintain the central axis through the shaft 12 at a substantially constant level, which helps to maintain a substantially level operation of the vehicle as a whole in a relatively smooth manner.

In some forms, the active suspension of each wheel assembly 100 of the vehicle can be proactively used to adjustably control the pitch and roll of the vehicle in order to shift the centre of mass of the vehicle during cornering. This may be used to effectively equalise the forces applied to the wheels 10 of the vehicle by the ground surface as the vehicle travels through the curved trajectory of the bend or corner, thereby optimising the grip of each of the wheels 10 against the ground surface. By using a plurality of in-wheel motors 20,20',20" to simultaneously effect both the drive of the vehicle and the active suspension of an individual wheel 10, the singular set of in-wheel motors 20,20',20" can serve a dual purpose whilst helping to reduce the overall weight and bulk of the vehicle.

In a variation, the wheel assembly can comprise two motors that are arranged side by side on the same shaft, with one spoke extending from each of the motors to support the wheel therearound. In a further variation, the wheel assembly can comprise two motors that each have two spokes extending away therefrom from diametrically opposed sides of the motors. In yet a further variation, the wheel assembly can comprise four motors that are arranged side by side on the same shaft. As would be appreciated by one skilled in the technical field, numerous further variations are contemplated within the scope of the present disclosure.

In some forms, it may be preferable for the wheel assembly to utilise an even number of spokes. In some forms, an even number of spokes may improve the smoothness with which the wheel assembly can be operated, as each spoke can be balanced against an opposing spoke on the same motor, or on a different motor, as the inertia from a first motor accelerating can be substantially balanced out by the inertia of an opposing deceleration of a second motor.

Referring now to FIGS. 9 to 12, a graph is presented depicting an example of the some of the phases of operation of the wheel assembly 100, and in particular how the angular velocity of each of the motors 20,20',20" of the wheel assembly 100 can be controlled by the control system over time to adjustably shift the relative position of the central wheel axis.

Starting with the motors 20,20',20" and wheel 10 of the wheel assembly 100 at rest in the first stage 81, the relative position 96 of the central axis through the wheel 10 is held in the neutral configuration (e.g. FIG. 10B), where it is aligned to be concentric with that of the central axis through the shaft 12.

At the second stage 82, the control system begins to controllably operate the plurality of in-wheel motors 20,20', 20", directing them to steadily accelerate in unison until the angular velocity of rotation of the wheel 94 reaches the desired magnitude (e.g. 180 degrees per second). At the third stage 83, the plurality of motors 20,20',20", continue to rotate in unison at the desired angular velocity 94, thereby maintaining the wheel 10 at the same constant angular velocity 94. During the second 82 and third stages 83, the operation of each of the plurality of motors 20,20',20" is synchronised such that the each of the plurality of motors 20,20',20" drives the wheel rim 14 with the same torque and angular velocity 94 in unison. The relative position 96 of the central axis through the wheel 10 is thus maintained in the neutral configuration.

At the fourth stage 84, the control system controllably adjusts the operation of each of the motors 20,20',20" individually, directing them to begin to sinusoidally accelerate and decelerate at individually offset timing phases. For example, the control system could initiate such an operation in response to a detected state of the ground surface forward of the wheel assembly 100, such as a protrusion, in order to effectively provide active suspension to the wheel assembly 100. Although the individual motors 20,20',20" accelerate and/or decelerate, the resulting cumulative effect of the sinusoidal oscillations being at offset phases is that the angular velocity of rotation of the wheel 94 remains the same as in the third stage 83. However, as each motor 20,20',20" is controlled to reach a peak velocity 93,93',93" in an offset manner as the corresponding spoke 18, 18', 18" rotates through the lowest point of the revolution (e.g. FIGS. 11A to 11E), the corresponding spokes 18, 18', 18" are urged to orient to decrease the relative angular distance between the motor linkage 22,22',22" of the accelerating motor 20,20',20" and corresponding wheel linkage 24 as they near that angular position (i.e. approximately 270 degrees on a unit circle), in order to compensate for the differential in relative velocities. The contraction of the 18, 18', 18" proximal to the lowest point of the revolution about the shaft 12, effects a steady upward shift of the position 96 of the central axis through the wheel 10 relative to a central axis through the shaft 12, towards the elevated configuration (e.g. FIG. 10A). During the deceleration of each motor 20,20', 20", the corresponding spokes 18, 18', 18" are urged to orient to decrease the relative angular distance between the motor linkage 22,22',22" of the accelerating motor 20,20',20" and corresponding wheel linkage 24 so as to compensate for the differential in relative velocities. The magnitude of the sinusoidal oscillations between can be increased, thereby increasing the magnitude of the shift in the relative position 96 of the central axis through the wheel 10. During the fifth stage 85, the magnitude of the sinusoidal oscillations is maintained at a constant magnitude, with the relative position 96 of the central axis through the wheel 10 maintained in an eccentric elevated configuration. Again, the angular velocity of rotation of the wheel 94 remains constant as the offset phase of the sinusoidal oscillations of the motors 20,20',20" balance out each other to have a net zero effect.

At the sixth stage 86, the control system controllably adjusts the magnitude and phase of the sinusoidal acceleration and deceleration of each of the motors 20,20',20" individually, shifting the timing and angular position of the peak 93,93',93" and trough 92,92',92" angular velocities of each motors 20,20',20", respectively, such that each motor 20,20',20" reaches a peak velocity as the corresponding spoke 18, 18', 18" rotates through the highest point of the revolution (e.g. FIGS. 12A to 12D). As each spoke 18, 18', 18" nears the angular position of the peak velocity 93,93', 93" (i.e. approximately 90 degrees on a unit circle), the spokes 18, 18', 18" are urged to orient to decrease the relative angular distance between the motor linkage 22,22', 22" of the accelerating motor 20,20',20" and corresponding wheel linkage 24 so as to compensate for the differential in relative velocities. As a result, the relative position 96 of the central axis through the wheel 10 is shifted downwards relative to a central axis through the shaft 12, through the neutral configuration, and towards an eccentric lowered configuration. For example, the control system could initiate such an operation in response to a detected state of the ground surface forward of the wheel assembly 100, such as a pot-hole in the ground surface, in order to effectively provide active suspension to the wheel assembly 100. During the seventh stage 87, the magnitude of the sinusoidal oscillations is maintained at a constant magnitude, with the relative position 96 of the central axis through the wheel 10 maintained in an eccentric lowered configuration. During the eighth stage 88, the magnitude of the sinusoidal oscillations is gradually decreased in magnitude until the plurality of motors 20,20',20" are again synchronised such that the each of the plurality of motors 20,20',20" drives the wheel rim 14 with the same torque and angular velocity 94 in unison. As the sinusoidal oscillations are decreased, and the velocities of each of the motors 20,20',20" return to a synchronised constant velocity, the relative position 96 of the central axis through the wheel 10 is adjustably shifted to return to the neutral configuration. The angular velocity of rotation of the wheel 94 remains constant throughout the sixth 86, seventh 87, and eighth 88 stages, as the control system directs the operation of the motors 20,20',20" in a manner where the offset phases of the sinusoidal oscillations continues to balance out each other to have a net zero effect.

At the ninth stage 89, the plurality of motors 20,20',20", again rotate in unison at the desired angular velocity 94, thereby maintaining the wheel 10 at the same constant angular velocity 94. The operation of each of the plurality of motors 20,20',20" is again synchronised such that the each of the plurality of motors 20,20',20" drives the wheel rim 14 with the same torque and angular velocity 94 in unison. The relative position 96 of the central axis through the wheel 10 is maintained in the neutral configuration.

At the tenth stage 90, the control system begins to steadily decelerate the plurality of in-wheel motors 20,20',20" in unison until the angular velocity of rotation of the wheel 94 returns to zero and the wheel 10 is at rest. The relative position 96 of the central axis through the wheel 10 is again held in the neutral configuration, where it is aligned to be concentric with that of the central axis through the shaft 12. This continues into the eleventh stage 81', which replicates the first stage 81.

Figure 13A:
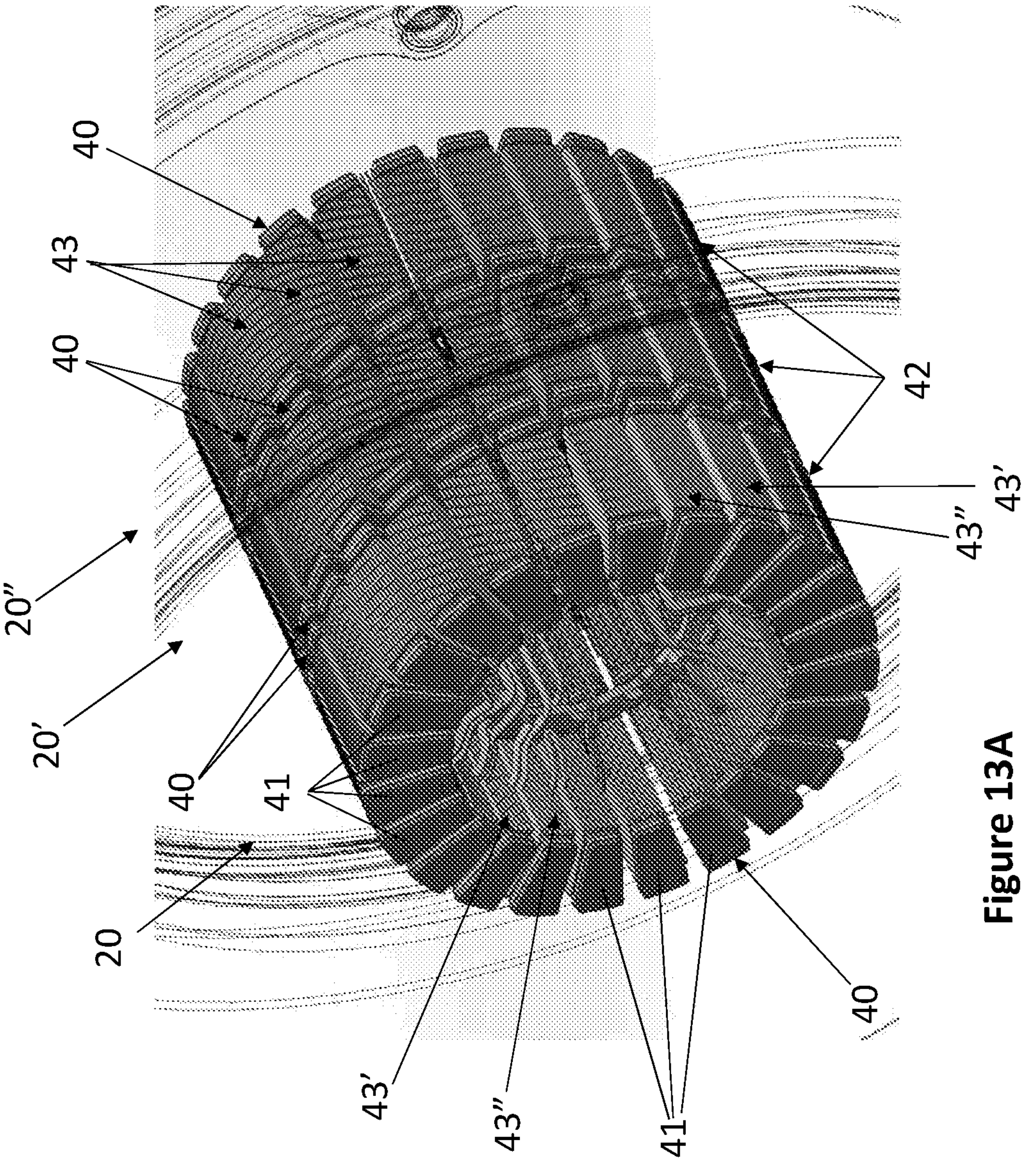
FIGS. 13A and 13B are projection and front views of an embodiment of the rotors and stators of the wheel assembly.
Figure 13B:
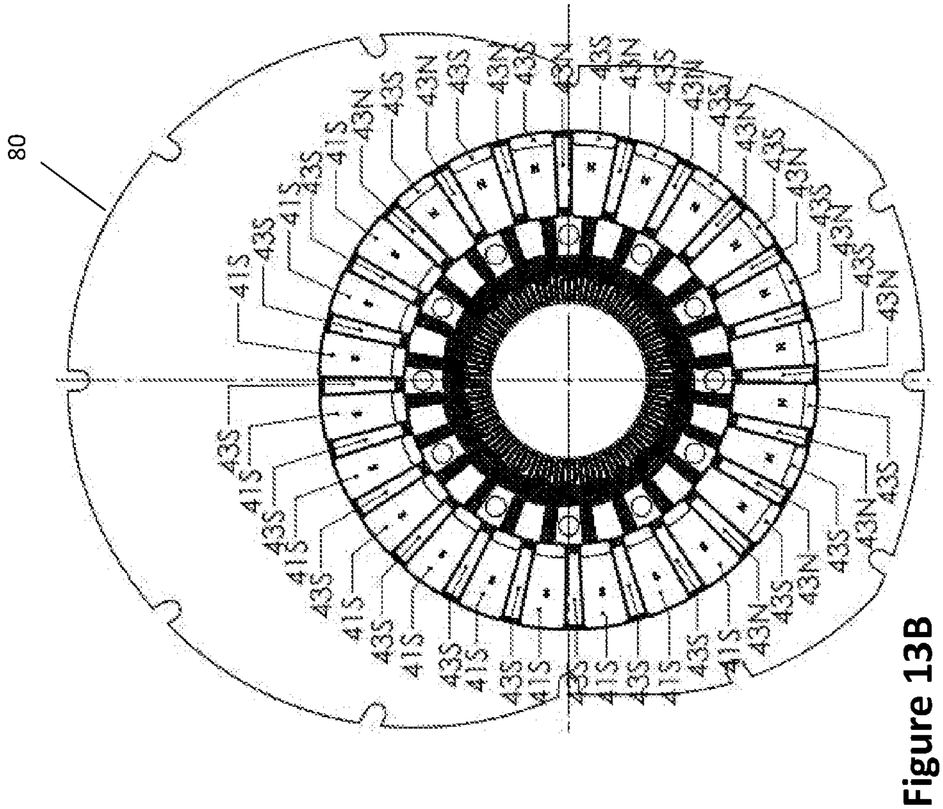
Figure 14C:
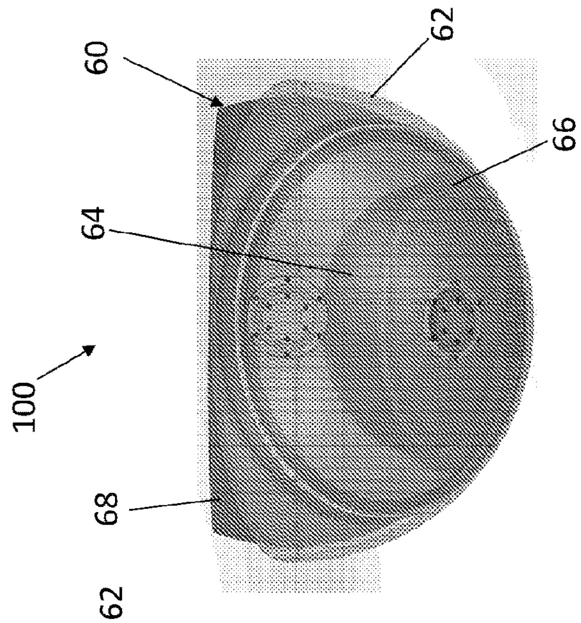
FIGS. 14A, 14B and 14C are semi-transparent rear, side and top views, respectively of the steering assembly of the wheel assembly of FIG. 1, when the wheel is rotated to zero degrees (i.e. straight) relative to a straight orientation of the vehicle.
Figure 14B:
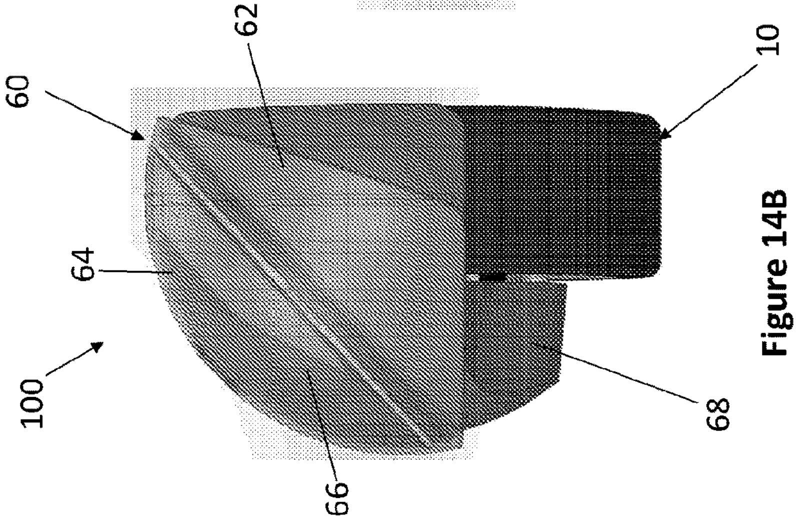
Figure 14A:
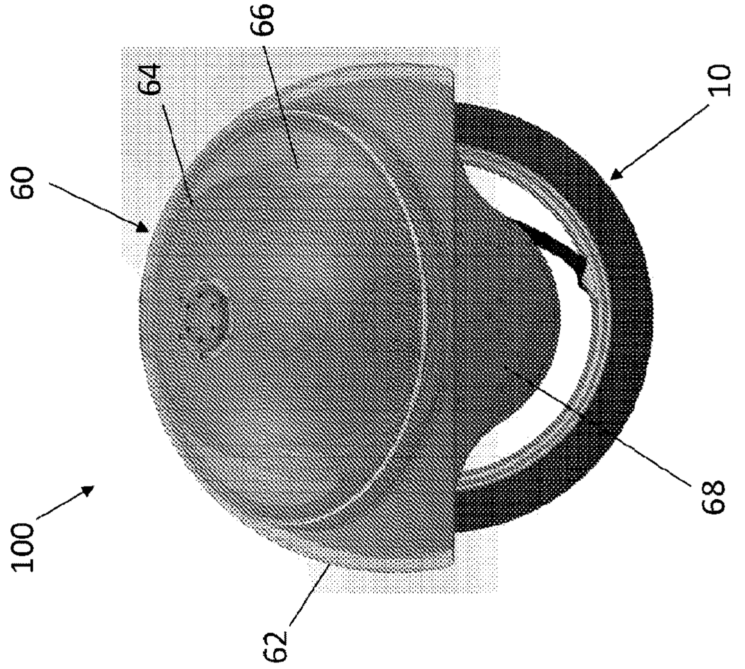
Figure 15C:
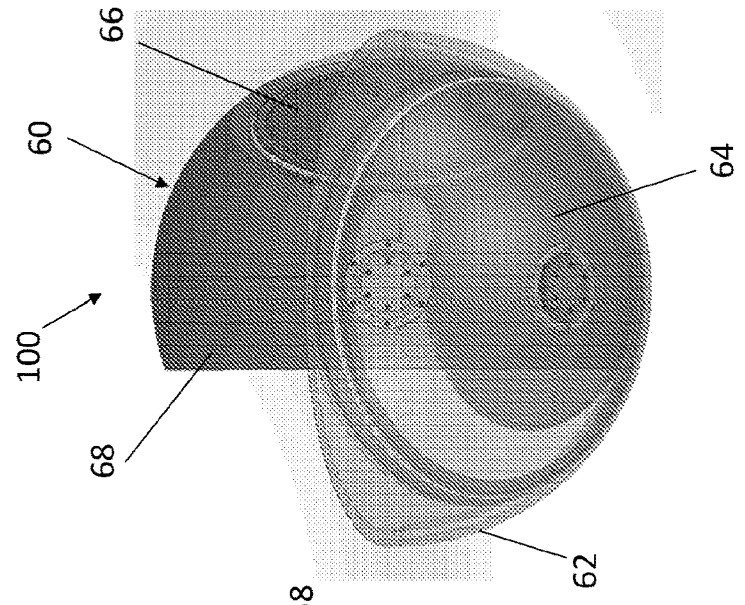
FIGS. 15A, 15B and 15C are semi-transparent rear, side and top views, respectively of the steering assembly of the wheel assembly of FIG. 1, when the wheel is rotated to approximately 90 degrees relative to a straight orientation of the vehicle.
Figure 15B:
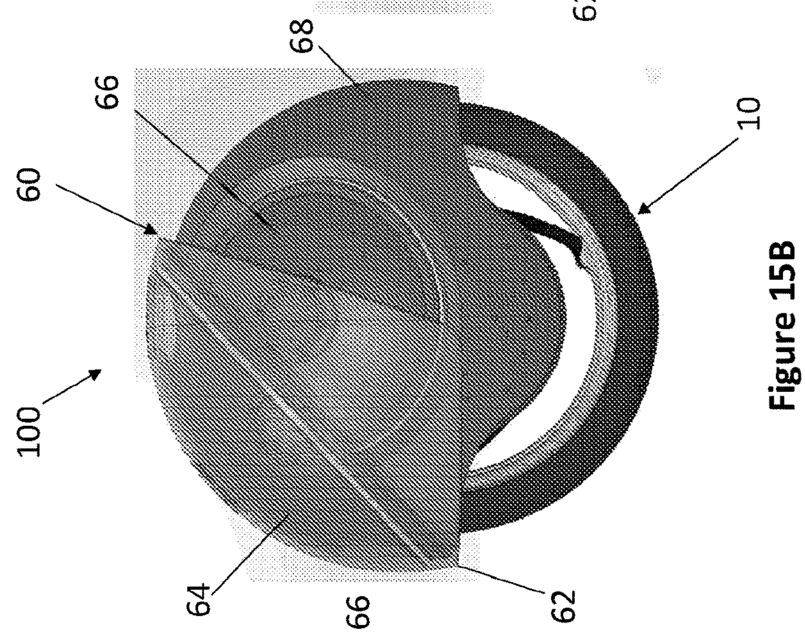
Figure 15A:
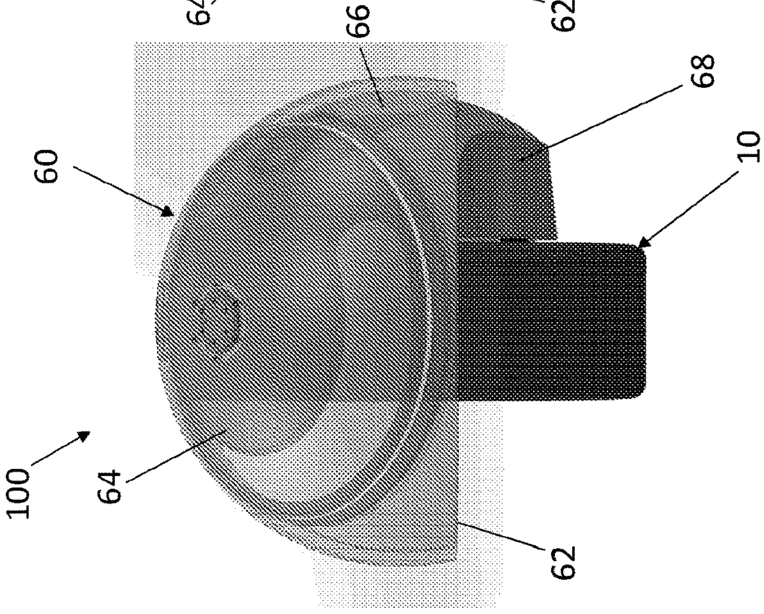
Figure 16:
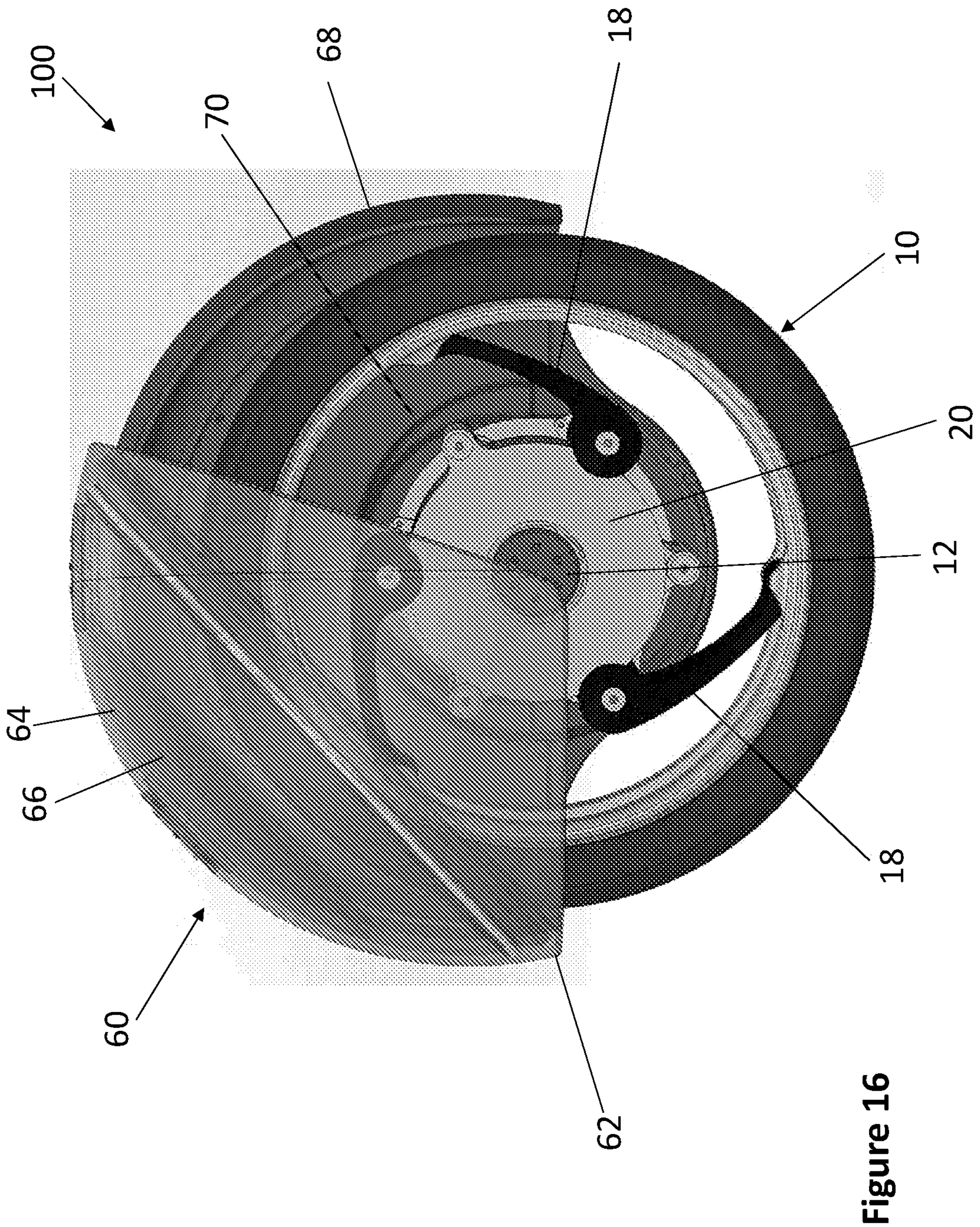
FIG. 16 is a semi-transparent side view of the steering assembly of the wheel assembly of FIG. 1, when the wheel is rotated to approximately 270 degrees relative to a straight orientation of the vehicle.
Figure 17A:
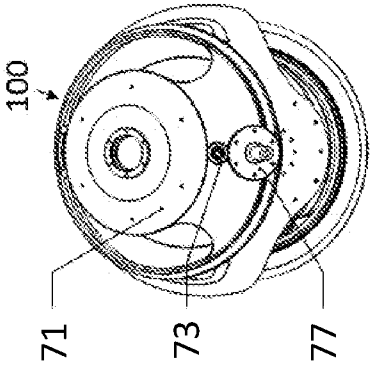
FIGS. 17A to 17F are rear views of the steering assembly of the wheel assembly of FIG. 1 with the outermost shell removed, when the wheel is rotated to approximately 270 degrees relative to a straight orientation of the vehicle.
Figure 17B:
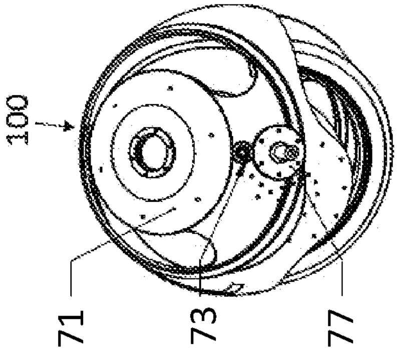
Figure 17C:
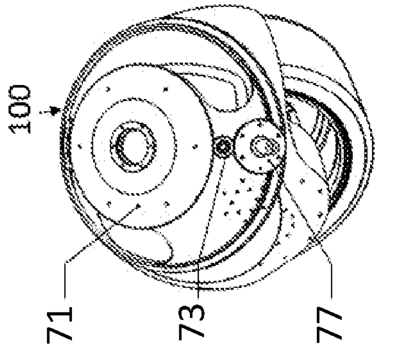
Figure 17D:
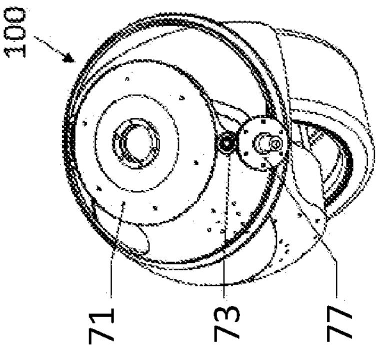
Figure 17E:
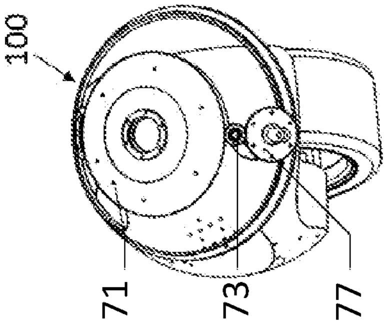
Figure 17F:
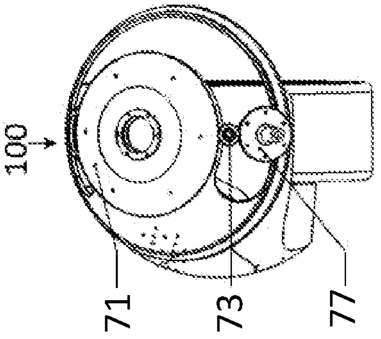
Figure 18B:
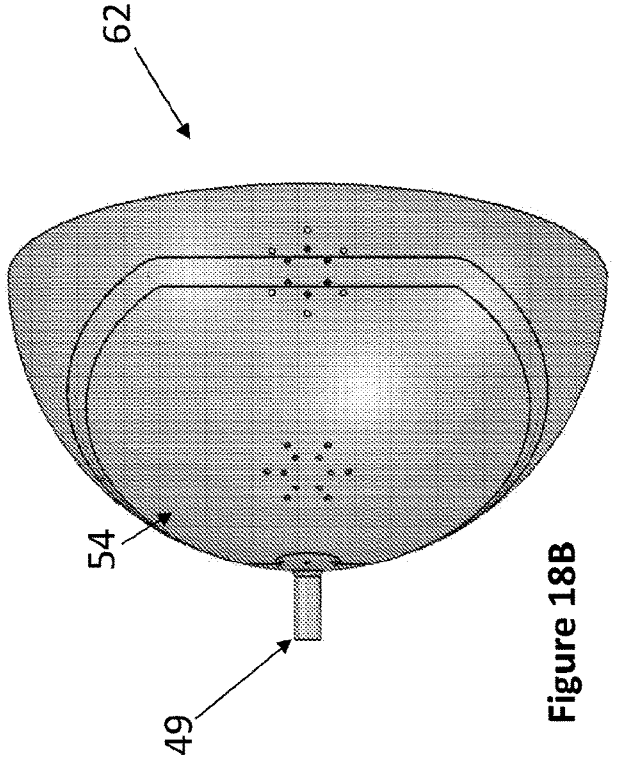
FIGS. 18A to 18H are front, top, back, side, anterior projection from above, posterior projection from above, anterior projection from below, and posterior projection from below views, respectively, of an embodiment of the outermost shell of the steering assembly.
Figure 18D:
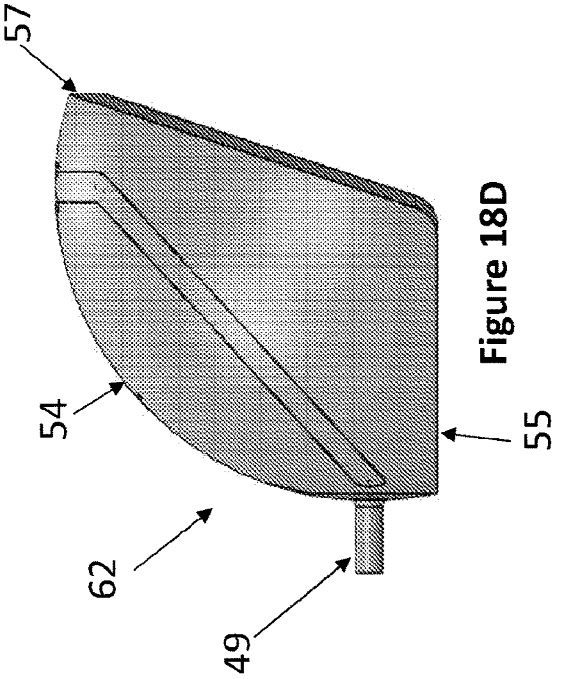
Figure 18A:
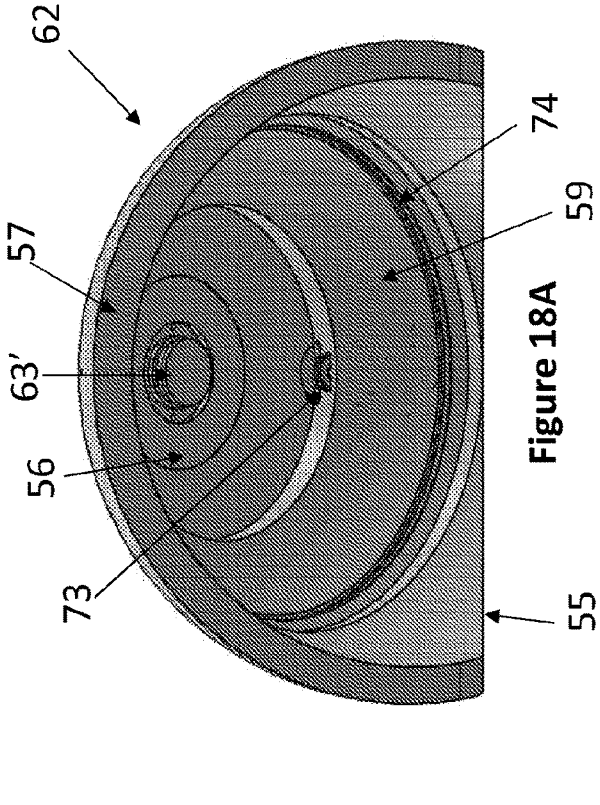
Figure 18C:
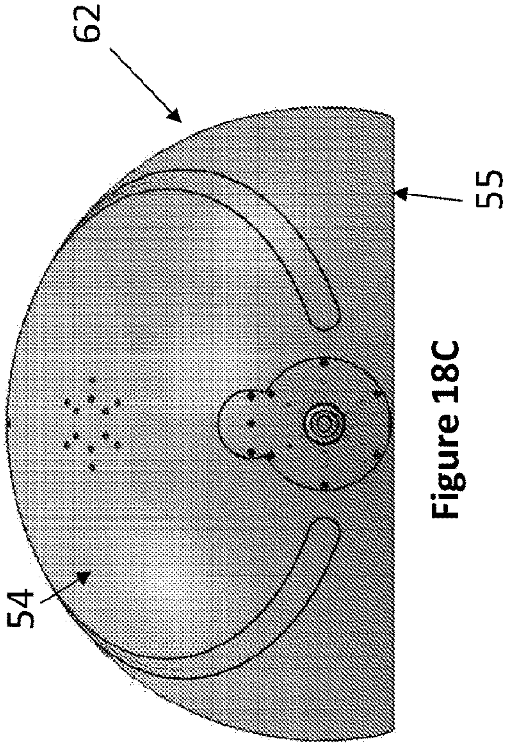
Figure 18E:
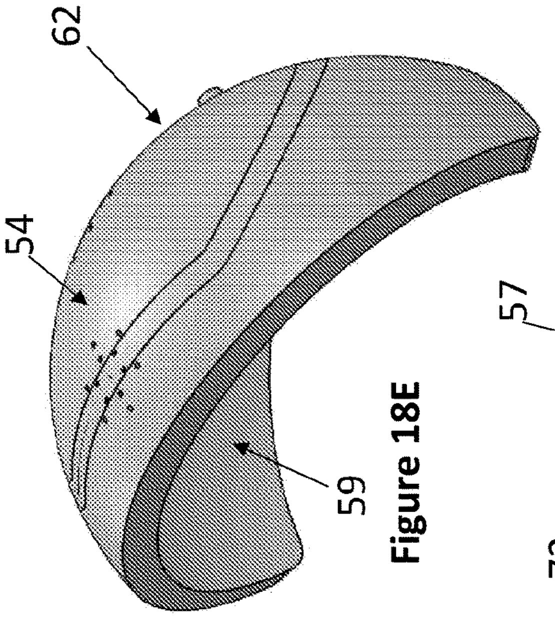
Figure 18F:
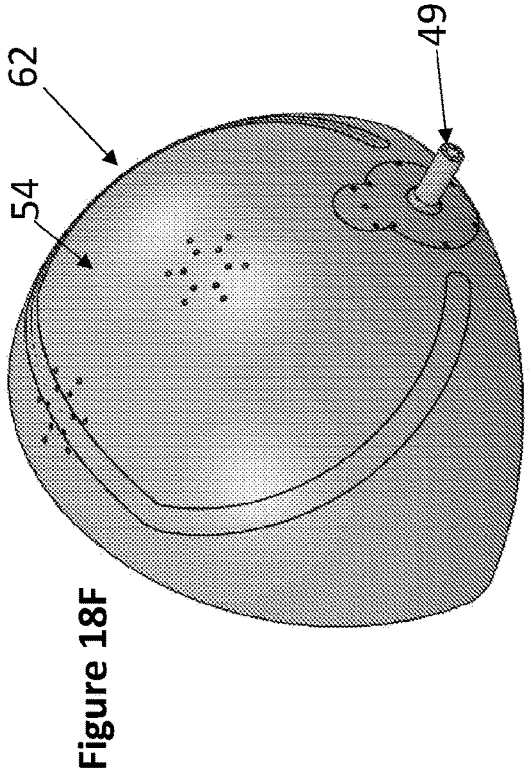
Figure 18G:
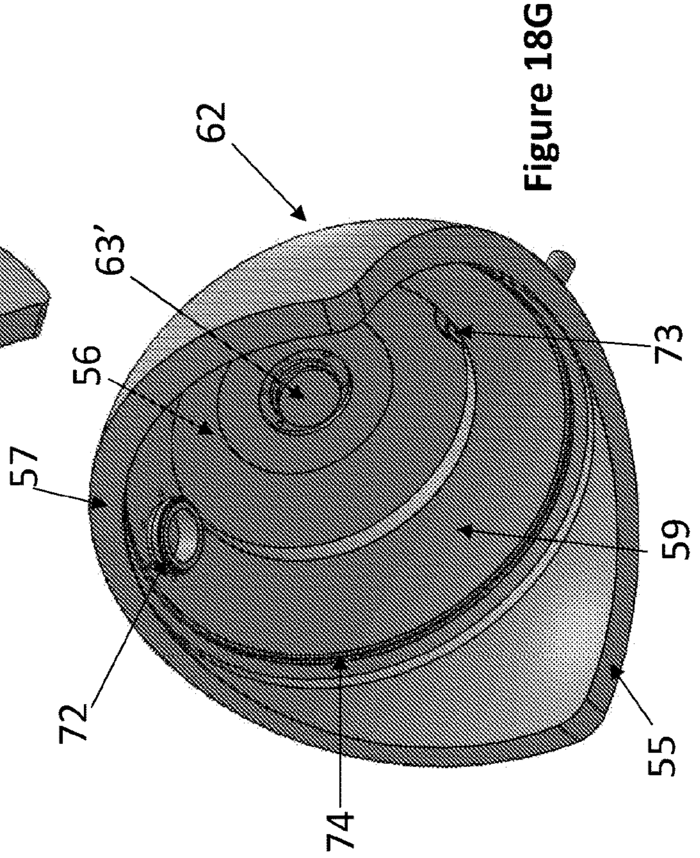
Figure 18H:
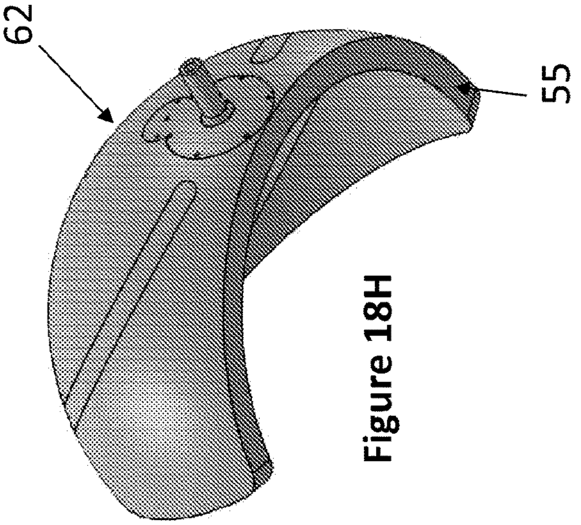

Referring now to FIGS. 13A and 13B, each motor 20,20', 20" of the wheel assembly is comprised of a rotor 40 and a stator 42 that are located therein. The rotor 40 and a stator 42 of each motor 20,20',20" are both arranged concentrically along the shaft 12, whereby the shaft 12 aligns with the centre of mass of each of the rotors 40 and stators 42, with the rotor/s 40 of each motor 20,20',20" being arranged to rotate about the shaft 12 relative to a corresponding stator 42.

In some forms, each motor 20,20',20" can be an axial flux motor that is arranged as a brushless twelve-phase DC motor. The rotor 40 comprises a plurality of permanent magnets 41 that are arranged to define a ring of magnets adjacent each of the opposing sides of a copper stator 42, so as to balance the magnetic forces on either side of the stator 42. The central axis though each ring of magnets aligns concentrically with the axis through the shaft 12. The stator 42 is arranged in plurality of parallel planar segments 43. In some forms, each ring of magnets of the rotor 40 may comprise the same quantity of magnets 41 as the quantity of segments 43 of the corresponding stator 42. Half of the segments 43 are configured to be excited by a current within the stator 42 segments 43 that forms a magnetic field therearound having a first polarity. The other half of the segments 43 are configured to be excited by a current within the stator 42 segments 43 that forms a magnetic field of an opposing second polarity therearound. For example, in some forms, the stator 42 may comprise twenty four copper segments 43, where twelve of the segments 43 can be excited to form a magnetic field having a positive polarity, whilst the other twelve copper segments 43 are excited to form a magnetic field having a negative polarity. The current within the stator 42 segments 43 is generated from a power source stored within the vehicle chassis (e.g. the car battery). The current is distributed from the power source by the centralised control system to the individual wheel assemblies 100 of the vehicle, and then by the individual control system to the stator segments 43 through conduits in the shaft 12.

The permanent magnets 41 in each ring of magnets are arranged whereby the surface facing towards, and proximally adjacent to, the segments 43 provide a magnetic field having an opposing polarity to that of the magnetic field around the segments 43 of the stator 40. By reversing the current on the leading 43' and trailing 43" segments of the stator 42, the magnetic field within the segments 43 of the stator 42 can be rotated about the shaft 12. As the magnetic field within the segments 43 is rotated, the magnetic field within the permanent magnets 41 of the rotor 40 is urged to simultaneously rotate in order to return the opposing magnetic fields to a position in which the polarities of the adjacent magnetic fields facilitates a magnetic attraction force therebetween. The control system can thus drive the angular velocity rotation of the rotor 40 of each of the plurality of motors 20,20',20" by controllably reversing the current on the leading 43' and trailing 43" segments of the stator 42 in order to rotate the magnetic field within the segments 43 at the desired angular velocity.

The permanent magnets 41 of the rotor 40 are positioned such that they also generate a magnetic field on the outer facing side of each rotor 40. The magnetic field of a first rotor 40 is positioned such that it acts in opposition to, and repels, the magnetic field generated by an adjacent second rotor 40. The permanent magnets 41 are thus configured so as to effectively replicate the functional performance of torsional springs between the rotors 40 of adjacent motors 20,20',20", whereby, when the motors 20,20',20" are at rest the opposing magnetic fields resiliently rotate the rotors 40 so as to return the corresponding spokes 18, 18', 18" to their at-rest starting position. In some forms, the rotor magnetic fields can be configured whereby the rotors 40 of the plurality of motors 20,20',20" are inclined to return the wheel assembly 100 to the neutral configuration with the spokes 18, 18', 18" located in a substantially equidistant spacing around the circumference of the plurality of motors 20,20',20" when the plurality of motors operate at a common velocity. The common velocity can be a common angular velocity of zero or greater, whether the motors 20,20',20" are accelerating, decelerating, or maintaining the velocity. For example, where there are three spokes the spacing can be 120° apart. In some forms, depending on the strength of the permanent magnets 41 used in the rotor 40 it may be necessary to integrate one or more resilient springs, or a hydraulic cylinder 75 and accompanying piston, that engages and lifts the mechanical limiter 30 along the Y-axis Y-Y, whereby the spring/s or hydraulic cylinder and piston are configured to act as an auxiliary support for the permanent magnets 41 and assist with resiliently returning and maintaining the wheel assembly 100 to the at-rest starting position and neutral configuration where the central axis through the wheel 10 is concentric to the central axis through each of the motors 20,20',20".

In some forms, one or more sensors can be located on the stator 42 proximal the rotor 40, with the sensor/s being configured to detect the orientation of the rotor 40 by measuring variations in the magnetic field. In some forms, the sensor/s can be used to measure angular velocity of an individual motor 20,20',20". In some forms, one or more sensors be located on the stator 42, with the sensor/s being configured to detect a temperature within the respective motor 20,20',20". The electrical wiring that provides current to each of the stator segments 43 and the one or more sensors within each of the stators 40 can be ducted through the shaft 12 of the wheel assembly 100 in order to communicate with the control system.

For example, a Hall effect sensor can be located proximal to each rotor, and a temperature sensor can be installed within each stator. The Hall effect sensors are statically fixed relative the stator 42, and configured to detect the relative presence and magnitude of the magnetic field of the adjacent permanent magnets 41 of the ring of magnets of the rotor 40. The control system can translate the communicated output voltage of the Hall effect sensor, which is directly proportional to the strength of the magnetic field, in order to calculate the relative position and thus rotational velocity, rotational direction, and y-axis position of each of the rotors 40, the motors 20,20',20" and thus the wheel rim 14. The communicated information from each of the Hall effect and temperature sensors can be processed by the control system and compared against pre-determined limits. The control system can thus process if one or more of the motors is stalling and/or over-heating, and take preventative action if required. The Hall effect and temperature sensors can communicate any detected information to the control system, whereby the control system can, in response, controllably adjust the angular velocity of the rotation of the magnetic field around the stator 42, or alternatively, adjustably control the amount of electrical current that is provided to the stator segments 43 in order to increase or decrease the magnetic field strength, as required.

The sensor/s may assist the control system in maintaining a synchronised rotation of the magnetic field around the permanent magnets 41 of the rotor 40 with the rotating magnetic field of the stator 42. The sensor/s may also assist the control system in preventing the motors 20,20',20" of the wheel assembly 100 from over-heating. For example, in some forms when the vehicle is being driven to travel up a sloped ground surface an increased torque load may be applied against the wheel 10 which acts to reduce the speed of rotation of the rotor 40 relative to the rotational speed of the magnetic field around the stator 42. In such instances, the one or more Hall Effect sensors can communicate the reduction in relative angular velocity between the magnetic field around rotor 40 and the magnetic field around the stator 42 to the control system. The control system, in response, can counteract the increased torque by either controllably increasing the magnitude of the magnetic field strength around the stator 42 by increasing the electrical current therein, or controllably reduce the rotational speed of the magnetic field around the stator 40 such that the relative angular velocity between the magnetic field around the rotor 40 and the magnetic field around the stator 42 remains substantially synchronised.

The control system can also use the received information from each Hall effect sensor to calculate in-real time if a change in the y-axis position is required or if the y-axis position should be maintained, by comparing the calculation of the actual y-axis position from each Hall effect sensor with the required y-axis position. The control system can then control the y-axis position such that it is changed or maintained in real-time, in response to the determined differential between the calculated y-axis position and the required y-axis position.

The centralised control system collects the information communicated thereto by the control system of each of the wheel assemblies 100 of the vehicle. The centralised control system can process and compare the information from a single wheel assembly 100 with the information gathered from each of the other wheel assemblies 100 of the vehicle. The centralised control system can use this information to assist in identifying the status of a specific wheel assembly 100. For example, the information collected by the centralised control system can be processed to identify instances where a specific one of the wheel assemblies 100 has experienced a loss of traction, or to calculate the relative force of each wheel 10 on the road. The centralised control system can also use the collected information to calculate the overall velocity of the vehicle. The centralised control system can also use the collected information, for example from the accelerometer, to identify any undulations in the surface beneath a wheel assembly 100, calculate the distance between the wheel 10 and the ground surface, and ascertain the relative level of each wheel 10 of the vehicle. Data inputs from other sensors that are spaced around the vehicle chassis, such as accelerometers and road topology scanners, can be used in conjunction with the sensors of the wheel assembly 100 to complement the information communicated by the control system of an individual wheel assembly 100. This can assist the centralised control system with collating a high level of detail regarding the vehicle's surroundings. The centralised control system can use this information to assist with optimising the safety, comfort, and efficiency of the vehicle. For example, the centralised control system can utilise the data to controllably adjust the y-axis position of one or more of the wheels 10 in order to maintain a substantially level relative pitch and roll angle for the vehicle, thereby facilitating active suspension of the vehicle.

The control system can be housed between the inner two shells of the wheel assembly 100, adjacent a distal end of the shaft 12. This may help to reduce the amount of cabling that is required within the wheel assembly 100. The control system is in wired communication with a power supply that is located externally from the wheel assembly 100 and can be wired to communicate with the centralised control system, also located externally from the wheel assembly 100, in order to exchange information regarding the individual wheel assembly 100. In some forms, the control system can be configured to communicate wirelessly and in-real time with the centralised control system. Where required, the cabling from the control system can be fed out from the wheel assembly 100 into the chassis of the vehicle via the pivot neck 72 about which the wheel assembly 100 is steered.

Referring now to FIGS. 14 to 40, the hub-style in-wheel motors 20,20',20" enable the wheel assembly 100 to be operated without drive axles and cv joints. The wheel assembly 100 is thus free to be steered to turn with a high degree of manoeuvrability. In some forms, the wheel assembly 100 can be configured to pivot more than a full 360° of rotation about the Y-axis Y-Y of the wheel assembly 100. In some forms, the wheel assembly 100 can be steered to an angle whereby the vehicle can be manoeuvred through a zero-point turning circle. In some forms the wheel assembly 100 can be steered to an angle whereby the vehicle can be manoeuvred sideways relative to the forward facing direction of the vehicle.

For example, the wheel assembly 100 can comprise a steering assembly 60 comprised of four concentric partially spherical or hemispherical shells, with each shell being configured to pivot relative to the other shells, without exposing the bearing surfaces. In some forms, the bearings about which each shell is configured to pivot can utilise a bearing seal, without requiring a protective rubber boot thereat.

Figure 19B:
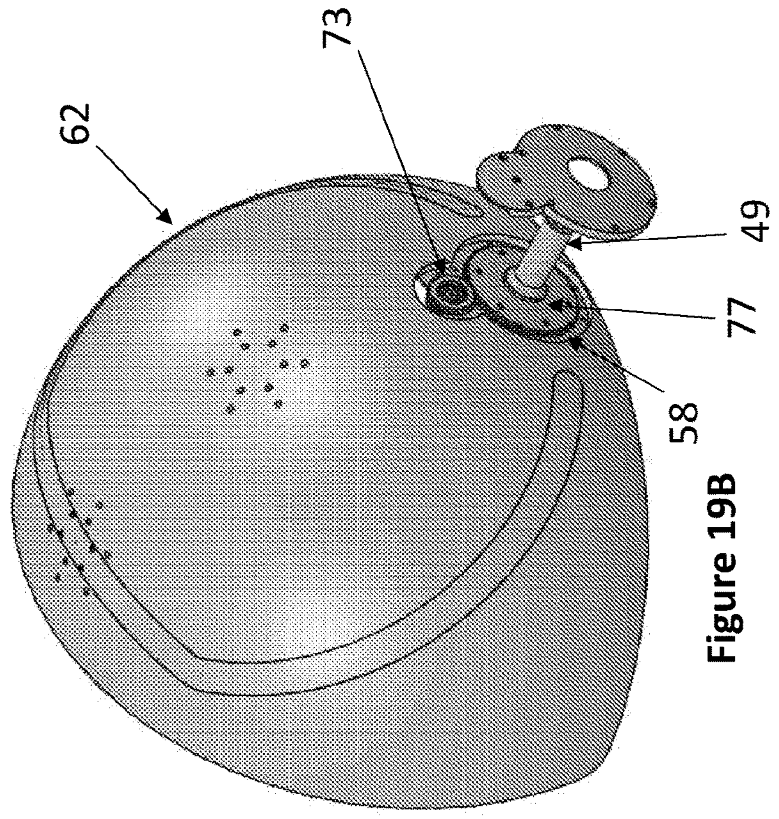
FIGS. 19A and 19B are exploded anterior projection from below and exploded posterior projection from above views, respectively, of the embodiment of the outermost shell of FIG. 18.
Figure 19A:
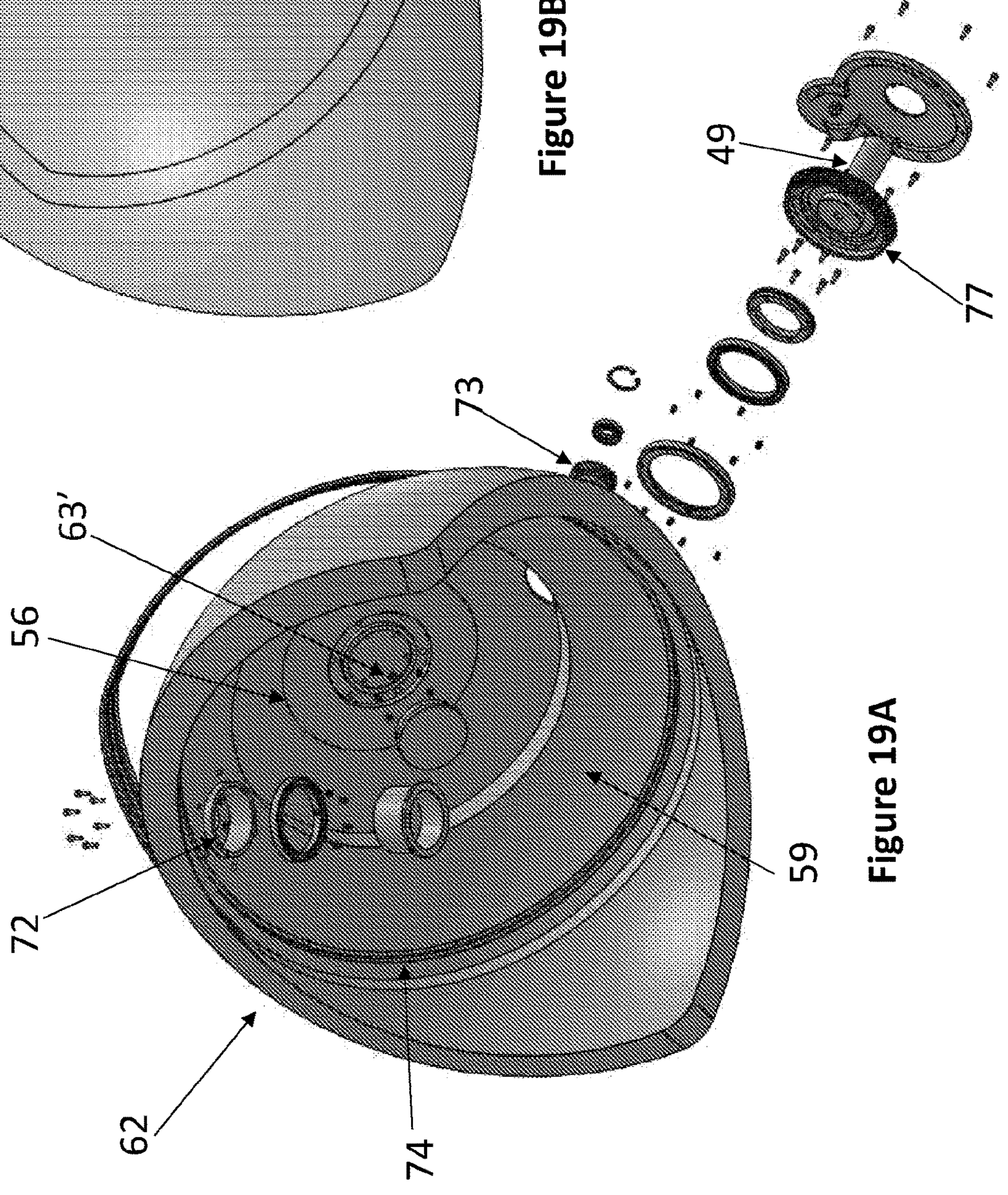
Figure 20B:
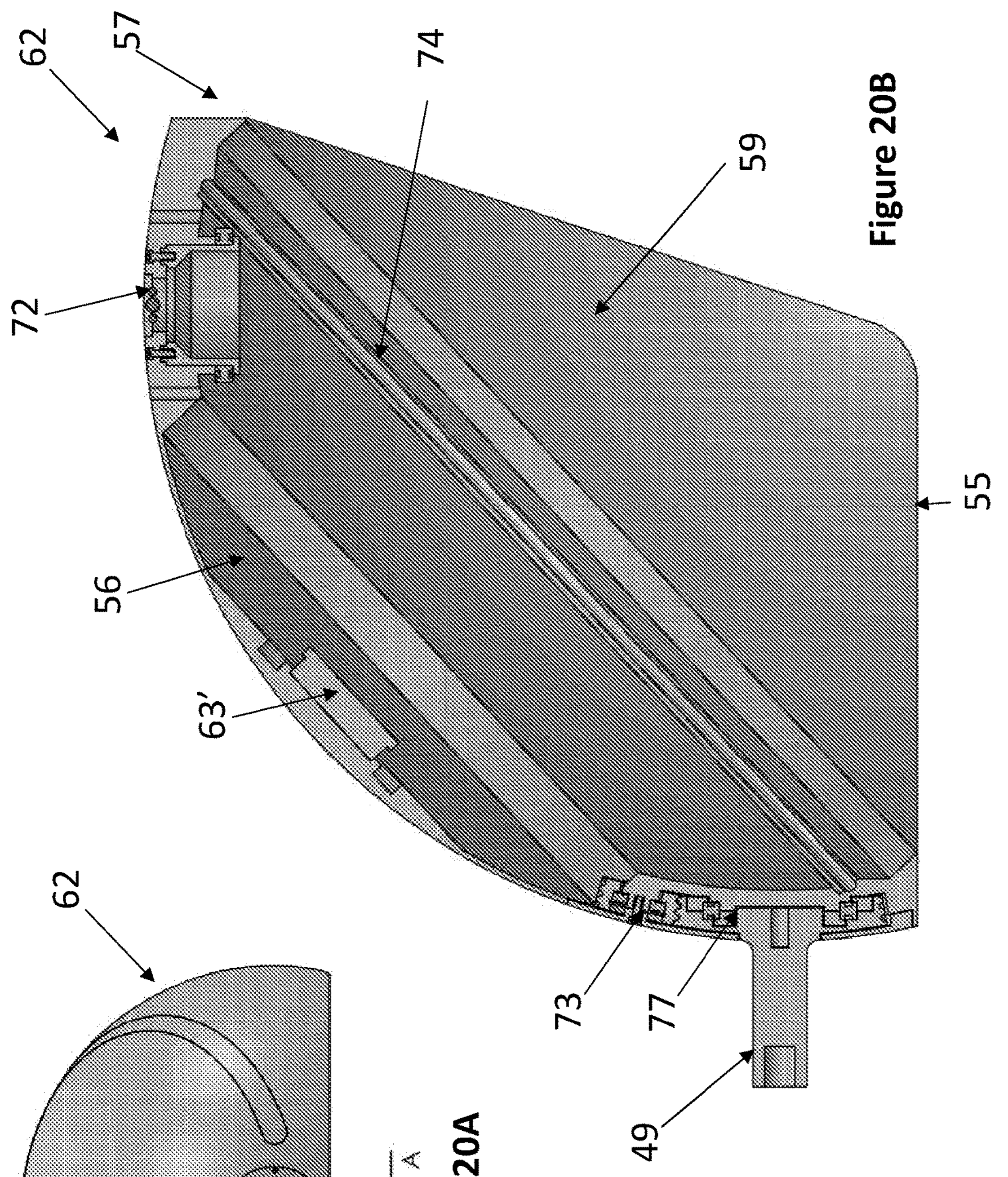
FIG. 20B is a side section view through A-A of the embodiment of the outermost shell of FIG. 20A.
Figure 20A:
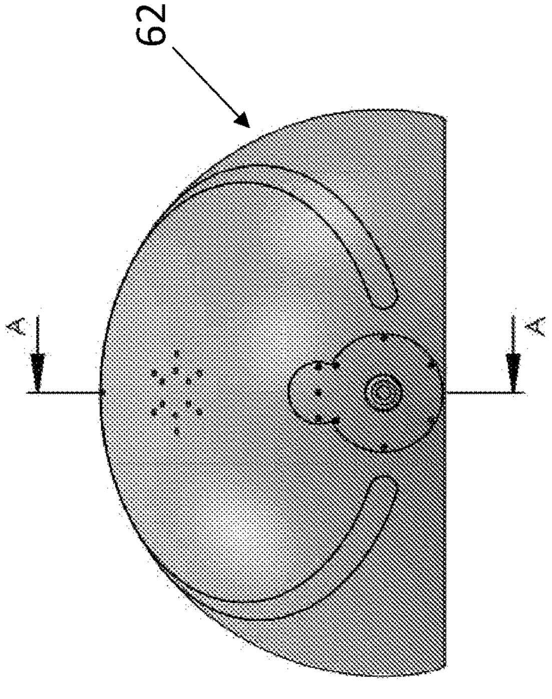
FIG. 20A is a back view of the embodiment of the outermost shell of FIG. 18.
Figure 21A:
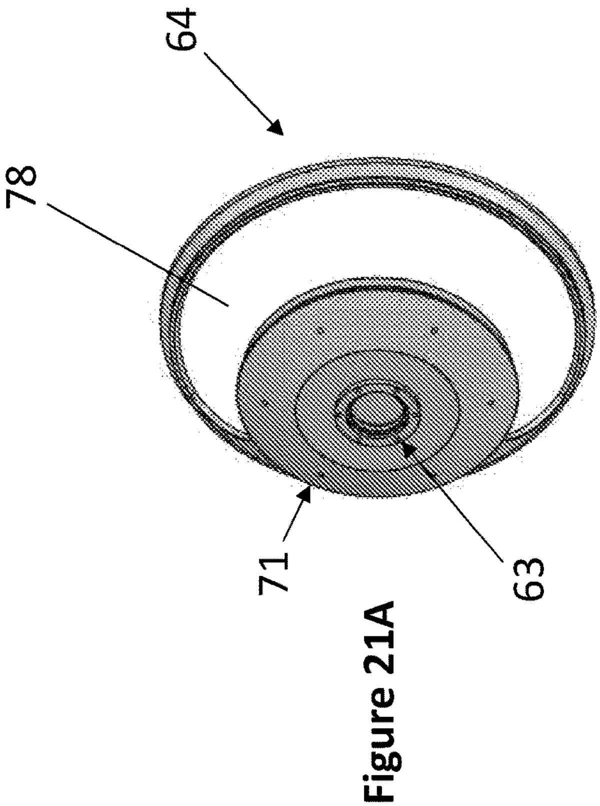
FIGS. 21A to 21H are side projection, top projection, side, rear projection from below, side projection, alternate side, further alternate side, and rear projection views, respectively, of an embodiment of the first rotating shell of the steering assembly.
Figure 21B:
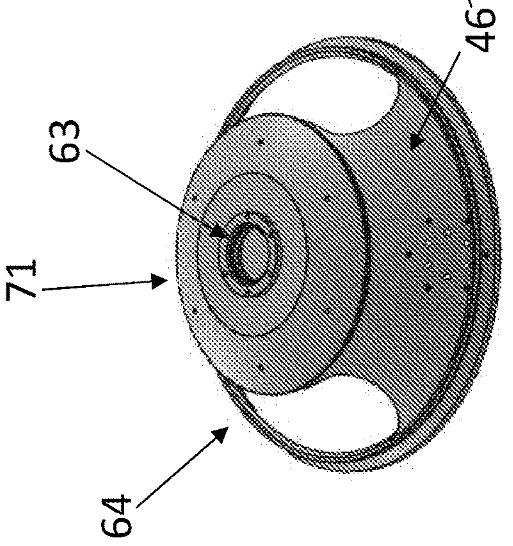
Figure 21C:
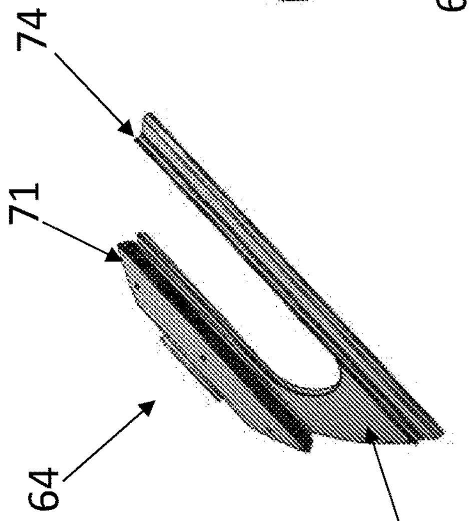
Figure 21D:
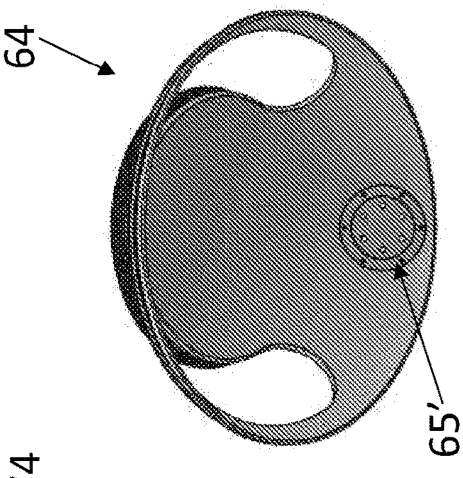
Figure 21F:
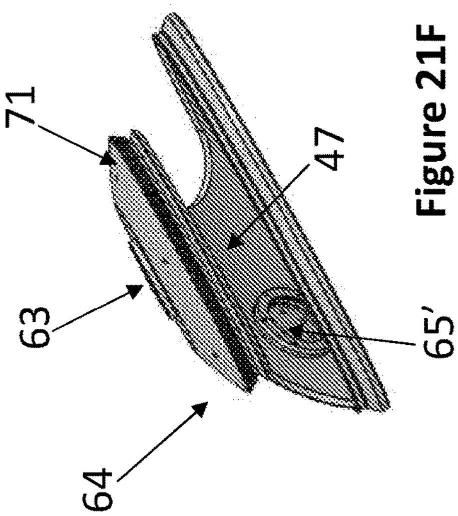
Figure 21H:
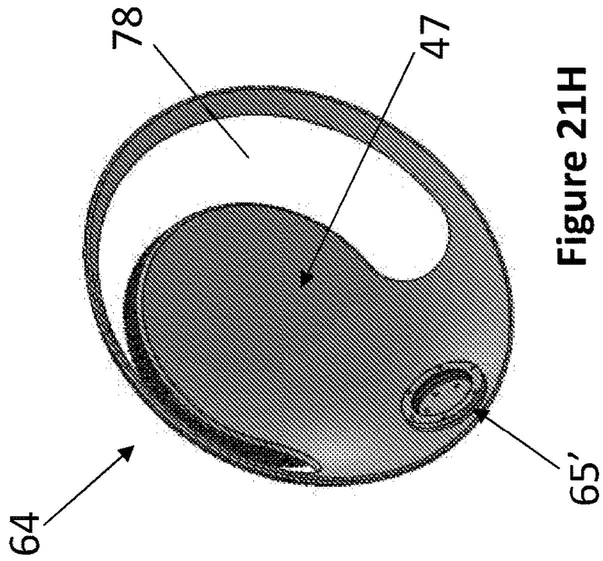
Figure 21E:
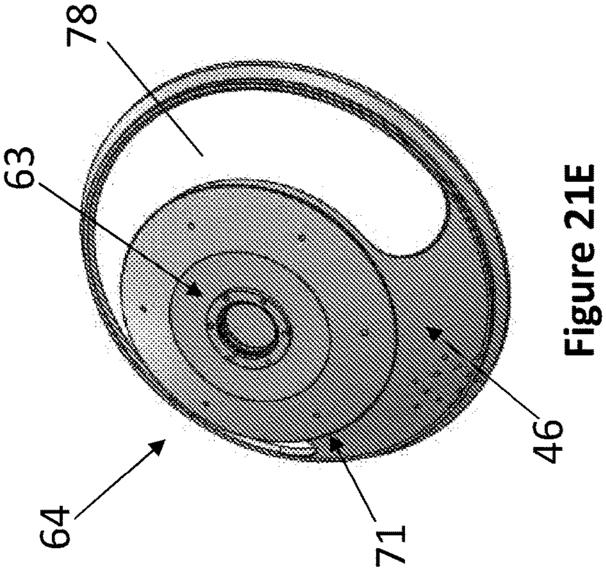
Figure 21G:
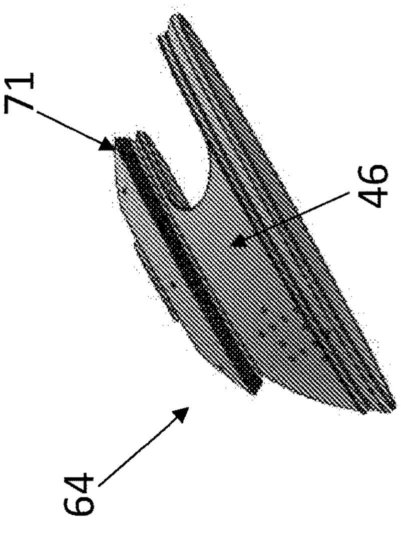

Referring to FIGS. 18 to 20, the outermost shell 62 is fixed to be stationary relative to the vehicle and acts as a cover for the remaining shells of the steering assembly 60. The outermost shell 62 is formed to have a hollow substantially spherical shape, with the outer surface 54 of the shell 62 being roughly one quarter of a sphere, with a flat base surface 55, and angled side edges that slope outwardly as they rise from the base surface 55 to the front edge 57 of the shell 62. The pivot neck 72 about which the wheel assembly 100 is steered is located on the interior surface 59 of the shell 62 at the zenith of the spherical shape, such that an axis through the pivot neck 72 is collinear with a vertical axis therethrough. A steering gear 77 is mounted within a chamber 58 that is provided adjacent the base surface 55 of the outermost shell 62. The steering gear 77 meshes with, and drives, a rotation of the idler gear 73 which is mounted alongside the steering gear 77 within the chamber 58. The idler gear 73 protrudes through into the interior surface 59 of the outermost shell 62, and is arranged to mesh with a slave gear 71 that is provided around a first ring bearing 63 that is able to nest within a substantially circular indented portion 56 of the interior surface 59. The chamber 58 is coverable with a cover plate so as to provide a substantially smooth surface that is contiguous with the outwardly facing surface of the outermost shell 62, with the exception of the steering control 49 which protrudes outwardly therethrough. The steering control 49 provides a mechanical coupling between the driver steering wheel and the steering assembly 60. In a variation, not shown, the steering control can be formed to fit within the chamber, so as to not project outside of the outer facing surface of the outermost shell.

Figure 22A:
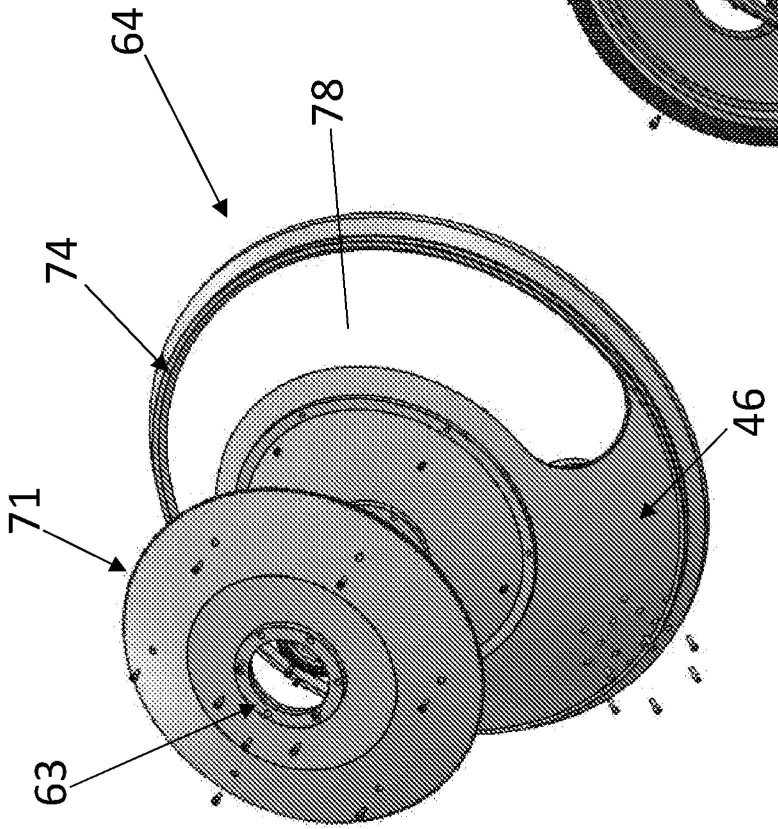
FIGS. 22A and 22B are an exploded anterior projection from above view and an exploded posterior projection from below view, respectively, of the embodiment of the first rotating shell of FIG. 21.
Figure 22B:
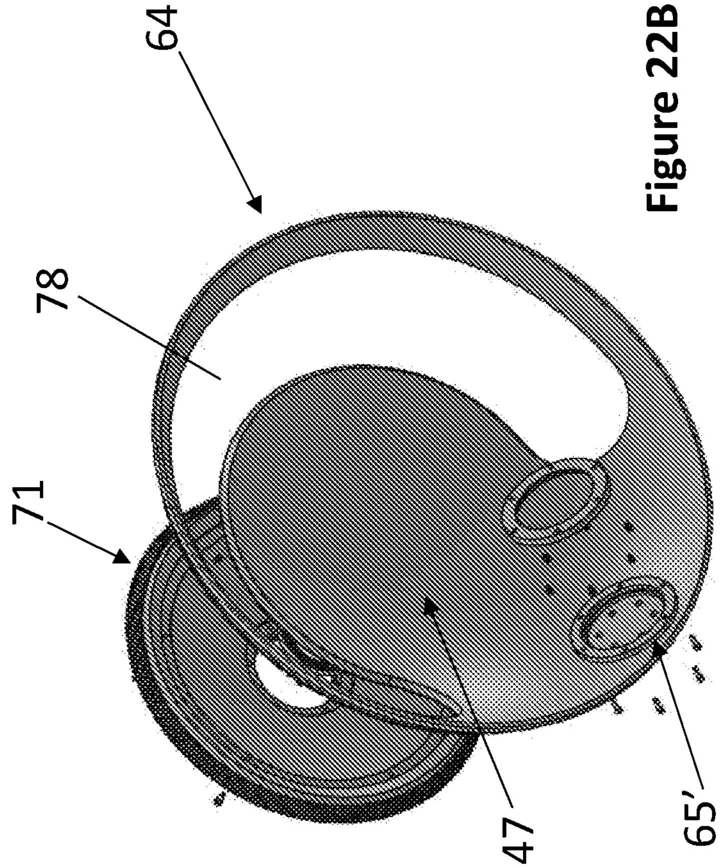
Figure 23B:
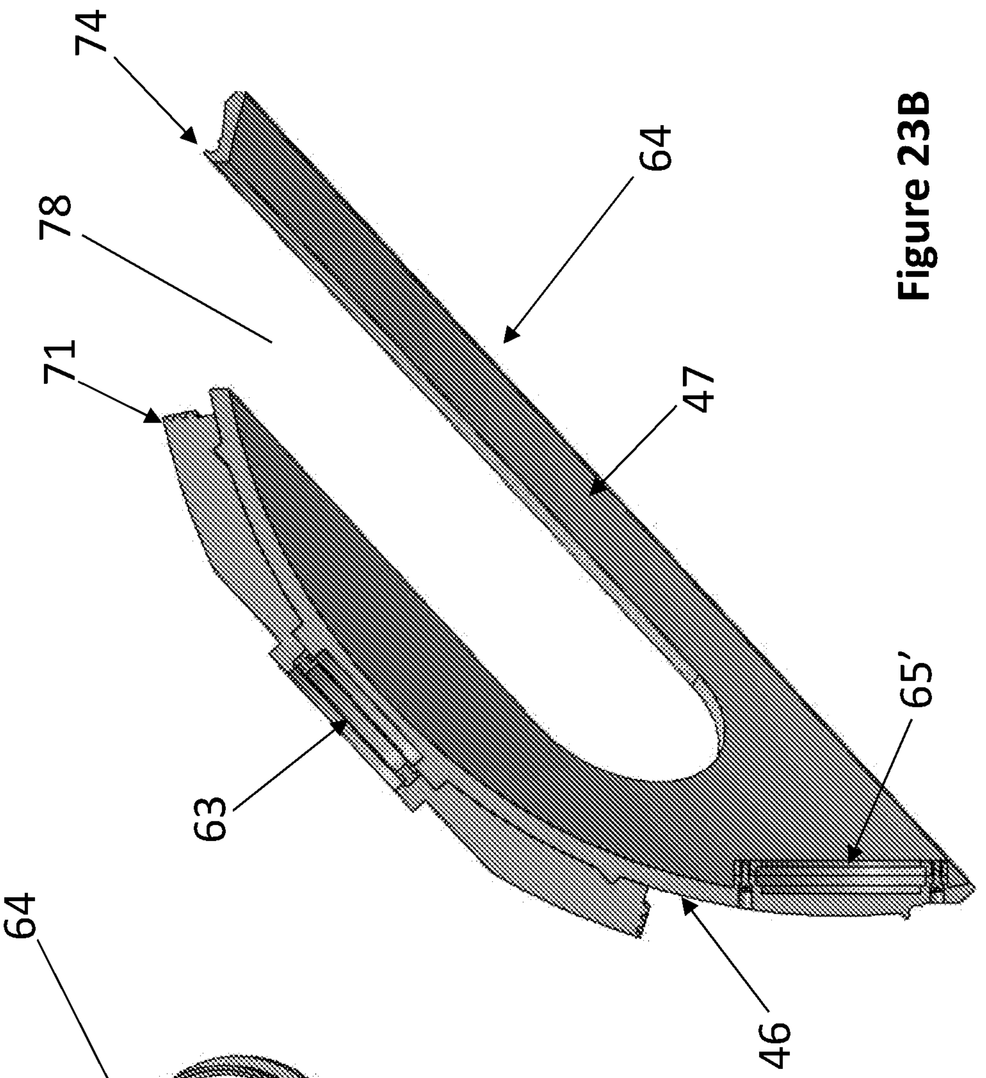
FIG. 23B is a side section view through B-B of the embodiment of the first rotating shell of FIG. 23A.
Figure 23A:
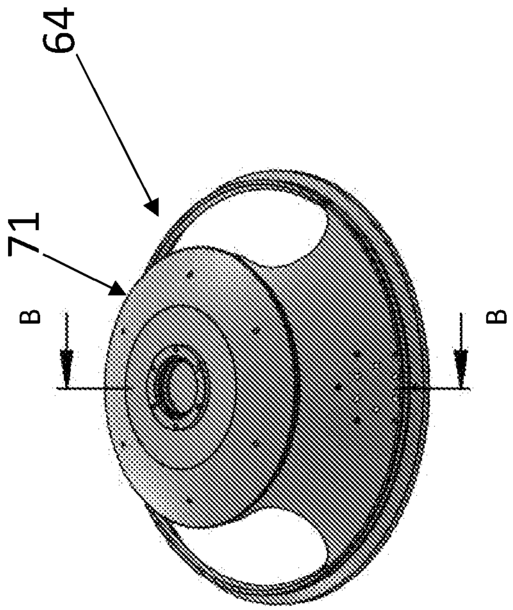
FIG. 23A is a projection view from above of the embodiment of the first rotating shell of FIG. 21.
Figure 24A:
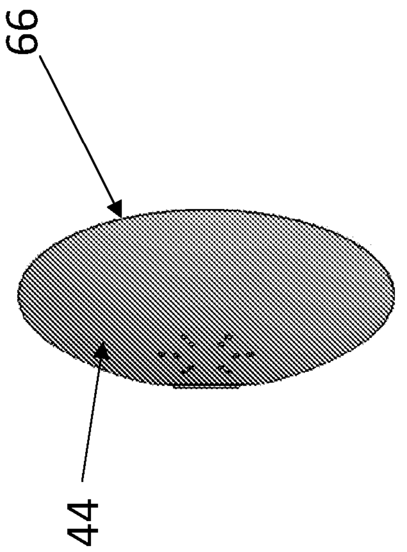
FIGS. 24A to 24H are top projection, front projection, side, rear projection, side projection, alternate side, further alternate side, and further rear projection views, respectively, of an embodiment of the second rotating shell of the steering assembly.
Figure 24B:
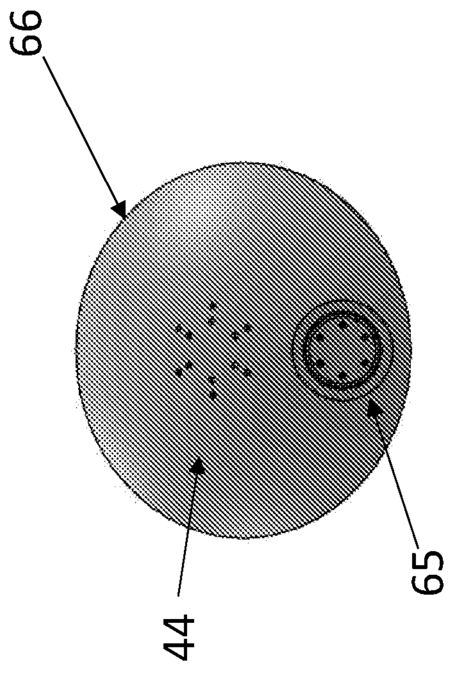
Figure 24C:
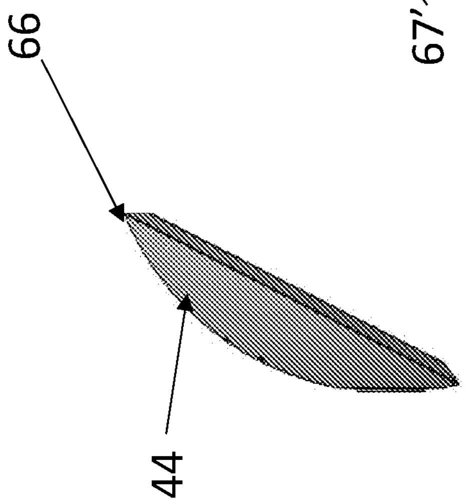
Figure 24D:
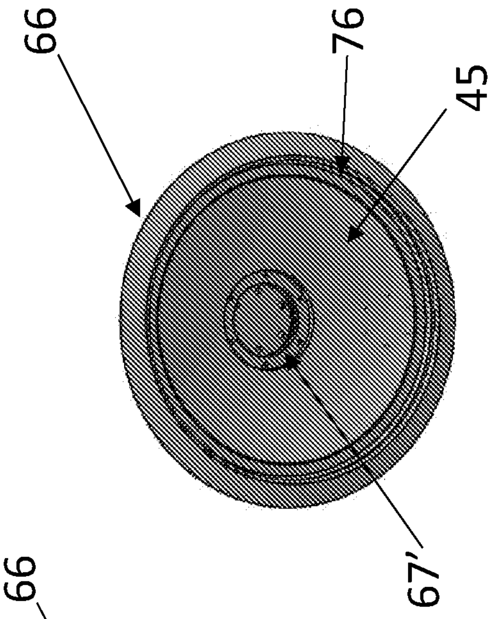
Figure 24E:
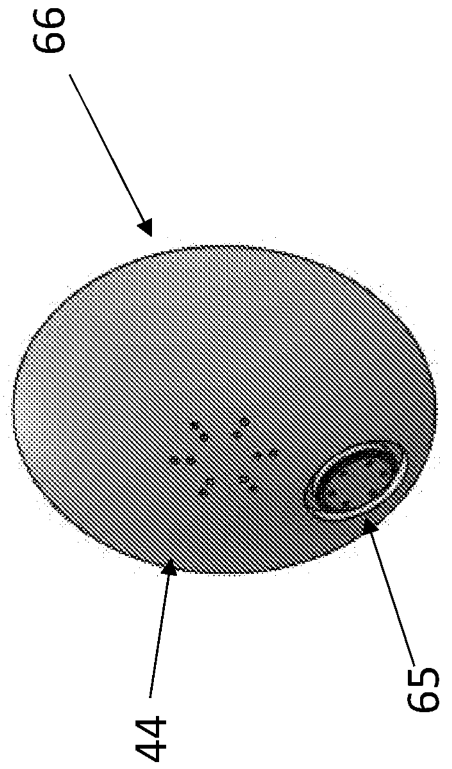
Figure 24F:
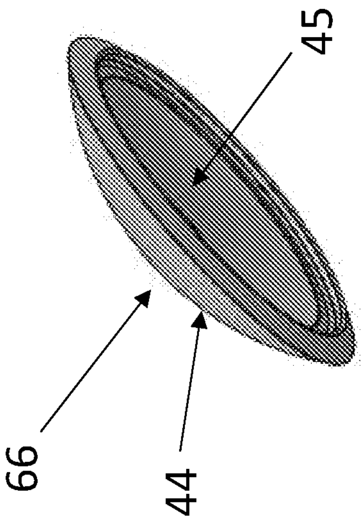
Figure 24G:
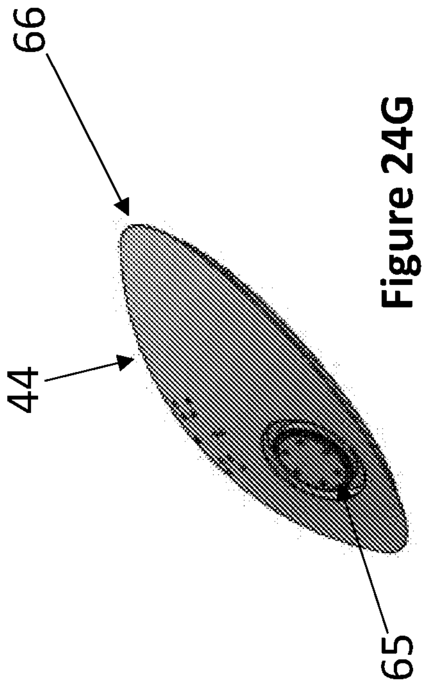
Figure 24H:
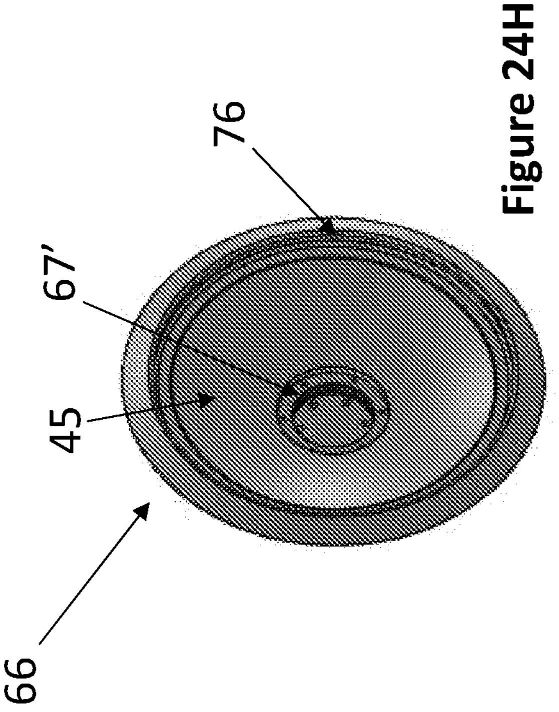

Referring to FIGS. 21 to 23, the first rotating shell 64 defines a spherical cap shape, with an outwardly facing surface 46 that substantially conforms to the contours of the profile of the interior surface 59 of the outermost shell 62, whereby the first rotating shell 64 is nested adjacent to the interior surface 59 within the outermost shell 62. A first ring bearing 63 is fixedly coupled to the upper surface of the first rotating shell 64, with the centre points of each of the first ring bearing 63 and first rotating shell 64 being arranged concentrically. The first ring bearing 63 projects away from the upper surface and is sized and shaped to couple with first ring bearing retainer 63', so as to fit within the indented portion 56 of the stationary outermost shell 62, whereby the first ring bearing 63 and first ring bearing retainer 63' facilitates the coupling of the first rotating shell 64 to the outermost shell 62. When located within the indented portion 56, the slave gear 71 that is formed around the circumference of the first ring bearing 63 is able to mesh with the idler gear 73, which thereby drives the angular rotation of the first rotating shell 64 relative to the stationary outermost shell 62. A gap 78 is provided between the outer rim of the first rotating shell 64 and the surface of the first rotating shell 64 that supports the first ring bearing 63, the gap extending for approximately 270 degrees around the circular first rotating shell 64. The gap 78 allows the pivot neck 72 to connect to the third rotating shell 68 through the first rotating shell 64, whilst not inhibiting the relative angular rotation of the shells 64,66,68. An additional bearing surface 74 is defined by a corresponding pair of ridges provided on each of the interior surface 59 of the outermost shell 62 and the outwardly facing surface 46 of the first rotating shell 64. The corresponding bearing surfaces 74 are arranged to assist with further distributing the forces applied to the pivot neck 72 by the angular movement of the third rotating shell 68 (and the wheel 10) by spreading a portion of the force load from the outermost shell 62 across the first rotating shell 64. By improving the force load distribution, the steering assembly 60 can utilise smaller and/or lighter bearings, which in turn helps in further reducing the overall bulk and weight of the steering assembly 60.

Figure 25B:
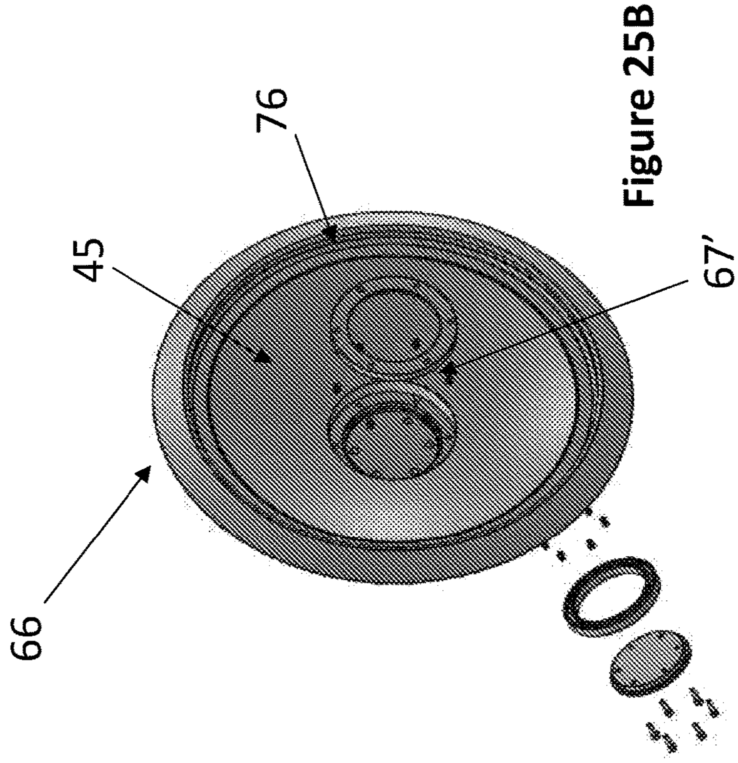
FIGS. 25A and 25B are an exploded anterior projection view and an exploded posterior projection view, respectively, of the embodiment of the second rotating shell of FIG. 24.
Figure 25A:
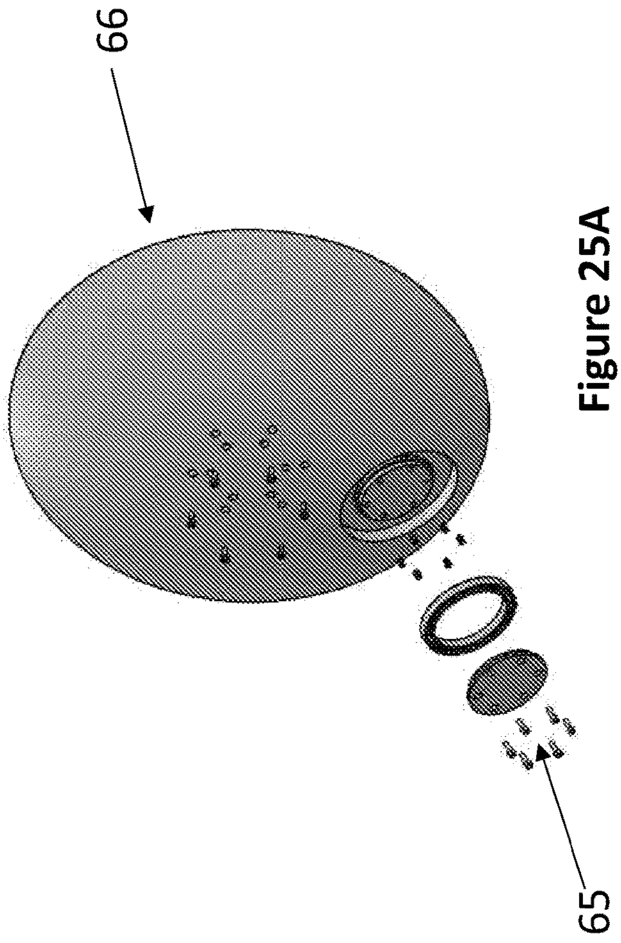
Figure 26B:
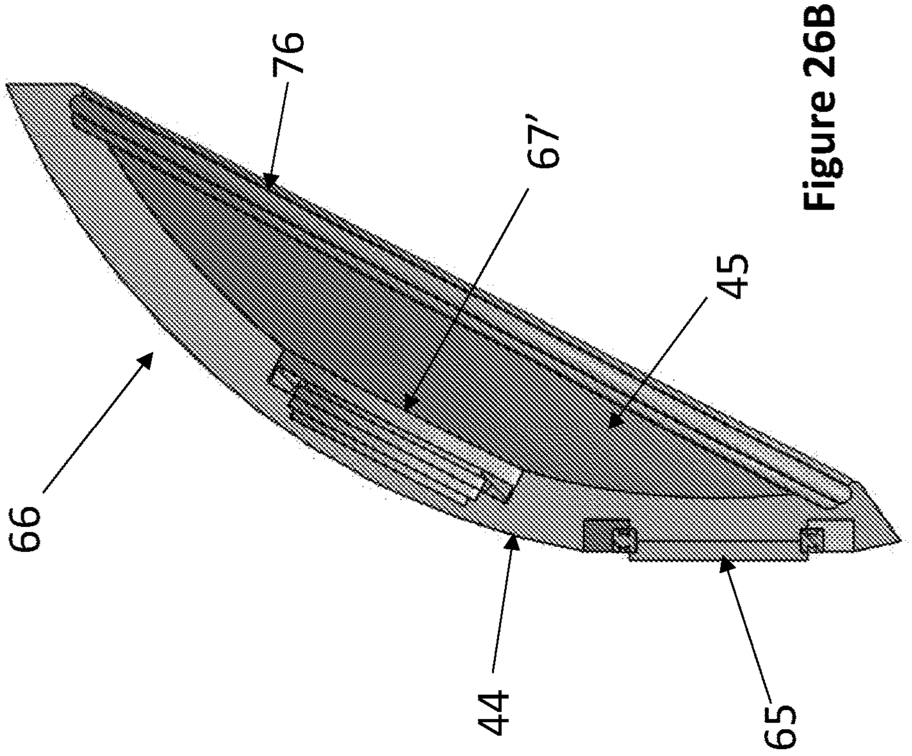
FIG. 26B is a side section view through C-C of the embodiment of the second rotating shell of FIG. 26A.
Figure 26A:
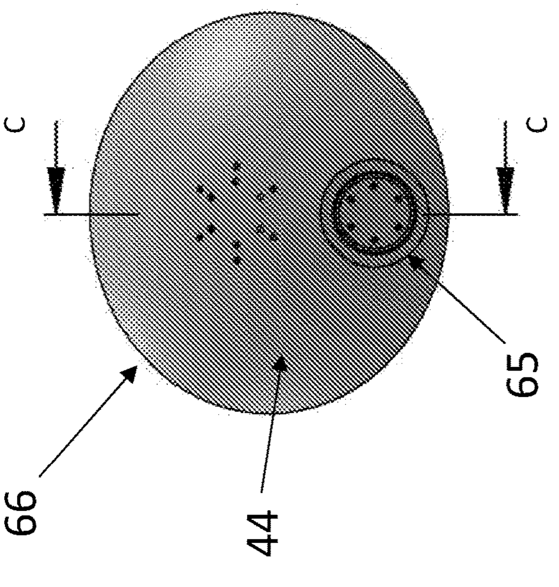
FIG. 26A is a front projection view from above of the embodiment of the second rotating shell of FIG. 24.
Figures 27A, 27B, 27C, 27D:
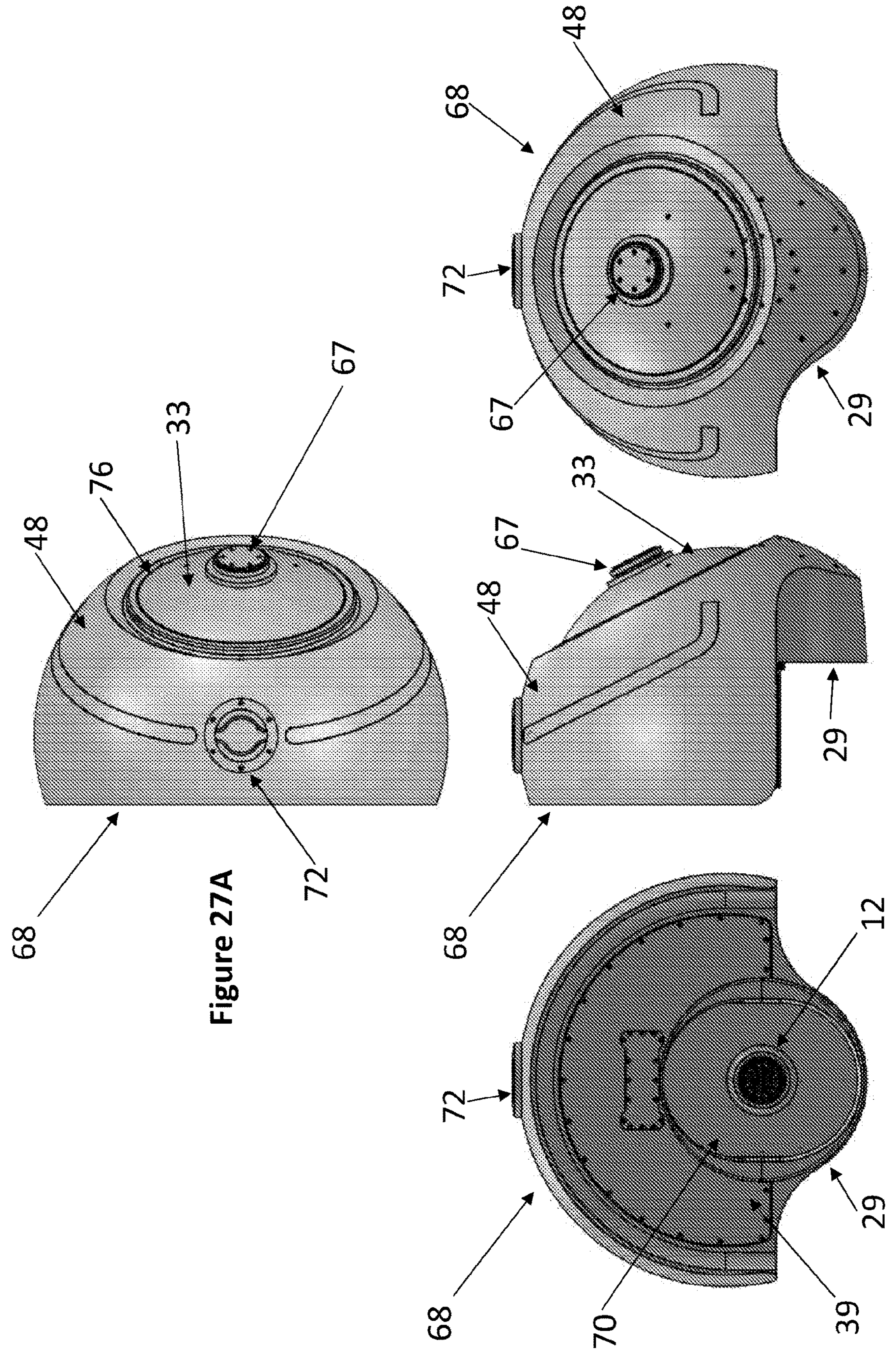
FIGS. 27A to 27H are top, back, side, front, anterior projection from above, posterior projection from above, anterior projection from below, and posterior projection from below views, respectively, of an embodiment of the third rotating shell of the steering assembly.
Figure 27E:
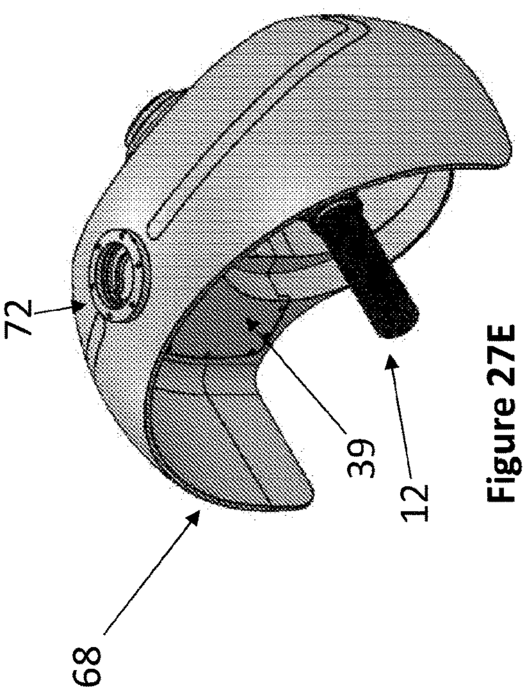
Figure 27F:
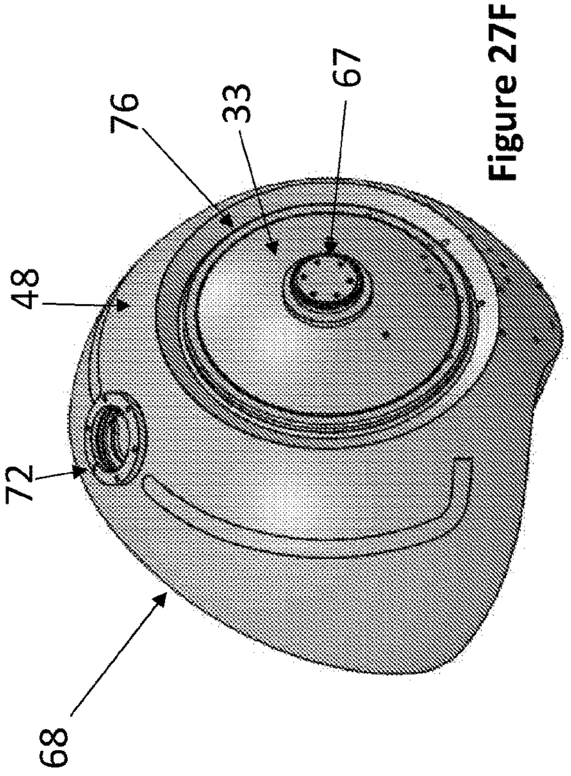
Figure 27G:
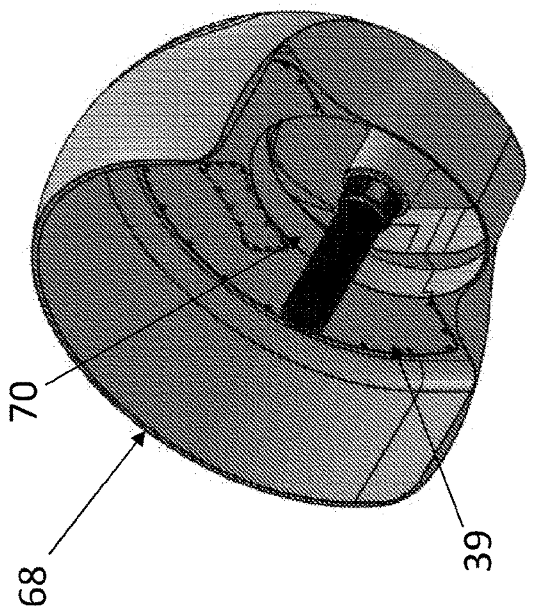
Figure 27H:
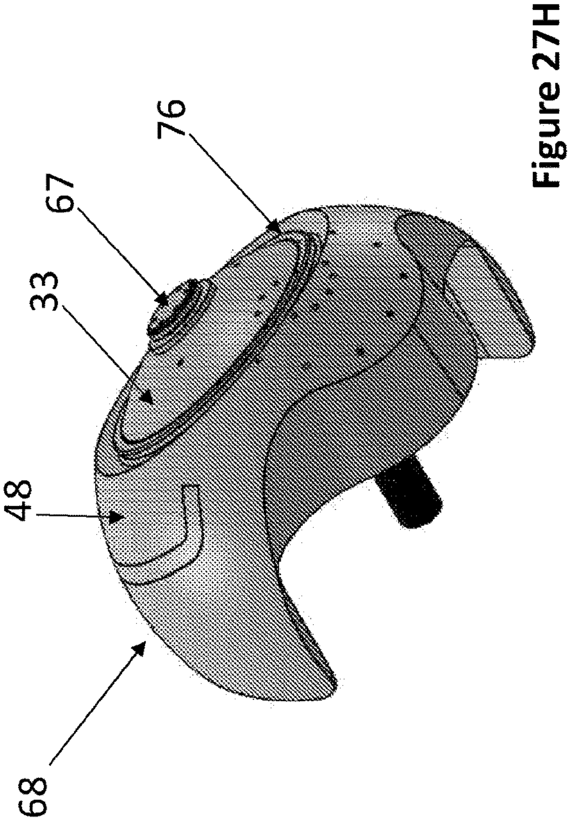

Referring to FIGS. 24 to 26, the second rotating shell 66 is coupled to, and configured to pivotally rotate about, a second ring bearing 65 that is located within the first rotating shell 64 on an interior facing surface 47, and adjacent to an outer rim thereof. The second rotating shell 66 defines a spherical cap shape, with the second ring bearing 65 being provided on an outwardly facing surface 44, also adjacent to an outer rim thereof. The outwardly facing surface 44 is otherwise a substantially smooth continuous surface that conforms to the contour of the interior facing surface 47 of the first rotating shell 64. The relative location of the second ring bearing retainer 65' and second ring bearing 65 adjacent respective outer rims of each of the first rotating shell 64 and second rotating shell 66 provides an for eccentric offset movement during angular rotation of the first rotating shell 64, with the second rotating shell 66 being pivotally shifted in an opposite direction to the first rotating shell 64 for a corresponding magnitude of angular rotation. The interior facing surface 45 of the second rotating shell 66 comprises a centrally located third ring bearing retainer 67' through which the second rotating shell 66 is pivotally coupled to the third ring bearing 67 of the third rotating shell 68. An additional bearing surface 76 is defined by a corresponding pair of ridges provided on each of the interior facing surface 45 of the second rotating shell 66 and the outwardly facing surface 48 of the third rotating shell 68. The corresponding bearing surfaces 76 are arranged to assist with further distributing the forces applied to the pivot neck 72 by the angular movement of the third rotating shell 68 (and the wheel 10) by spreading a portion of the force load from the second rotating shell 66 across the third rotating shell 68.

Figure 28B:
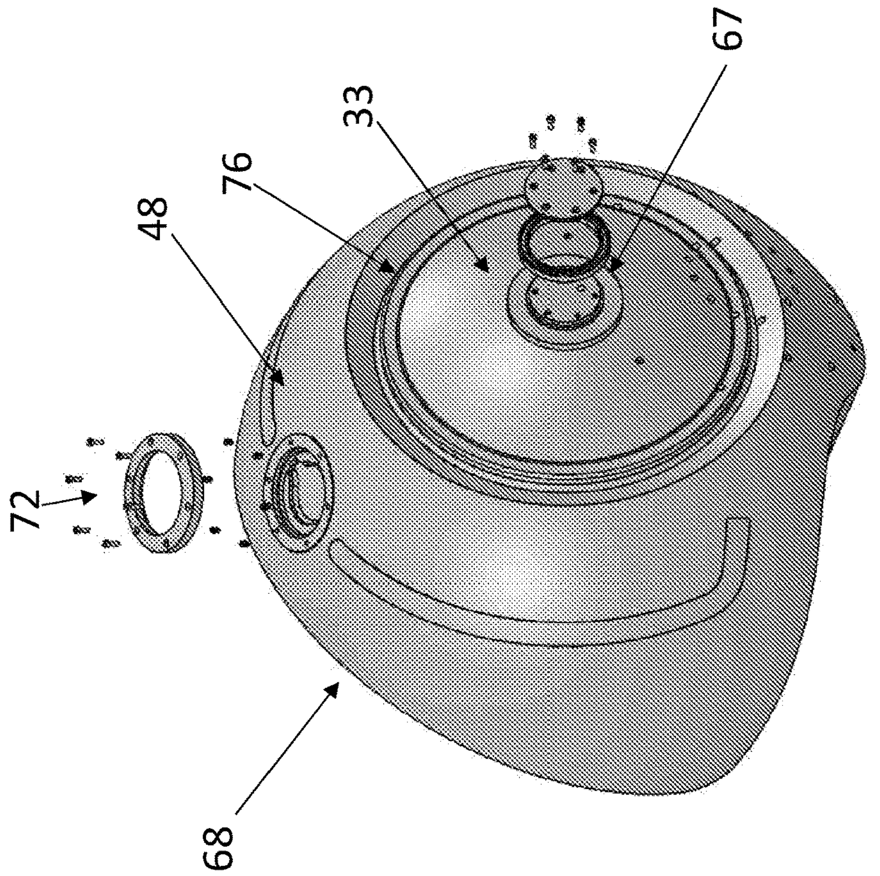
FIGS. 28A and 28B are exploded posterior projection from above and exploded anterior projection from above views, respectively, of the embodiment of the third rotating shell of FIG. 27.
Figure 28A:
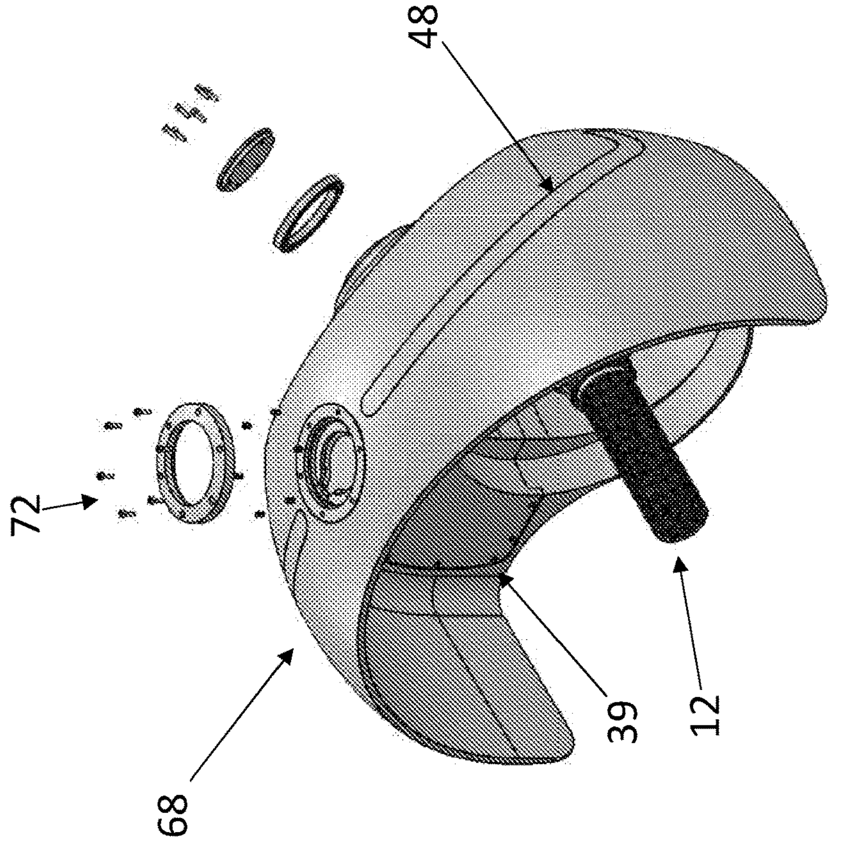
Figure 29B:
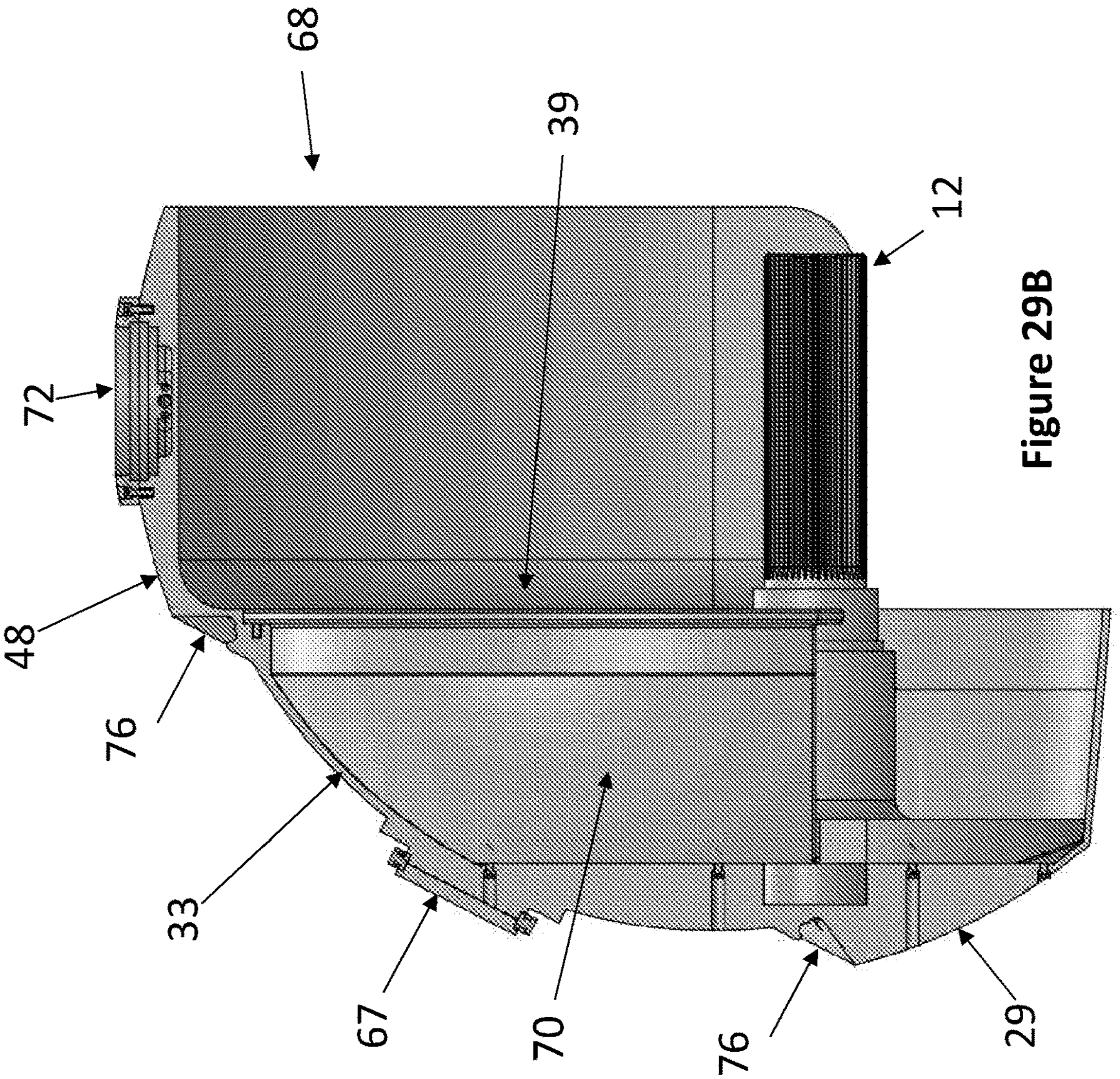
FIG. 29B is a side section view through D-D of the embodiment of the third rotating shell of FIG. 29A.
Figure 29A:
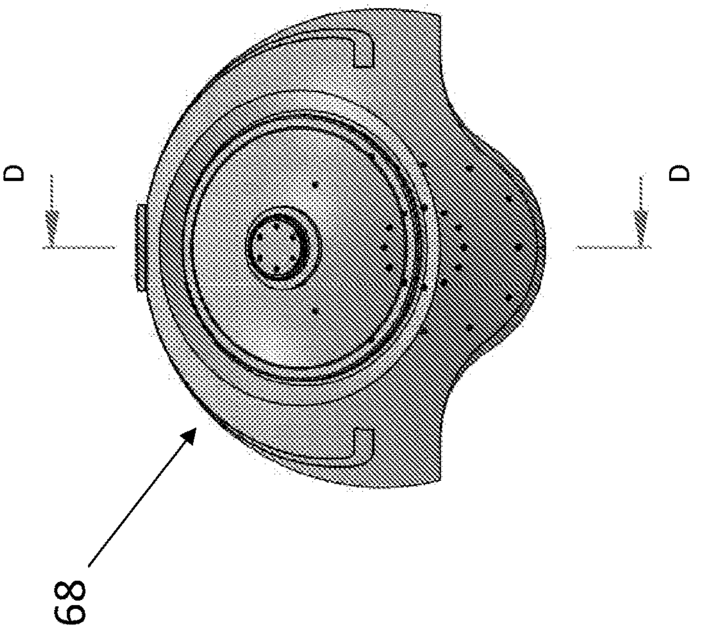
FIG. 29A is a back view of the embodiment of the third rotating shell of FIG. 27.
Figure 30:
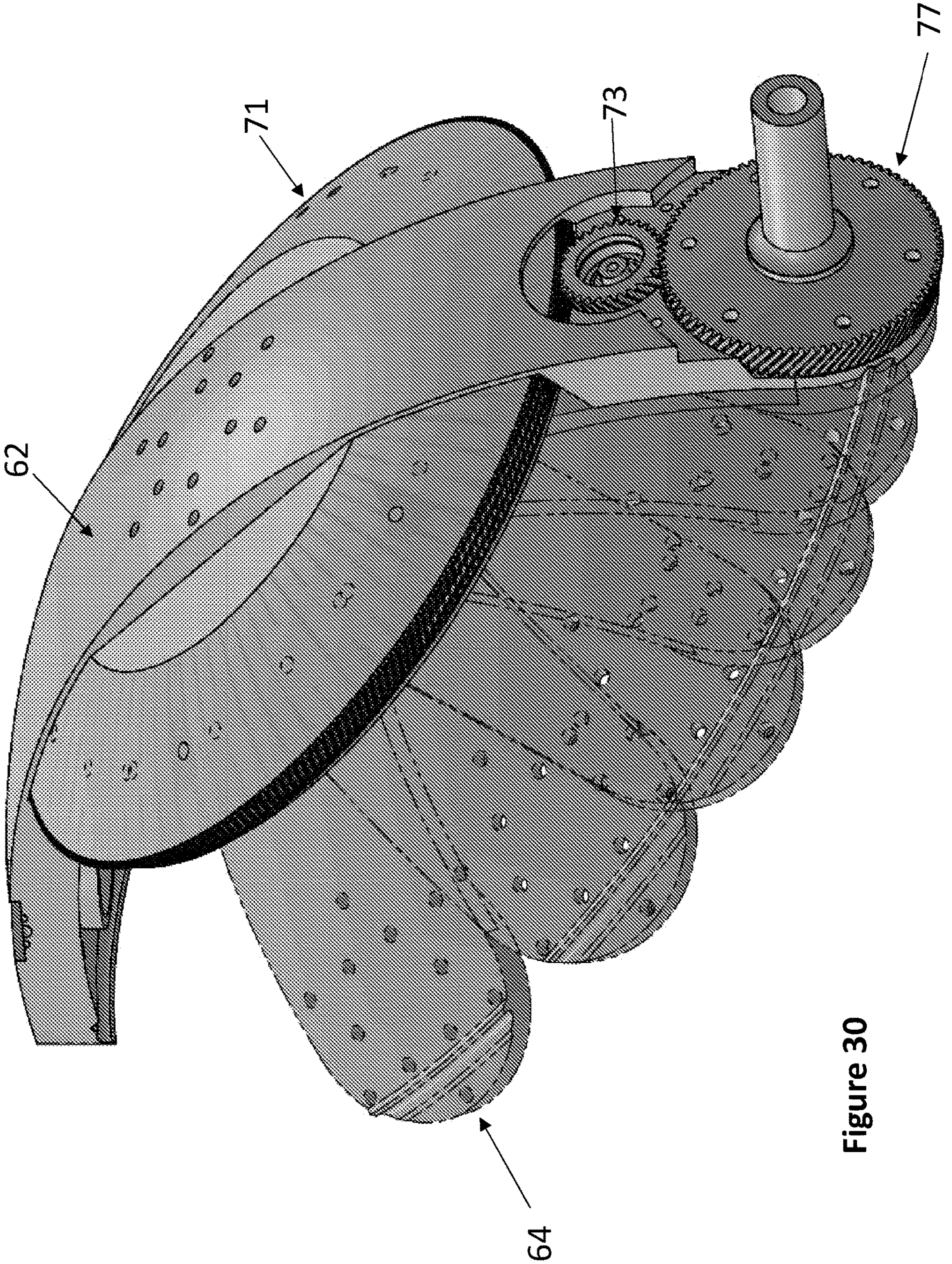
FIG. 30 is a cut-out projection view showing a section of the outermost shell and first rotating shell of an embodiment of the steering assembly.
Figure 31A:
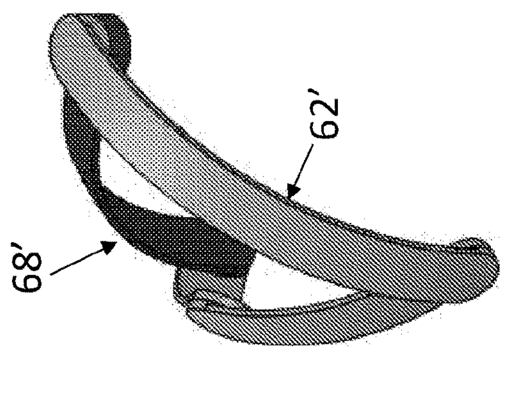
FIGS. 31A to 31F are projection views of a plurality of linkages representing the motion and angular rotation of a wheel linkage relative to a static linkage of a first embodiment of a steering assembly.
Figure 31B:
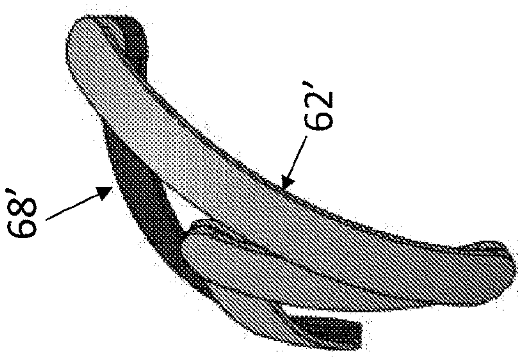
Figure 31C:
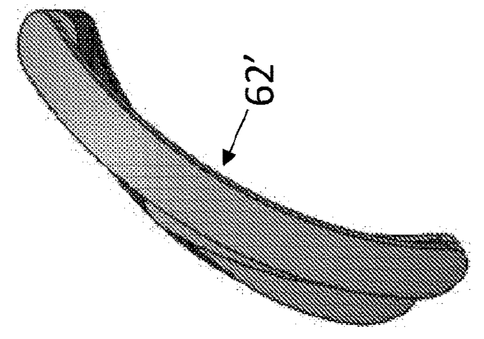
Figure 31D:
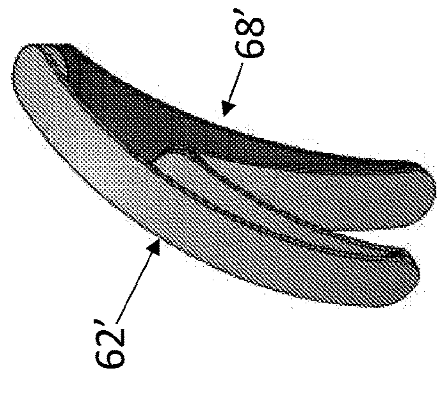
Figure 31E:
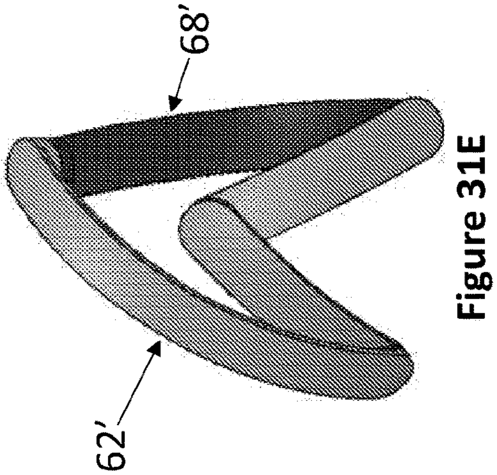
Figure 31F:
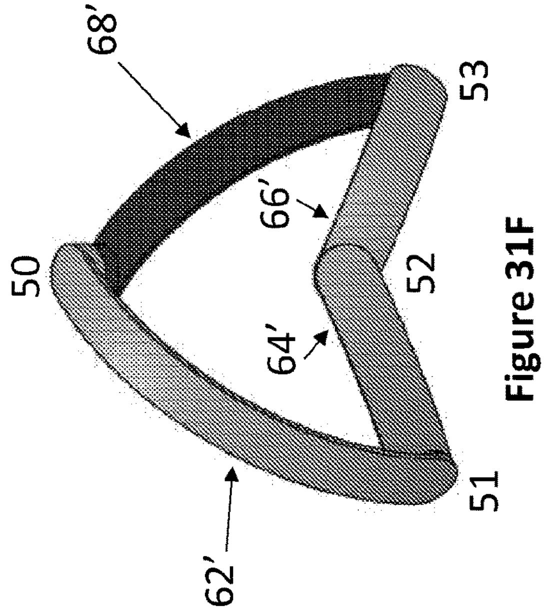
Figure 32A:
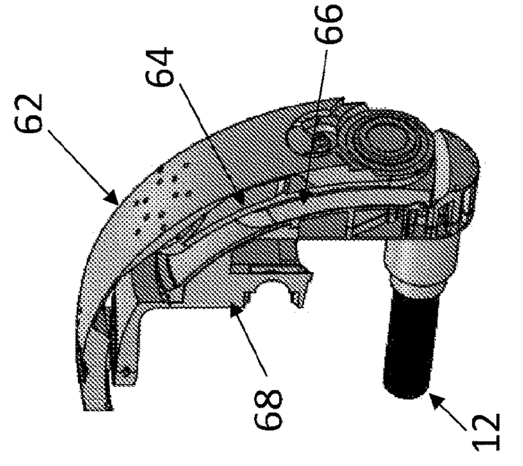
FIGS. 32A to 32F are cut-out projection views of an embodiment of the steering assembly showing the motion and angular rotation of the wheel shaft relative to a stationary outermost shell.
Figure 32B:
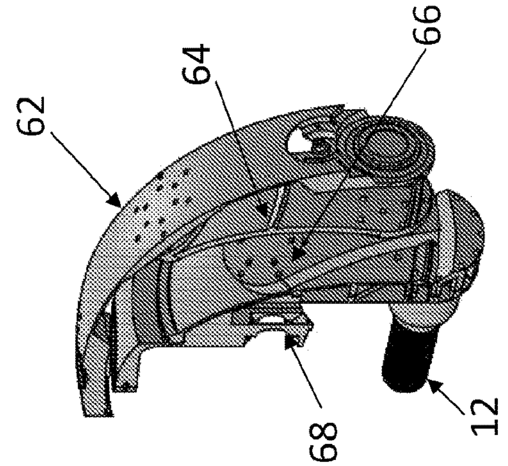
Figure 32C:
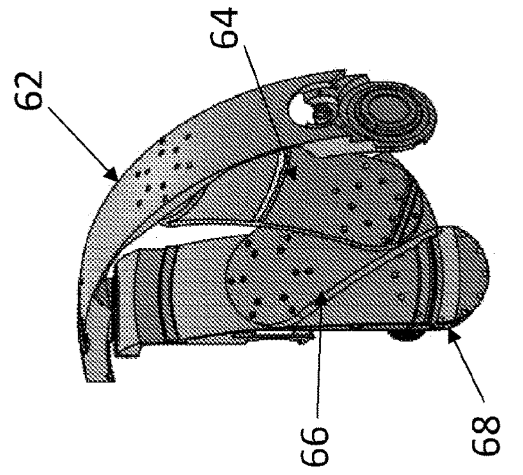
Figure 32D:
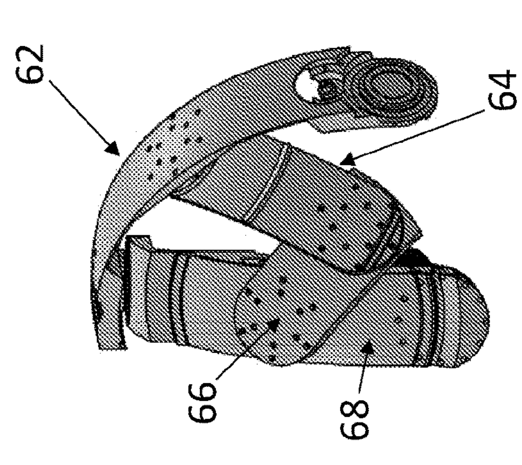
Figure 32E:
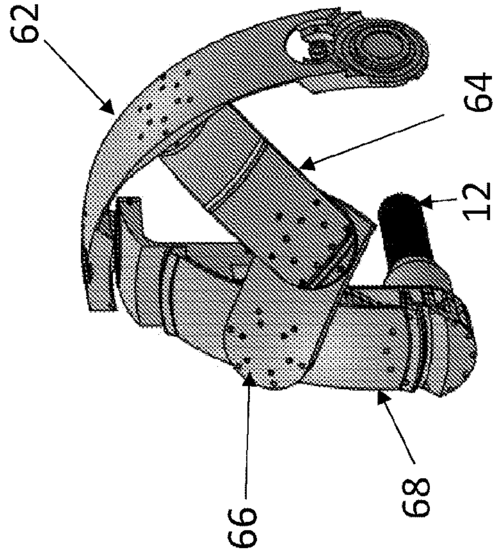
Figure 32F:
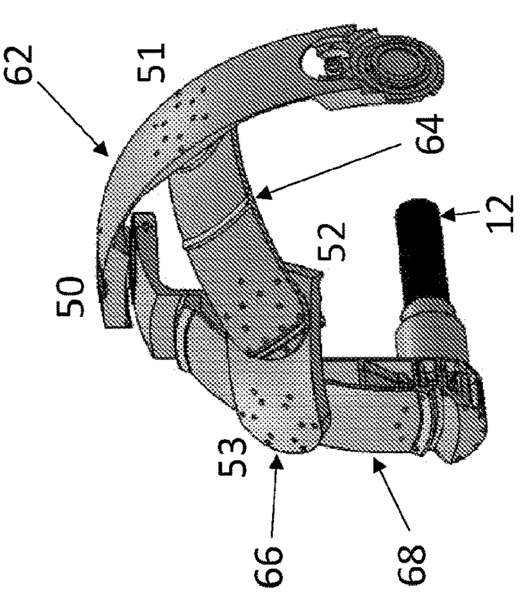
Figure 33A:
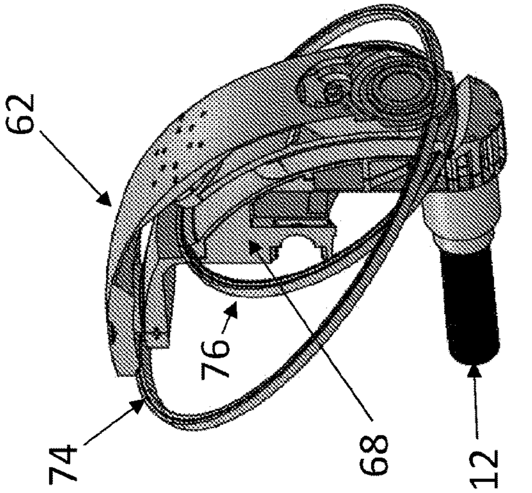
FIGS. 33A to 33F are cut-out projection views of an embodiment of the steering assembly showing the motion and angular rotation of the wheel shaft relative to a stationary outermost shell, with a cut-out embodiment of additional bearings being shown.
Figure 33B:
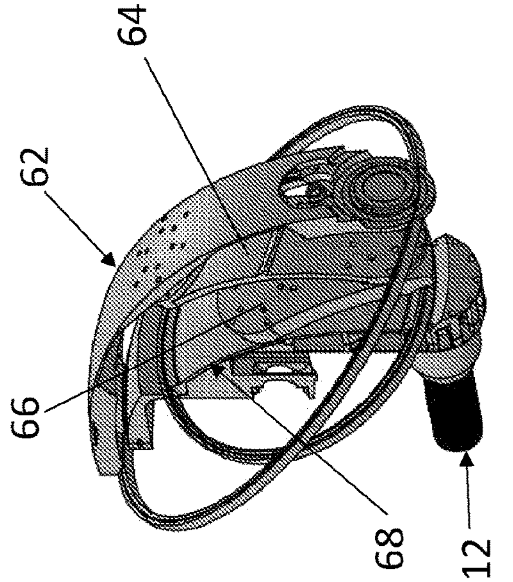
Figure 33C:
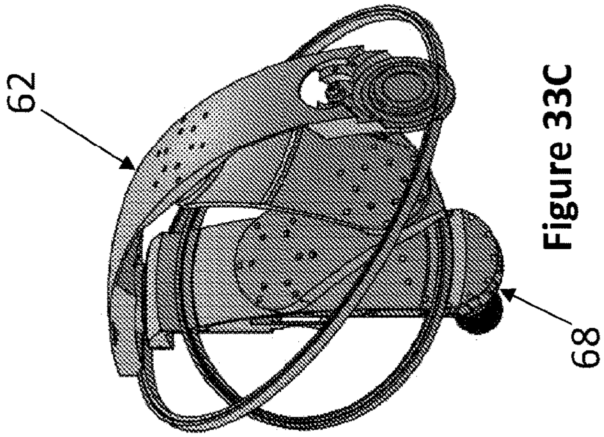
Figure 33D:
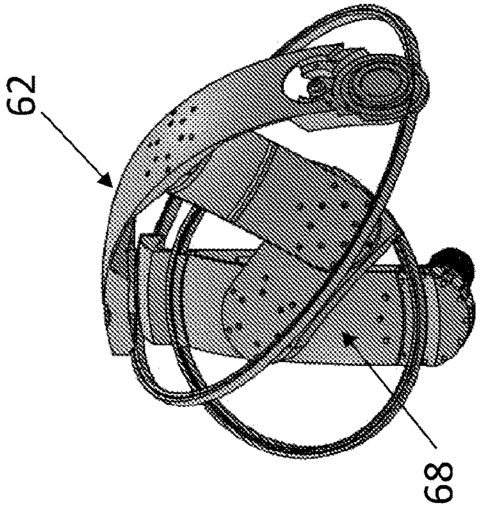
Figure 33E:
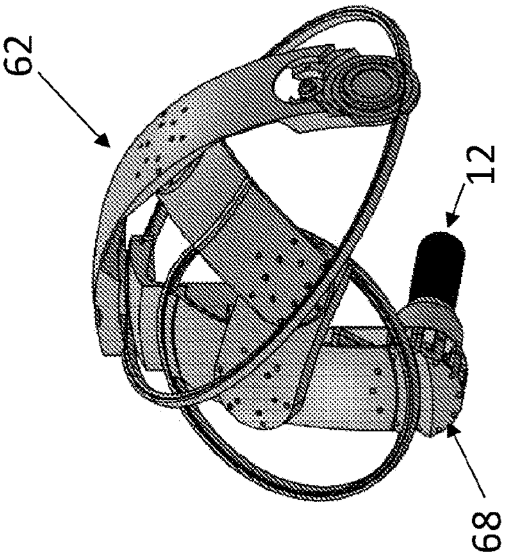
Figure 33F:
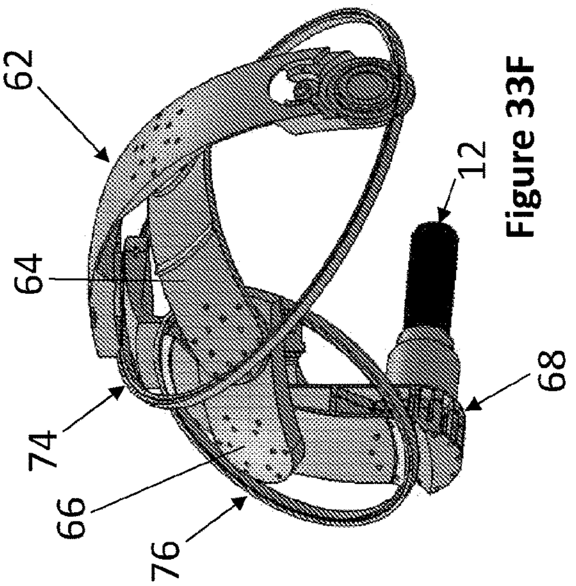
Figure 34C:
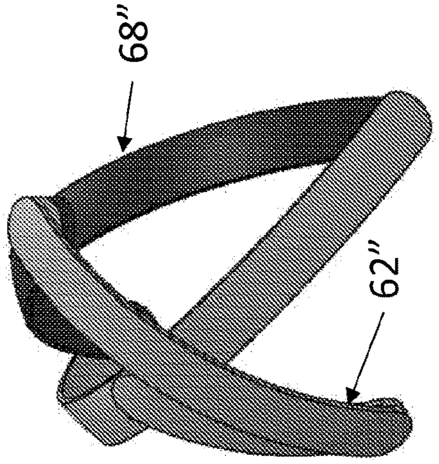
FIGS. 34A to 34F are projection views of a plurality of linkages representing the motion and angular rotation of a wheel linkage relative to a static linkage of a second embodiment of a steering assembly.
Figure 34B:
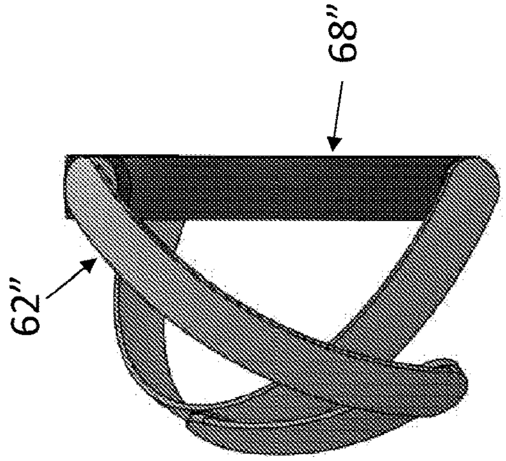
Figure 34A:
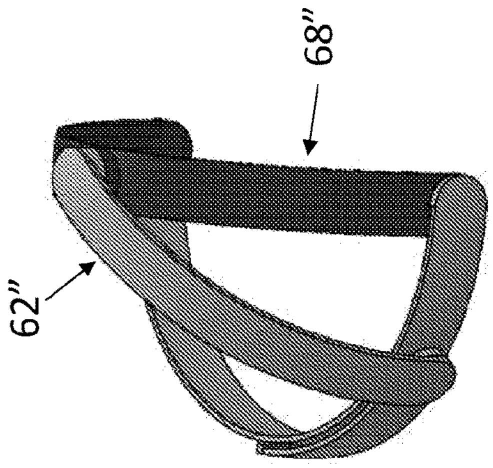
Figure 34F:
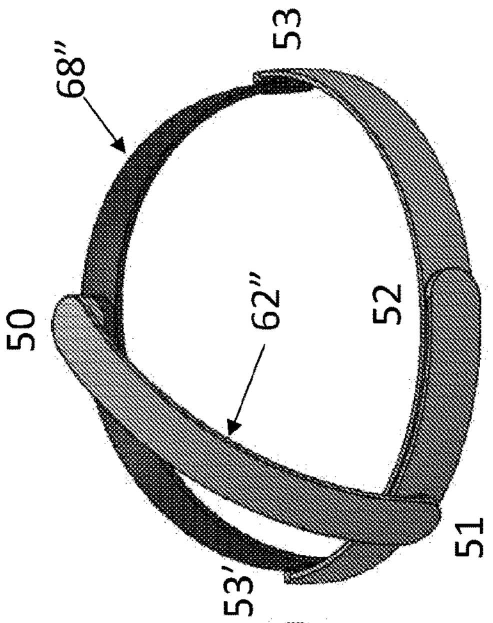
Figure 34E:
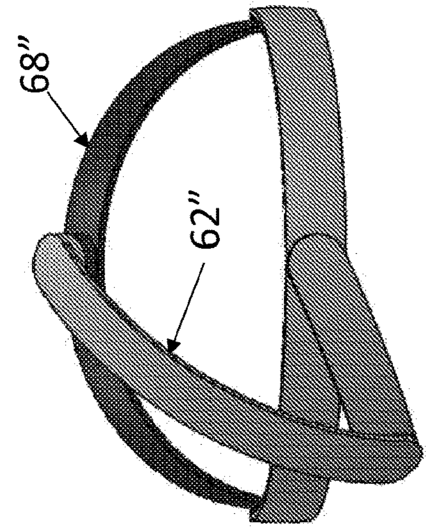
Figure 34D:
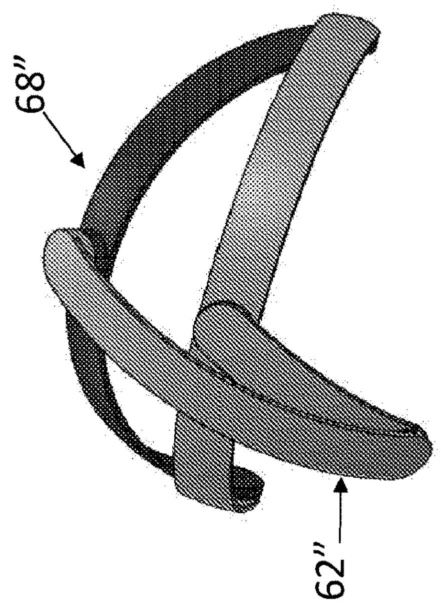
Figure 35A:
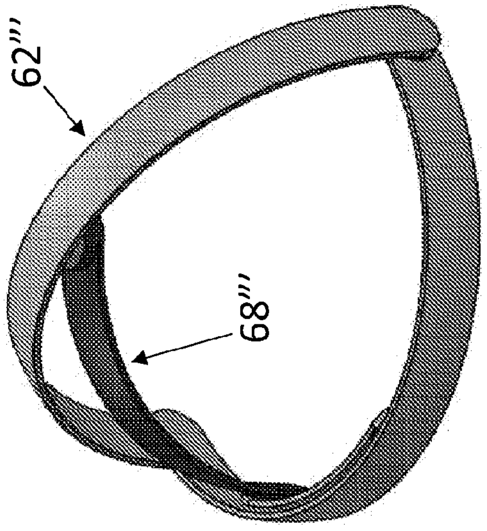
FIGS. 35A to 35F are projection views of a plurality of linkages representing the motion and angular rotation of a wheel linkage relative to a static linkage of a third embodiment of a steering assembly.
Figure 35B:
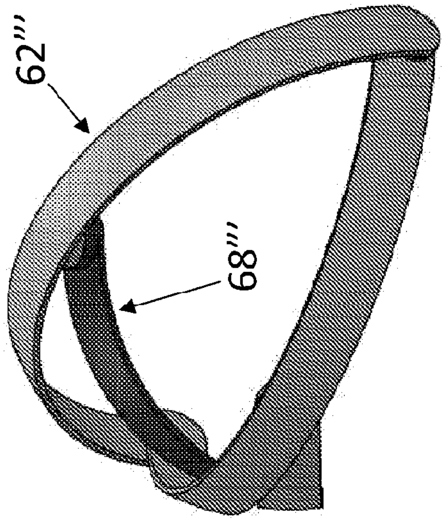
Figure 35C:
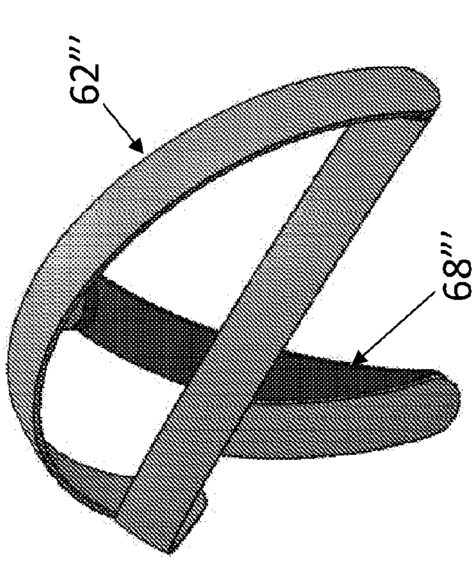
Figure 35D:
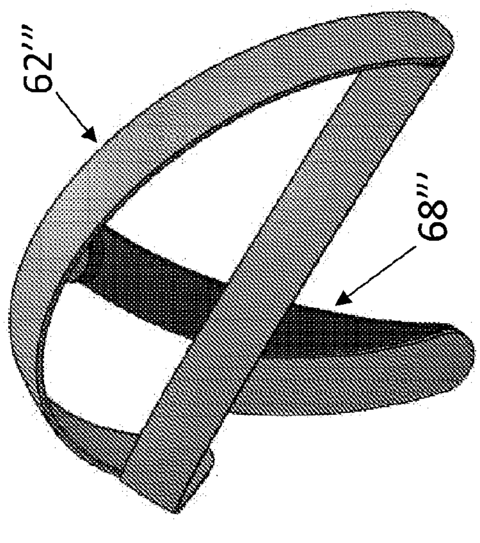
Figure 35E:
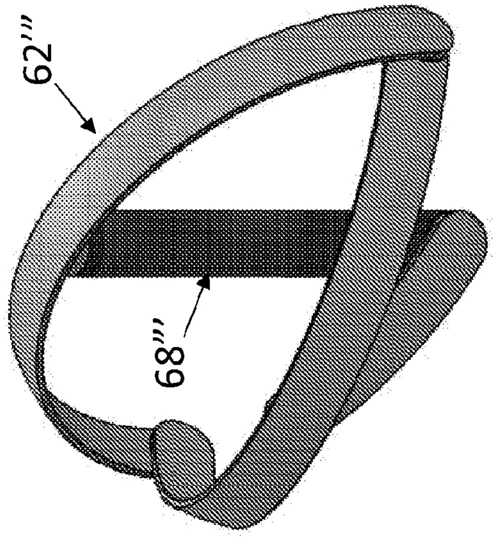
Figure 35F:
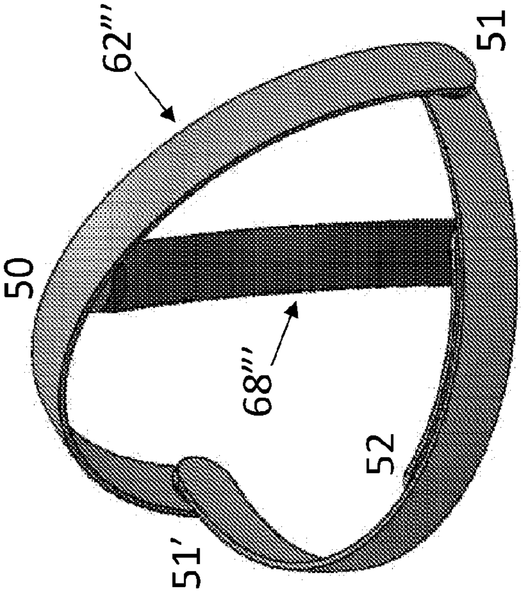
Figure 36A:
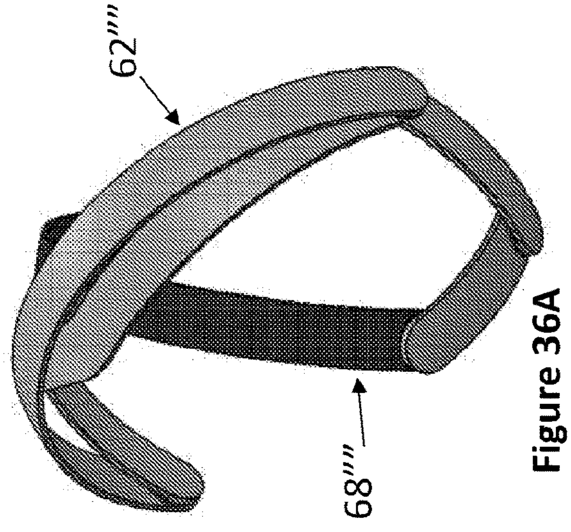
FIGS. 36A to 36F are projection views of a plurality of linkages representing the motion and angular rotation of a wheel linkage relative to a static linkage of a fourth embodiment of a steering assembly.
Figure 36B:
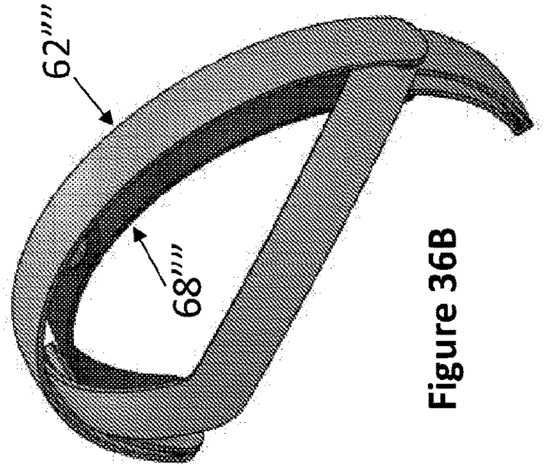
Figure 36C:
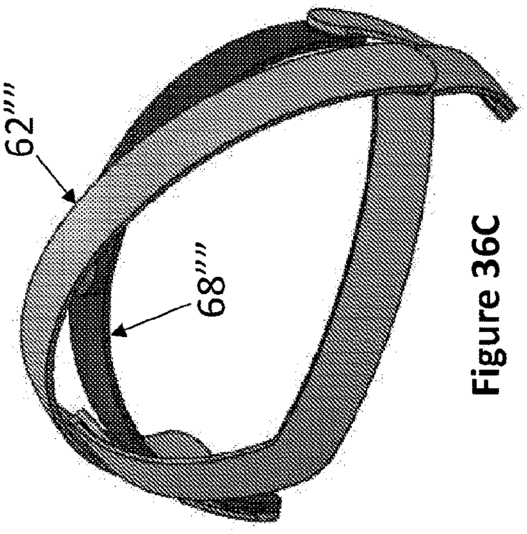
Figure 36D:
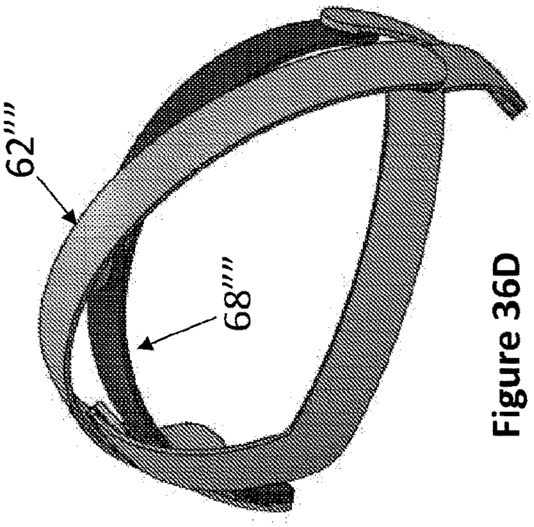
Figure 36E:
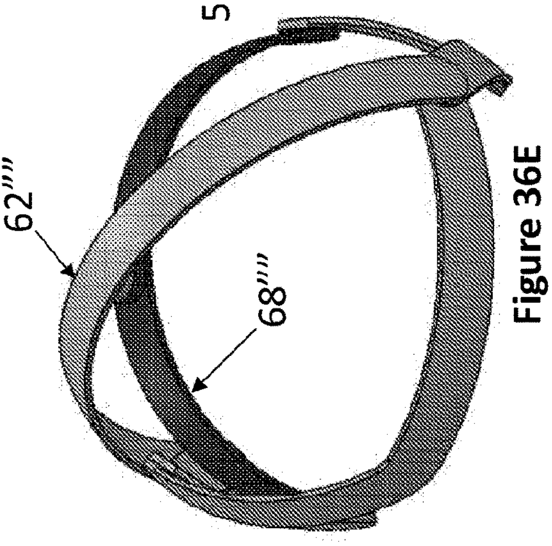
Figure 36F:
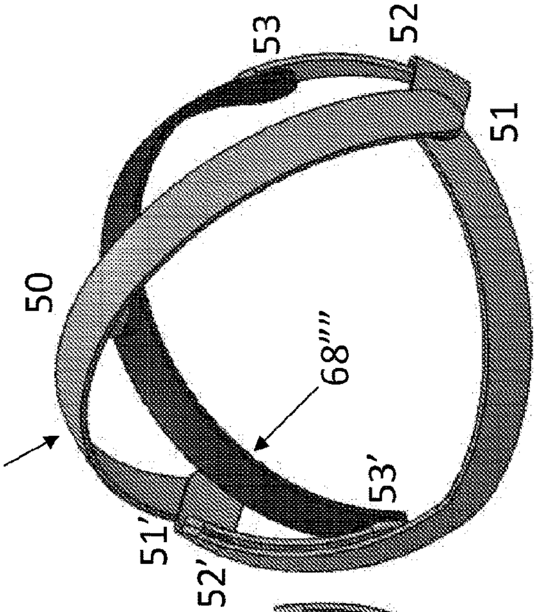
Figure 37A:
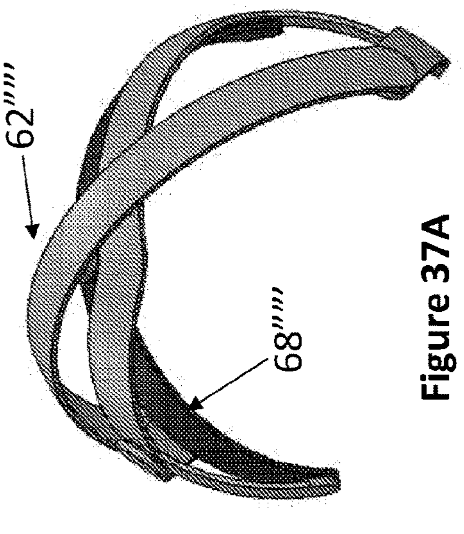
FIGS. 37A to 37F are projection views of a plurality of linkages representing the motion and angular rotation of a wheel linkage relative to a static linkage of a fifth embodiment of a steering assembly.
Figure 37B:
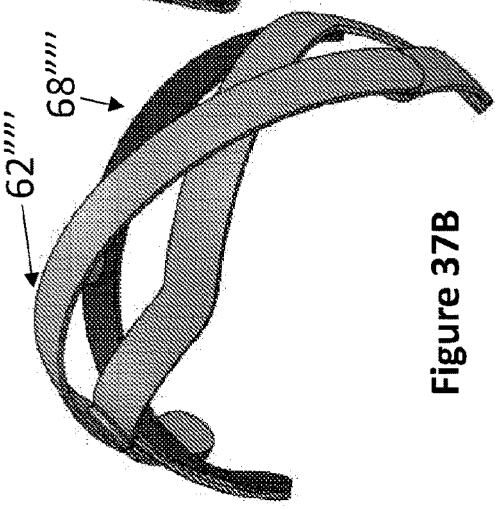
Figure 37C:
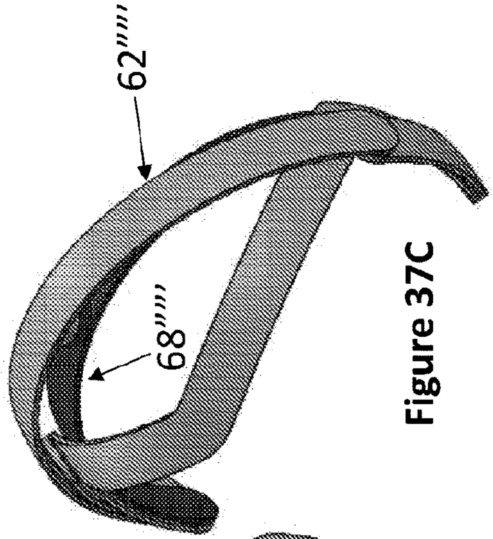
Figure 37D:
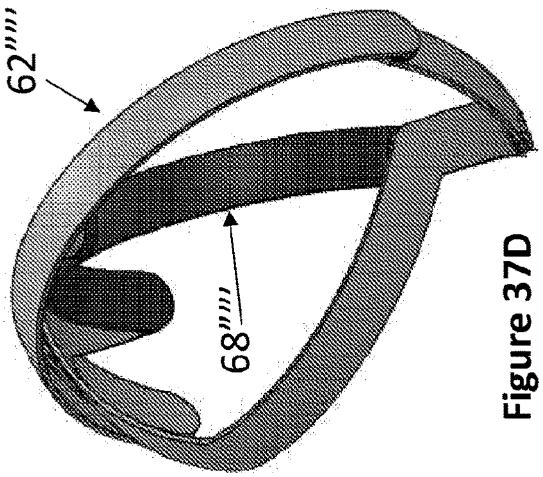
Figure 37E:
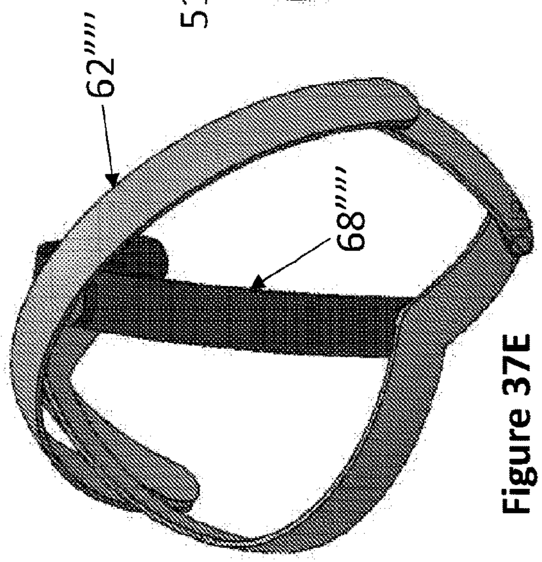
Figure 37F:
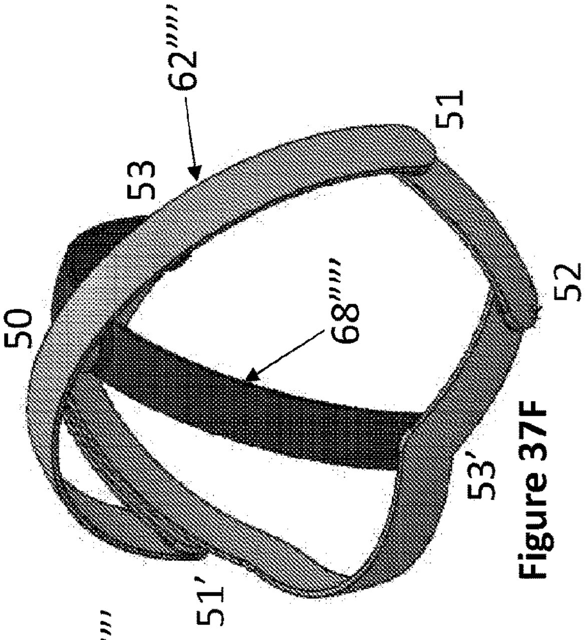
Figure 38A:
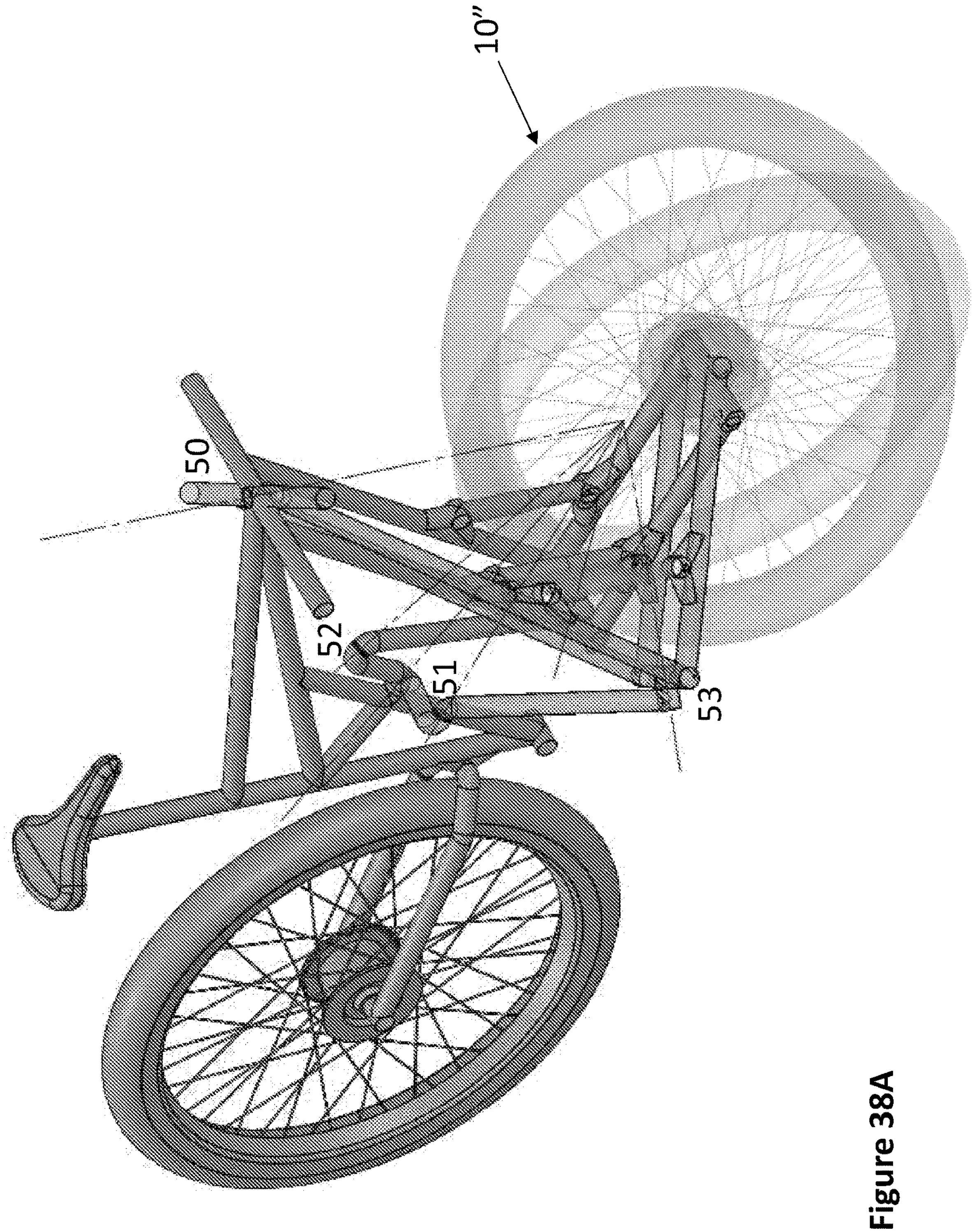
FIGS. 38A to 38D are projection, front, side and top views of an embodiment of the steering assembly when applied to a bicycle.
Figure 38C:
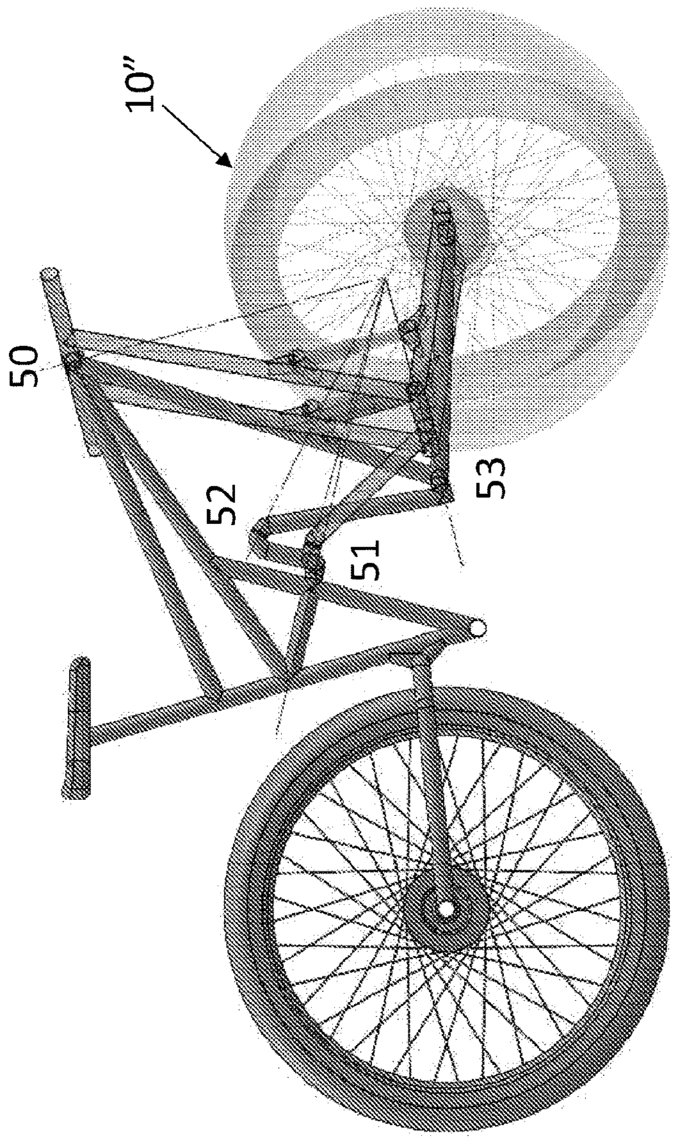
Figure 38B:
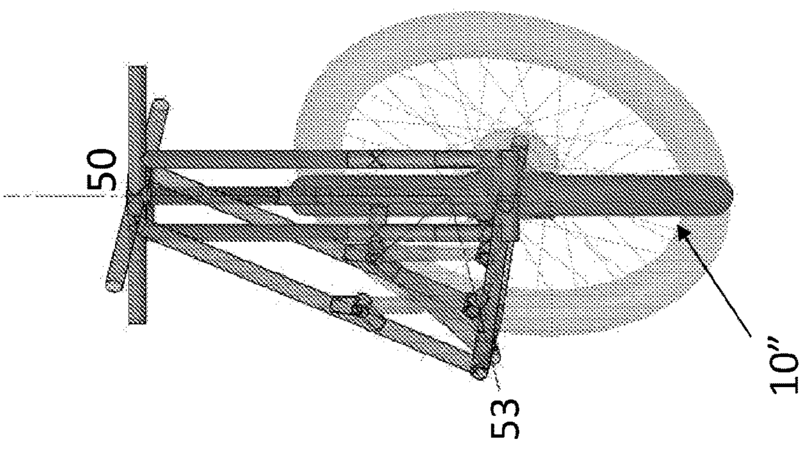
Figure 38D:
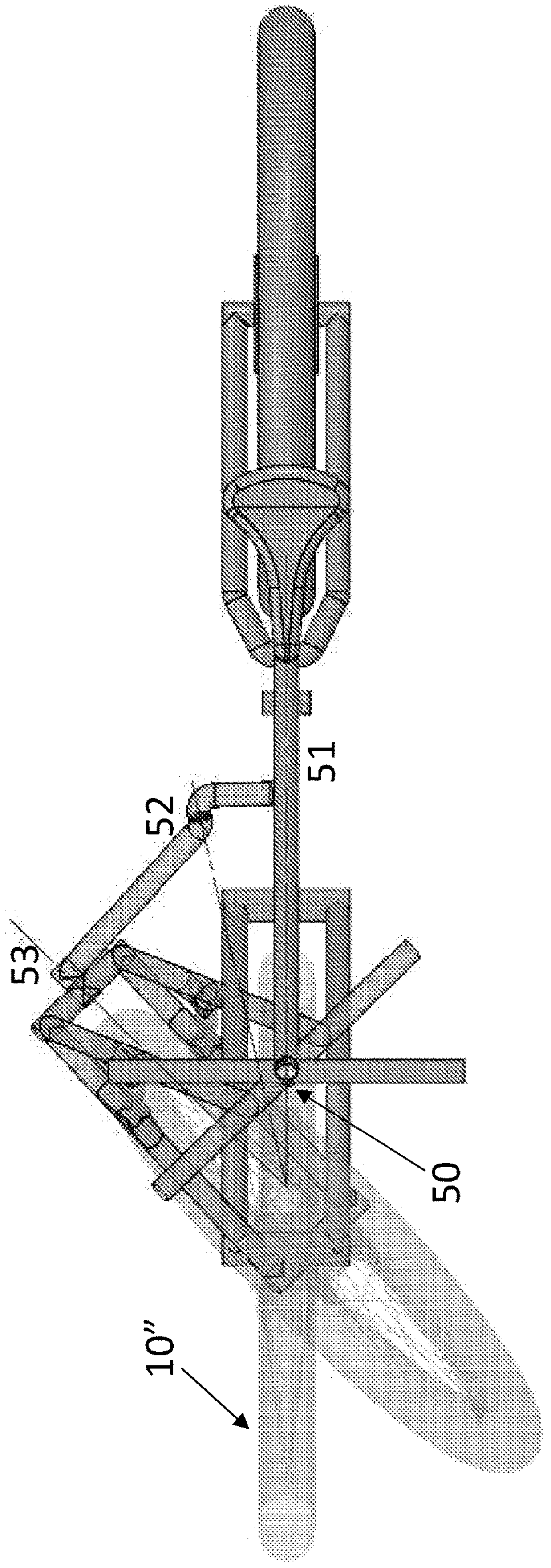
Figure 39A:
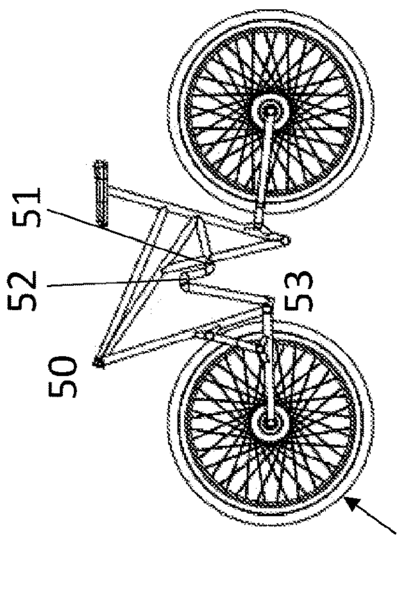
FIGS. 39A to 39F are side views of an embodiment of the steering assembly when applied to a bicycle, showing the motion and angular rotation of the wheel relative to the bicycle chassis, and with the bicycle suspension extended to hold the wheel in a lowered configuration.
Figure 39B:
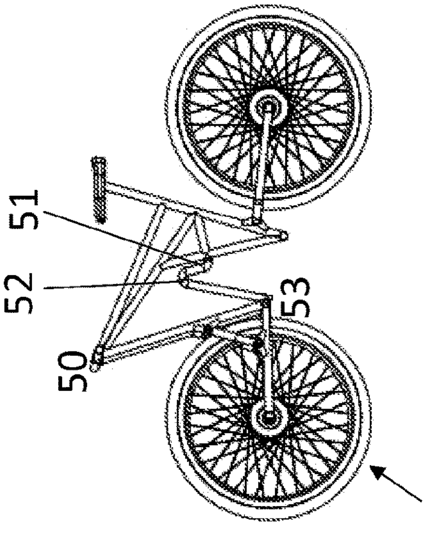
Figure 39C:
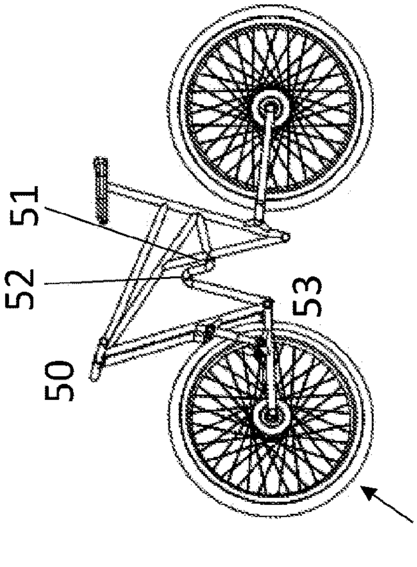
Figure 39D:
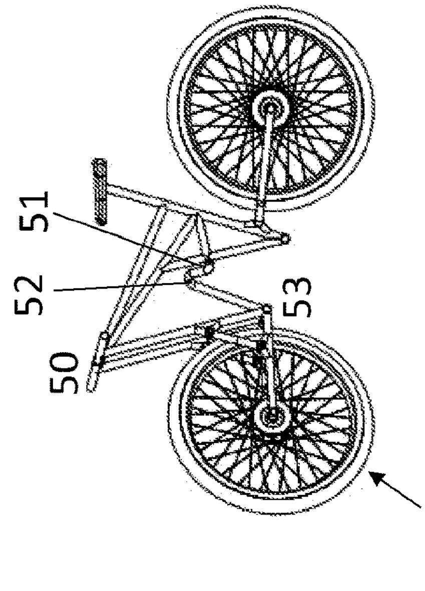
Figure 39E:
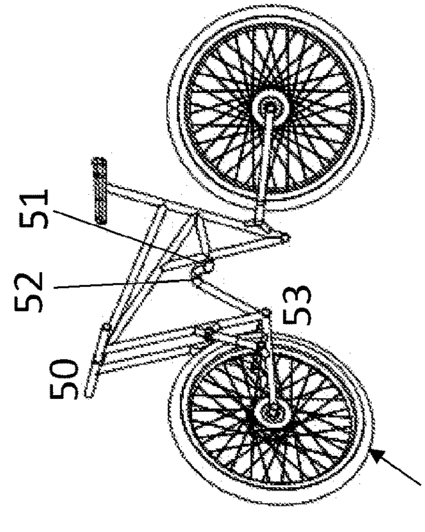
Figure 39F:
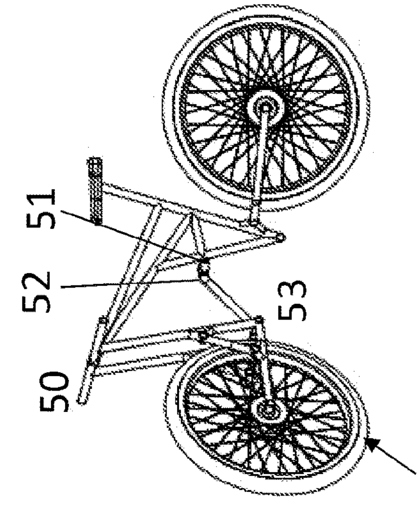
Figure 40A:
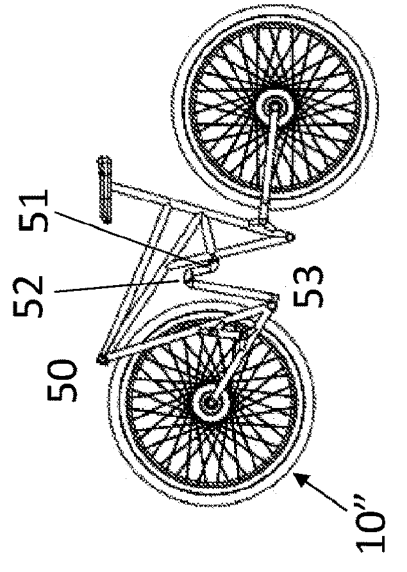
FIGS. 40A to 40F are side views of an embodiment of the steering assembly when applied to a bicycle, showing the motion and angular rotation of the wheel relative to the bicycle chassis, and with the bicycle suspension contracted to hold the wheel in an elevated configuration.
Figure 40B:
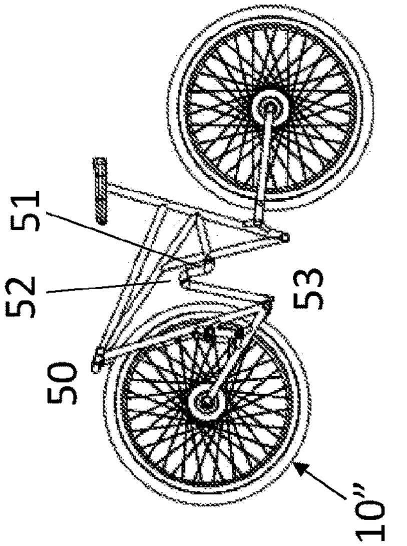
Figure 40C:
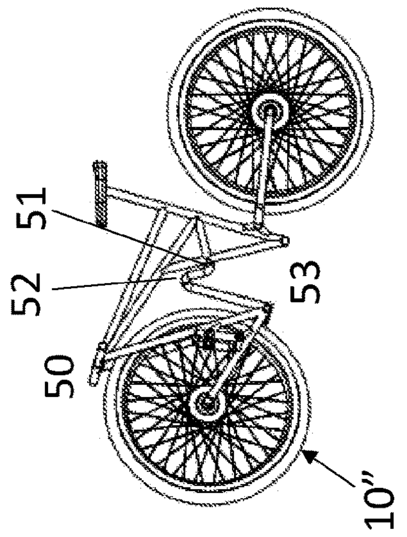
Figure 40D:
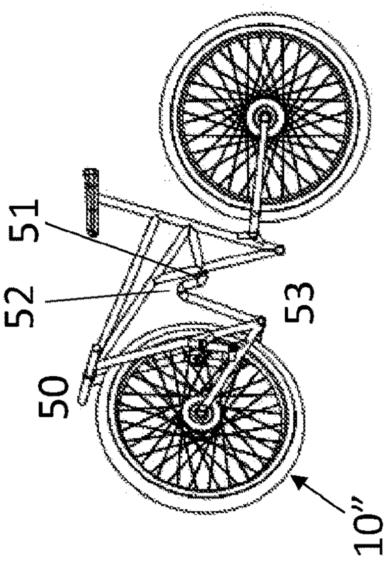
Figure 40E:
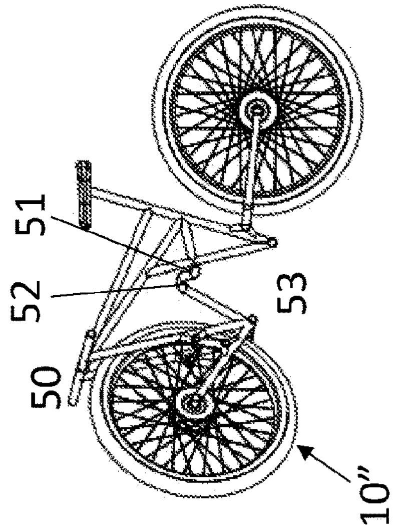
Figure 40F:
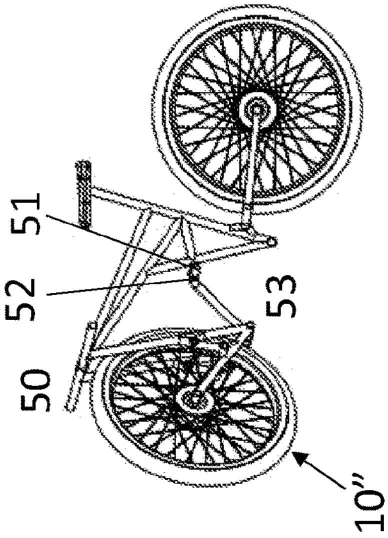

Referring to FIGS. 27 to 29, the third rotating shell 68 provides a hub within which an upper portion of the wheel 10 is housed. The shaft 12 projects perpendicularly away from an interior wall 39 of the third rotating shell 68 (and the innermost shell 70 that is fixed within the third rotating shell 68), with the surrounding substantially quarter-spherical shape providing sufficient clearance for the wheel 10 to be shifted vertically upwards or downwards by the suspension system of the wheel assembly 100, as required. The outwardly facing surface 48 of the third rotating shell 68 is shaped like roughly one quarter of a sphere, with a curved base portion 29 within which the innermost shell 70 having the control system and motors 20,20',20" are housed, and from which the shaft 12 extends into the hollow interior of the third rotating shell 68. The innermost shell 70 is fixed within the third rotating shell 68. The pivot neck 72 about which the wheel assembly 100 is steered is located on the outwardly facing surface 48 at the zenith of the generally spherical shape, such that an axis through the pivot neck 72 is collinear with a vertical axis therethrough. The third rotating shell 68 is coupled to, and configured to pivot about, a third ring bearing 67 located centrally within the interior facing surface 45 of the second rotating shell 66. A circular recessed portion 33 of the outwardly facing surface 48 of the third rotating shell 68 is provided in order to receive the second rotating shell 66, with the third ring bearing 67 being substantially centrally located within the circular recessed portion 33. The third ring bearing 67 allows for eccentric offset movement of the third rotating shell 68 relative to first rotating shell 64 for a corresponding angular rotation in the same angular direction as the first rotating shell 64, and in the opposing angular direction to the second rotating shell 66. The additional bearing surface 76 is provided around a circumference of the recessed portion 33 on the outwardly facing surface 48 of the third rotating shell 68 in order to assist with further distributing the forces applied to the pivot neck 72.

Referring again to FIGS. 14 to 17, the steering assembly 60 configuration may facilitate a turning angle of up to 95° relative to a straight direction (i.e. 0°) of the vehicle when the wheel 10 is steered in either direction of rotation. In use, the steering assembly 60 is operable to rotate by the mechanical rotation of the steering gear 77 which is mounted to rotate within the stationary outermost shell 62. The steering gear 77 meshes with, and drives, a rotation of the idler gear 73 which is mounted alongside the steering gear 77 within the stationary outermost shell 62. A slave gear 71 arranged around, and coupled to, the first ring bearing 63 meshes with the corresponding idler gear 73 to mechanically rotate the first rotating shell 64 about a first shell axis relative to the stationary outermost shell 62 (e.g. see FIG. 30). As the first rotating shell 64 is rotated relative to the neutral position (i.e. 0 degrees), the second ring bearing 65 allows for eccentric offset movement of the second rotating shell 66 for a corresponding, and opposite, angular rotation about a second shell axis. Similarly, as the second rotating shell 66 is rotated relative to the neutral position (i.e. 0 degrees) by the movement first rotating shell 64, the third ring bearing 67 allows for eccentric offset movement of the third rotating shell 68 relative to first rotating shell 64 for a corresponding angular rotation in the same angular direction first rotating shell 64 about a third shell axis, and in the opposing angular direction to the second rotating shell 66. The rotation of steering gear 77 thus controls the angular rotation and degree of angular movement of the third rotating shell 68, the movement being translated through the various corresponding gears 71, 73 and rotating shells 64, 66 to dictate the steering angle of the wheel 10. The third rotating shell 68 is mounted concentrically to the second rotating shell 66. The second rotating shell 66 is mounted eccentrically relative to first rotating shell 64. The first rotating shell 64 is mounted concentrically to the stationary outermost shell 62.

The shells of the steering assembly 60 are inherently strong due to their substantially spherical shape, thereby allowing for the shells to be formed from less material which may reduce the overall weight and space required. Each shell of the steering assembly 60 is designed as a relatively lightweight and relatively compact casing that is adapted to distribute the steering loads of the wheel assembly 100 more evenly, whilst minimising the stress forces at each of the connection points therebetween. The shells of the steering assembly 60 are nested into each other in a compact manner and partially wrap around the wheel 10, motors 20,20',20" and shaft 12, so as to closely conform to the space that the wheel 10 and motors 20,20',20" occupy, thereby reducing the overall size of the wheel assembly 100. The gaps between each shell of the steering assembly 60 may be adapted to provide a large surface areas for heat sinks.

The structure of the disclosed steering assembly 60 is configured to distribute the dynamic load applied between the wheel assembly 100 and the vehicle chassis away from the singular pivot neck 72 about which the wheel assembly 100 is angularly rotated during steering of the vehicle. Referring to FIGS. 31 to 33, the steering assembly 60 can be represented in a simplified form as a plurality of linkages 62',64',66',68' connected by a plurality of pivot points 50,51, 52,53. The primary pivot 50 corresponds to the wheel assembly pivot neck 72 at which the dynamic load between the wheel assembly 100 and the vehicle chassis is applied. Each of the static linkage 62', corresponding to the stationary outermost shell 62, and wheel linkage 68', corresponding to the third rotating shell 68, are pivotally coupled to one another at respective first ends thereof with a primary pivot 50 defined therebetween. A first end of a first rotating linkage 64' corresponding to the first rotating shell 64, is pivotally coupled to the static linkage 62' at a juncture that is a distance away from the primary pivot 50 along the static linkage 62', defining a first pivot 51 therebetween. The second end of the first rotating linkage 64' is pivotally coupled to a first end of a second rotating linkage 66', corresponding to the second rotating shell 66, defining a second pivot 52 therebetween. The second end of the second rotating linkage 66' is pivotally coupled to the wheel linkage 68' at a juncture that is a distance away from the primary pivot 50 along the wheel linkage 68', defining a third pivot 53 therebetween.

In order to rotate the wheel linkage 68' angularly about the primary pivot 50 relative to the static linkage 62' the first rotating linkage 64' is controlled to rotated about the first pivot 51 so as to drive second rotating linkage 66' to rotate about each of the second and third pivots 52,53 and thereby adjust the relative angular position of the wheel linkage 68' relative to the static linkage 62'. Such an arrangement is able to more efficiently support and distribute the dynamic load away from the primary pivot 50 whilst pivoting the wheel linkage 68' relative to the static linkage 62', as each of the spaced pivot points 50,51,52,53 are arranged such that an axes passing through each respective one of the pivot points 50,51,52,53 is angled to converge at a single point of origin. By reducing the magnitude of the dynamic point loads borne at the primary pivot 50, and spreading these forces more evenly across a plurality of linkages and pivots, the size of the bearings used to facilitate the pivoting motion can be reduced.

Referring to FIG. 33, the diameter of each of bearing 74 (between the stationary outermost shell 62 and the first rotating shell 64) and bearing 76 (between the second rotating shell 66 with the third rotating shell 68) are each sufficiently large so as to facilitate an overlap of the bearings 74,76. This may help to further spread the load distribution across the steering assembly 60 when steering the wheel 10. The coupling of the stationary outermost shell 62 to the first rotating shell 64 and the coupling of the second rotating shell 66 with the third rotating shell 68 are both structural in nature, and thus require the support of a larger additional bearing 74,76, respectively. The coupling of the first rotating shell 64 with the second rotating shell 66, by contrast, is a means of connecting the two structures together to form the steering assembly 60, and therefore requires only the second ring bearing 65 without the support of an additional larger bearing. The overlap of the paths of the bearings 74,76 acts to effectively blend the outer two shells 62,64 together with the inner two shells 66,68 so as to act as a substantially continuous steering assembly 60 rather than two separate pivoting structures with one being effectively cantilevered off the other. The nested overlap of the bearings 74,76 help to spread the point loads acting at the respective pivots to improve the structural strength and integrity of the steering assembly 60, even when driving at the maximum angular extension of the wheel 10. By distributing the force across thinner bearings 74,76 of larger diameter, the shells of the steering assembly 60 can utilise lighter bearings 63,65,67 which in turn helps to further reduce the overall bulk and weight of the steering assembly 60.

As would be appreciated by one skilled in the art, in a similar manner, each of the first, second and third rotating shells 64,66,68 respectively are configured to rotate about a set of axes that pass through an origin that is concentric to each of the partially spherical or hemispherical shells of the steering assembly 60, with the axes radiating in three-dimensions. Thus, the first 64 and second 66 rotating shells are configured to swivel eccentrically relative to one another, despite the respective axes through each internal shell being arranged so as to align with a central axis through the shells.

As would be appreciated by one skilled in the art, numerous alternative steering assemblies are possible based on the same principle. Referring to FIGS. 34A to 34F, an alternative structure is provided having two pivot points 50,51 supporting the static linkage 62" and three pivot points 50,53,53' supporting the pivoting movement of the wheel linkage 68". The width of the opposing pair of third pivots 53,53' away from the axis through the primary pivot 50 helps to spread the load experienced by the steering assembly during the rotation of the wheel linkage 68" further away from the primary pivot 50. Referring to FIGS. 35A to 35F, a further alternative structure is provided having three pivot points 50,51,51' supporting the static linkage 62'" and two pivot points 50,53 supporting the pivoting movement of the wheel linkage 68'". Referring to FIGS. 36A to 36F, a further alternative structure is provided having three pivot points 50,51,51' supporting the static linkage 62"" and three pivot points 50,53,53' supporting the pivoting movement of the wheel linkage 68"". Referring to FIGS. 37A to 37F, a further alternative structure is provided having three pivot points 50,51,51' supporting the static linkage 62'"" and three pivot points 50,53,53' supporting the pivoting movement of the wheel linkage 68'"". As a general rule, the more links and/or pivot points used in the steering structure, the more the force distribution is improved, provided all axes through each pivot point converge at a single point along the axis through the primary pivot. However, the increased points of connection may act to limit the range of the angular rotation of the wheel linkage relative to the static linkage.

Furthermore, as would be appreciated by one skilled in the art, the linkages of the steering assembly do not need to be curved or define a substantially spherical-looking steering assembly. The principle behind the steering assembly, as explained above, can be applied to alternative geometric shapes that have converging axes that restrict the freedom of movement based on the axes of the primary pivot.

For example, with reference to FIGS. 38 to 40, the principles of the disclosed steering system can be applied to a bicycle. The design of the bicycle distributes the forces on the frame and front forks further apart than a conventional bicycle frame. The bearing and structure around the primary pivot 50 can thus be lightweight and compact because the other pivots 51,52,53 act to support and brace the primary pivot 50 whilst simultaneously allowing the degree of freedom required for steering the bicycle. The steering assembly may thus be more efficient, utilising less materials, and have a lighter structure whilst exhibiting improved structural strength. A conventional bicycle frame experiences a concentration of forces on one axis in the head tube through which the handles turn the front wheel. The head tube also has to be of sufficient length, diameter, or strength, to retain the front fork within their constraints. By dividing the force across two separate axes, the bicycle can instead use a very short, lightweight head tube, which in turn allows for a greater magnitude of suspension of the front wheel, which is no longer impeded by the head tube. The steering braces in the bicycle allow for a front fork that is rigid enough to support a front swing arm suspension. The bicycle suspension can be extended to hold the wheel in a lowered configuration (e.g. FIGS. 39A to 39F) or contracted to hold the wheel in an elevated configuration (e.g. FIGS. 40A to 40F). The front swing arm suspension design acts as a passive anti-dive arrangement that uses the torsional forces generated from braking to counter the diving tendency caused by the forward movement of the centre of mass when braking.

The principles disclosed above in relation to the steering assembly 60 can also be extended to applications beyond vehicle wheel steering to axial positioning in general. For example, additional applications may include, but are not limited to, slewing pivot assemblies for cranes and excavation machinery, gimbal assemblies for cameras, radar dishes, and two axis joints for robotics etc.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The word "about" or "approximately" when used in relation to a stated reference point for a quality, level, value, number, frequency, percentage, dimension, location, size, amount, weight or length may be understood to indicate that the reference point is capable of variation, and that the term may encompass proximal qualities on either side of the reference point. In some embodiments, the word "about" may indicate that a reference point may vary by as much as 30 percent.

As used herein, the word "substantially" may be used merely to indicate an intention that the term it qualifies should not be read too literally and that the word could mean "sufficiently", "mostly" or "near enough" for the patentee's purposes.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The claims defining the invention are as follows:

1. A wheel assembly, the wheel assembly comprising a wheel that is rotatable about a shaft, the wheel being supported by a plurality of connecting members to rotate about a plurality of motors arranged on the shaft, the plurality of motors being operable to control the connecting members so as to adjust a distance between the shaft and a rim of the wheel.

2. The wheel assembly of claim 1, wherein the plurality of motors locate within the boundaries of the wheel.

3. The wheel assembly of claim 2, wherein the wheel assembly comprises a control system that is configured to simultaneously control an acceleration and/or deceleration of each of the plurality of motors whereby, in use, the plurality of motors are operative in a communicative manner to rotate the wheel about the shaft.

4. The wheel assembly of claim 3, wherein each of the plurality of motors is controlled to accelerate and/or decelerate independently of the other motors of the plurality of motors, whereby in use a velocity of each of the plurality of motors is simultaneously variable.

5. The wheel assembly of claim 3, wherein each of the plurality of motors is controlled to sinusoidally accelerate and decelerate during a single revolution of the wheel.

6. The wheel assembly of claim 5, wherein a timing of the sinusoidal acceleration and deceleration of an individual motor is offset relative to the sinusoidal acceleration and deceleration of the other motors of the plurality of motors.

7. The wheel assembly of claim 3, wherein the wheel assembly further comprises a mechanism that detects a state of a ground surface that contacts the wheel assembly in use, and communicates said state of the ground surface to the control system.

8. The wheel assembly of claim 7, wherein, in response to the detected state of the ground surface, the control system controls the acceleration and/or deceleration of each of the plurality of motors to adjustably shift the rim of the wheel relative to the shaft to effect a force dampening on the shaft and/or the wheel.

9. The wheel assembly of claim 7, wherein the mechanism is an accelerometer.

10. The wheel assembly of claim 1, wherein the plurality of connecting members are spokes that extend between the plurality of motors and the wheel, each spoke defining a motor linkage where the spoke is coupled to one of the plurality of motors, and a wheel linkage where the spoke is coupled to the wheel.

11. The wheel assembly of claim 10, wherein the spokes are pivotable about each of the motor linkage and the wheel linkage, and/or wherein each wheel linkage is spaced equidistantly around a circumference of the wheel, and/or wherein, in use, a relative spacing between each of the plurality of motor linkages is adjustable, and/or wherein a single spoke extends between the wheel and each of the plurality of motors, and/or wherein each of the spokes is rigid.

12. The wheel assembly of claim 10, wherein, in use, an acceleration of one of the plurality of motors relative to the other motors of the plurality of motors controllably orientates a corresponding one of the spokes that is attached to said one of the plurality of motors, whereby a distance between a corresponding motor linkage and the wheel is decreased.

13. The wheel assembly of claim 12, wherein a timing of a sinusoidal acceleration and deceleration of an individual motor is offset relative to a sinusoidal acceleration and deceleration of the other motors of the plurality of motors, and, wherein, in use, each one of the plurality of motors are controlled to reach a peak velocity, respectively, when a corresponding one of the spokes that is attached to said one of the plurality of motors is at a position during each revolution that substantially corresponds to 90 degrees of a unit circle, whereby the rim of the wheel is adjusted to move downwards relative to the shaft.

14. The wheel assembly of claim 12, wherein a timing of a sinusoidal acceleration and deceleration of an individual motor is offset relative to a sinusoidal acceleration and deceleration of the other motors of the plurality of motors, and wherein, in use, each one of the plurality of motors are controlled to reach a peak velocity, respectively, when a corresponding one of the spokes that is attached to said one of the plurality of motors is at a position during each revolution that substantially corresponds to 270 degrees of a unit circle, whereby the rim of the wheel is adjusted to move upwards relative to the shaft.

15. The wheel assembly of claim 10, wherein, in use, a deceleration of one of the plurality of motors relative to the other motors of the plurality of motors controllably orientates a corresponding one of the spokes that is attached to said one of the plurality of motors, whereby a distance between a corresponding motor linkage and the wheel is increased.

16. The wheel assembly of claim 10, wherein each motor linkage is spaced equidistantly around a circumference of the plurality of motors when the plurality of motors operate at a common velocity.

17. The wheel assembly of claim 1, wherein the rim of the wheel is restricted to movement in a perpendicular Y-axis relative to an axis of the shaft.

18. The wheel assembly of claim 1, wherein the wheel assembly comprises three motors.

19. A wheel assembly, the wheel assembly comprising a wheel that is rotatable about a shaft, the wheel being supported by a plurality of connecting members to rotate about a plurality of motors that are arranged on the shaft, the plurality of motors being operable to control the connecting members so as to adjustably shift a central axis through the wheel relative to a central axis through the shaft.

20. A wheel assembly, the wheel assembly comprising one or more motors that are arranged on a shaft and coupled by one or more connecting members to a wheel such that the wheel is driven by the one or more motors to rotate about a central axis of the shaft, the shaft being fixed so as to not rotate about the central axis therethrough, wherein the one or more motors are operable to control the one or more connecting members so as to adjustably shift a central axis through the wheel relative to the central axis through the shaft.

* * * * *